(12) United States Patent
Johnson et al.

(10) Patent No.: US 9,956,530 B2
(45) Date of Patent: May 1, 2018

(54) MEMBRANE MODULE SYSTEM WITH BUNDLE ENCLOSURES AND PULSED AERATION AND METHOD OF OPERATION

(71) Applicant: Koch Membrane Systems, Inc., Wilmington, MA (US)

(72) Inventors: Taylour Johnson, Wilmington, MA (US); David M Colby, Wilmington, MA (US); Manwinder Singh, Wilmington, MA (US)

(73) Assignee: Koch Membrane Systems, Inc., Wilmington, MA (US)

( * ) Notice: Subject to any disclaimer, the term of this patent is extended or adjusted under 35 U.S.C. 154(b) by 89 days.

(21) Appl. No.: 15/094,813

(22) Filed: Apr. 8, 2016

(65) Prior Publication Data

US 2016/0220963 A1 Aug. 4, 2016

Related U.S. Application Data

(63) Continuation of application No. 14/918,199, filed on Oct. 20, 2015, now Pat. No. 9,333,464, which is a
(Continued)

(51) Int. Cl.
*B01D 65/02* (2006.01)
*B01D 63/02* (2006.01)
(Continued)

(52) U.S. Cl.
CPC ........... *B01D 65/02* (2013.01); *B01D 63/024* (2013.01); *B01D 63/04* (2013.01); *B01D 65/08* (2013.01);
(Continued)

(58) Field of Classification Search
None
See application file for complete search history.

(56) References Cited

U.S. PATENT DOCUMENTS 3,068,655 A 12/1962 Murray et al.
4,828,696 A 5/1989 Makino et al.
(Continued)

FOREIGN PATENT DOCUMENTS

AU 765966 B2 10/2003
AU 2013202174 A1 5/2013
(Continued)

OTHER PUBLICATIONS

International Search Report and Written Opinion received for PCT Patent Application No. PCT/US2015/044489, dated Feb. 2, 2016, 18 pages.
(Continued)

*Primary Examiner* — Krishnan S Menon

(57) ABSTRACT

A membrane filter module configured to treat a liquid contained in a tank at an ambient pressure. The module may have a header, with a bundle containing a plurality of substantially vertical hollow fiber membranes, wherein a lower end of each hollow fiber membrane is fixed in the header. The module may also have a gasification device adapted to periodically generate a gaseous bubble and configured to release the gaseous bubble within the bundle. The module may further have an enclosure that substantially surrounds the bundle that extends from a lower region to an upper region of the membrane bundle, wherein the enclosure is configured to retain the liquid introduced into the enclosure such that the liquid surrounds the membrane bundle. The gaseous bubble has a cross-sectional area that corresponds with a cross-sectional area of the enclosure, such that the cross-sectional area of the gaseous bubble occupies substantially the entire cross-sectional area of the enclosure as it flows along the bundle.

20 Claims, 62 Drawing Sheets

Related U.S. Application Data continuation of application No. PCT/US2015/044489, filed on Aug. 10, 2015, which is a continuation of application No. PCT/US2015/019121, filed on Mar. 16, 2015.

(60) Provisional application No. 62/067,127, filed on Oct. 22, 2014.

(51) Int. Cl.
| | |
|---|---|
| B01D 63/04 | (2006.01) |
| B01D 65/08 | (2006.01) |
| C02F 3/00 | (2006.01) |
| C02F 1/44 | (2006.01) |
| C02F 3/12 | (2006.01) |

(52) U.S. Cl.
CPC ............ *C02F 3/006* (2013.01); *C02F 3/1273* (2013.01); *B01D 2311/2665* (2013.01); *B01D 2313/20* (2013.01); *B01D 2313/21* (2013.01); *B01D 2313/23* (2013.01); *B01D 2313/26* (2013.01); *B01D 2315/06* (2013.01); *B01D 2317/04* (2013.01); *B01D 2321/185* (2013.01); *B01D 2321/2066* (2013.01); *C02F 2209/001* (2013.01); *C02F 2209/02* (2013.01); *C02F 2209/10* (2013.01); *C02F 2209/38* (2013.01); *C02F 2209/40* (2013.01); *C02F 2209/44* (2013.01); *Y02W 10/15* (2015.05)

(56) References Cited

U.S. PATENT DOCUMENTS

| | | |
|---|---|---|
| 5,770,080 A | 6/1998 | Malone |
| 6,162,020 A | 12/2000 | Kondo |
| 6,511,602 B1 | 1/2003 | Miyashita et al. |
| 6,524,481 B2 | 2/2003 | Zha et al. |
| 6,550,747 B2 | 4/2003 | Rabie et al. |
| 6,555,005 B1 | 4/2003 | Zha et al. |
| 6,790,360 B1 | 9/2004 | Pedersen et al. |
| 6,841,070 B2 | 1/2005 | Zha et al. |
| 6,921,483 B2 | 7/2005 | Goldsmith et al. |
| 7,087,170 B2 | 8/2006 | You et al. |
| 7,311,833 B2 | 12/2007 | Yamamoto et al. |
| 7,329,344 B2 | 2/2008 | Jordan et al. |
| 7,361,274 B2 | 4/2008 | Lazaredes |
| 7,422,689 B2 | 9/2008 | Noguchi |
| 7,476,322 B2 | 1/2009 | Dimitriou et al. |
| 7,485,232 B2 | 2/2009 | Yamasaki et al. |
| 7,575,684 B2 | 8/2009 | Yamasaki et al. |
| 7,591,950 B2 | 9/2009 | Zha et al. |
| 7,641,798 B2 | 1/2010 | Yamasaki et al. |
| 7,691,268 B2 | 4/2010 | Yamasaki et al. |
| 7,862,719 B2 | 1/2011 | McMahon et al. |
| 8,038,882 B2 | 10/2011 | Hashimoto |
| 8,047,808 B2 | 11/2011 | Kondo |
| 8,262,911 B2 | 9/2012 | Liao et al. |
| 8,287,743 B2 | 10/2012 | Zha et al. |
| 8,366,929 B2 | 2/2013 | Masutani et al. |
| 8,372,276 B2 | 2/2013 | Zha et al. |
| 8,506,806 B2 | 8/2013 | Beck et al. |
| 8,580,115 B2 | 11/2013 | Krause et al. |
| 8,591,738 B2 | 11/2013 | Toyooka et al. |
| 8,622,222 B2 | 1/2014 | Zha et al. |
| 8,758,622 B2 | 6/2014 | Muller |
| 8,790,515 B2 | 7/2014 | Zha et al. |
| 8,871,089 B2 | 10/2014 | Early et al. |
| 2001/0027950 A1 | 10/2001 | Rabie et al. |
| 2002/0162803 A1 | 11/2002 | Haney et al. |
| 2003/0146153 A1 | 8/2003 | Cote et al. |
| 2003/0150808 A1 | 8/2003 | Morikawa et al. |
| 2004/0108268 A1 | 6/2004 | Liu et al. |
| 2005/0218074 A1 | 10/2005 | Pollock |
| 2006/0008865 A1 | 1/2006 | Cote et al. |
| 2006/0065596 A1 | 3/2006 | Kent et al. |
| 2006/0191847 A1 | 8/2006 | Yamasaki et al. |
| 2006/0201876 A1 | 9/2006 | Jordan |
| 2007/0007214 A1 | 1/2007 | Zha et al. |
| 2007/0029258 A1 | 2/2007 | Takeda et al. |
| 2007/0056893 A1* | 3/2007 | Noh ................. B01D 63/021 210/321.61 |
| 2007/0166171 A1 | 7/2007 | Kondo |
| 2007/0187326 A1 | 8/2007 | Bonnelye et al. |
| 2007/0205146 A1* | 9/2007 | Schafer ............. B01D 61/18 210/321.69 |
| 2007/0289362 A1 | 12/2007 | Ross et al. |
| 2008/0135497 A1 | 6/2008 | Fuchs et al. |
| 2008/0179244 A1 | 7/2008 | Morgan et al. |
| 2008/0257822 A1 | 10/2008 | Johnson |
| 2009/0026139 A1 | 1/2009 | Zha et al. |
| 2009/0045135 A1 | 2/2009 | Khudenko et al. |
| 2009/0194477 A1 | 8/2009 | Hashimoto |
| 2009/0223895 A1 | 9/2009 | Zha et al. |
| 2009/0255872 A1 | 10/2009 | Busnot et al. |
| 2009/0301963 A1 | 12/2009 | Brockmann et al. |
| 2010/0012585 A1 | 1/2010 | Zha et al. |
| 2010/0025320 A1 | 2/2010 | Johnson |
| 2010/0170847 A1 | 7/2010 | Zha et al. |
| 2010/0200503 A1 | 8/2010 | Zha et al. |
| 2010/0300968 A1 | 12/2010 | Liu et al. |
| 2011/0042311 A1 | 2/2011 | Ames |
| 2011/0049047 A1 | 3/2011 | Cumin et al. |
| 2011/0089013 A1 | 4/2011 | Sakurai et al. |
| 2011/0100907 A1 | 5/2011 | Zha et al. |
| 2011/0180475 A1 | 7/2011 | Ahmadun et al. |
| 2011/0192794 A1 | 8/2011 | Chidambaran et al. |
| 2012/0012524 A1 | 1/2012 | Yang et al. |
| 2012/0048801 A1 | 3/2012 | Hong et al. |
| 2012/0061333 A1 | 3/2012 | Zha et al. |
| 2012/0091602 A1 | 4/2012 | Cumin et al. |
| 2012/0223005 A1 | 9/2012 | Toyooka et al. |
| 2012/0234754 A1 | 9/2012 | Yatsugi et al. |
| 2012/0285885 A1* | 11/2012 | James ................. B01D 63/02 210/636 |
| 2012/0325741 A1 | 12/2012 | Osborn et al. |
| 2012/0325742 A1 | 12/2012 | Cumin et al. |
| 2013/0075322 A1 | 3/2013 | Lee Wang |
| 2013/0175217 A1 | 7/2013 | Breitner |
| 2013/0313190 A1 | 11/2013 | Levy et al. |
| 2014/0042084 A1 | 2/2014 | Kempson et al. |
| 2014/0076806 A1 | 3/2014 | Min et al. |
| 2014/0083940 A1 | 3/2014 | Zha et al. |
| 2014/0158618 A1 | 6/2014 | Zha et al. |
| 2014/0238936 A1 | 8/2014 | Fazel et al. |
| 2014/0332465 A1 | 11/2014 | Kitagawa et al. |

FOREIGN PATENT DOCUMENTS

| | | |
|---|---|---|
| AU | 2015200091 A1 | 2/2015 |
| CN | 1648071 A | 8/2005 |
| CN | 2744673 Y | 12/2005 |
| CN | 1861530 A | 11/2006 |
| CN | 101003406 A | 7/2007 |
| CN | 101028949 A | 9/2007 |
| CN | 101125281 A | 2/2008 |
| CN | 101234819 A | 8/2008 |
| CN | 101284698 A | 10/2008 |
| CN | 101293705 A | 10/2008 |
| CN | 201143420 Y | 11/2008 |
| CN | 101333035 A | 12/2008 |
| CN | 201240933 Y | 5/2009 |
| CN | 101462792 A | 6/2009 |
| CN | 101524624 A | 9/2009 |
| CN | 101591126 A | 12/2009 |
| CN | 101648763 A | 2/2010 |
| CN | 101659451 A | 3/2010 |
| CN | 201427920 Y | 3/2010 |
| CN | 101700914 A | 5/2010 |
| CN | 201458897 U | 5/2010 |
| CN | 201485304 U | 5/2010 |
| CN | 101767866 A | 7/2010 |
| CN | 101774731 A | 7/2010 |
| CN | 201520704 U | 7/2010 |

(56) References Cited

FOREIGN PATENT DOCUMENTS

| | | |
|---|---|---|
| CN | 201529493 U | 7/2010 |
| CN | 201529494 U | 7/2010 |
| CN | 101811797 A | 8/2010 |
| CN | 101811805 A | 8/2010 |
| CN | 101837246 A | 9/2010 |
| CN | 101838047 A | 9/2010 |
| CN | 101863577 A | 10/2010 |
| CN | 201678553 U | 12/2010 |
| CN | 201762146 U | 3/2011 |
| CN | 102001795 A | 4/2011 |
| CN | 102001796 A | 4/2011 |
| CN | 201785220 U | 4/2011 |
| CN | 201809262 U | 4/2011 |
| CN | 102050529 A | 5/2011 |
| CN | 201834830 U | 5/2011 |
| CN | 102101738 A | 6/2011 |
| CN | 201942597 U | 8/2011 |
| CN | 102179179 A | 9/2011 |
| CN | 102258944 A | 11/2011 |
| CN | 202046963 U | 11/2011 |
| CN | 102285713 A | 12/2011 |
| CN | 202063791 U | 12/2011 |
| CN | 202078860 U | 12/2011 |
| CN | 202089817 U | 12/2011 |
| CN | 102417234 A | 4/2012 |
| CN | 102464385 A | 5/2012 |
| CN | 102485328 A | 6/2012 |
| CN | 102491521 A | 6/2012 |
| CN | 102580545 A | 7/2012 |
| CN | 202289881 U | 7/2012 |
| CN | 102633319 A | 8/2012 |
| CN | 202390249 U | 8/2012 |
| CN | 102659241 A | 9/2012 |
| CN | 202415243 U | 9/2012 |
| CN | 202415254 U | 9/2012 |
| CN | 102698607 A | 10/2012 |
| CN | 102701434 A | 10/2012 |
| CN | 102745807 A | 10/2012 |
| CN | 202465359 U | 10/2012 |
| CN | 202465360 U | 10/2012 |
| CN | 202465372 U | 10/2012 |
| CN | 102849858 A | 1/2013 |
| CN | 102861514 A | 1/2013 |
| CN | 102897900 A | 1/2013 |
| CN | 102897901 A | 1/2013 |
| CN | 102897902 A | 1/2013 |
| CN | 202643437 U | 1/2013 |
| CN | 202654945 U | 1/2013 |
| CN | 202808473 U | 3/2013 |
| CN | 202808474 U | 3/2013 |
| CN | 103011505 A | 4/2013 |
| CN | 103043783 A | 4/2013 |
| CN | 202924871 U | 5/2013 |
| CN | 203033838 U | 7/2013 |
| CN | 203208907 U | 9/2013 |
| CN | 103570129 A | 2/2014 |
| CN | 103641272 A | 3/2014 |
| CN | 103663820 A | 3/2014 |
| CN | 103693739 A | 4/2014 |
| CN | 103755027 A | 4/2014 |
| CN | 103818997 A | 5/2014 |
| CN | 203602405 U | 5/2014 |
| CN | 203653324 U | 6/2014 |
| CN | 203668118 U | 6/2014 |
| CN | 103910436 A | 7/2014 |
| CN | 203683208 U | 7/2014 |
| CN | 203700086 U | 7/2014 |
| CN | 103979683 A | 8/2014 |
| CN | 103979706 A | 8/2014 |
| CN | 203794724 U | 8/2014 |
| CN | 104016474 A | 9/2014 |
| CN | 203807228 U | 9/2014 |
| CN | 203904065 U | 10/2014 |
| CN | 104192994 A | 12/2014 |
| CN | 204022559 U | 12/2014 |
| CN | 204039126 U | 12/2014 |
| DE | 10-2005-056114 A1 | 5/2007 |
| DE | 10-2007-007894 A1 | 8/2008 |
| DE | 20-2008-015792 U1 | 5/2010 |
| DE | 10-2013-218188 B3 | 12/2014 |
| EP | 1629881 A1 | 3/2006 |
| EP | 1652572 A1 | 5/2006 |
| EP | 1718398 A1 | 11/2006 |
| EP | 2143691 A2 | 1/2010 |
| GB | 996195 A | 6/1965 |
| GB | 2512280 A | 10/2014 |
| JP | 1-111494 A | 4/1989 |
| JP | 2004-268023 A | 9/2004 |
| JP | 2004-322100 A | 11/2004 |
| JP | 2005-246307 A | 9/2005 |
| JP | 2005-246308 A | 9/2005 |
| JP | 2005-254207 A | 9/2005 |
| JP | 2005-279495 A | 10/2005 |
| JP | 2006-015233 A | 1/2006 |
| JP | 2006-035221 A | 2/2006 |
| JP | 2006-043670 A | 2/2006 |
| JP | 2006-101805 A | 4/2006 |
| JP | 2006-122801 A | 5/2006 |
| JP | 2006-247498 A | 9/2006 |
| JP | 2006-263501 A | 10/2006 |
| JP | 2006-281183 A | 10/2006 |
| JP | 2007-000712 A | 1/2007 |
| JP | 2007-098368 A | 4/2007 |
| JP | 2007-130579 A | 5/2007 |
| JP | 2007-203219 A | 8/2007 |
| JP | 2007-216102 A | 8/2007 |
| JP | 2007-253012 A | 10/2007 |
| JP | 2008-086991 A | 4/2008 |
| JP | 2008-194649 A | 8/2008 |
| JP | 2008-212930 A | 9/2008 |
| JP | 2008-221133 A | 9/2008 |
| JP | 2008-246357 A | 10/2008 |
| JP | 2008-246424 A | 10/2008 |
| JP | 2008-253994 A | 10/2008 |
| JP | 2008-259945 A | 10/2008 |
| JP | 2008-259978 A | 10/2008 |
| JP | 4160957 B2 | 10/2008 |
| JP | 2008-264664 A | 11/2008 |
| JP | 2008-284422 A | 11/2008 |
| JP | 2008-296087 A | 12/2008 |
| JP | 2009-039691 A | 2/2009 |
| JP | 2009-066469 A | 4/2009 |
| JP | 2009-178696 A | 8/2009 |
| JP | 4327155 B2 | 9/2009 |
| JP | 2009-247936 A | 10/2009 |
| JP | 2009-247965 A | 10/2009 |
| JP | 4361432 B2 | 11/2009 |
| JP | 4365734 B2 | 11/2009 |
| JP | 2009-291744 A | 12/2009 |
| JP | 2009-297611 A | 12/2009 |
| JP | 2010-069359 A | 4/2010 |
| JP | 2010-082597 A | 4/2010 |
| JP | 2010-089079 A | 4/2010 |
| JP | 2010-094589 A | 4/2010 |
| JP | 2010-149068 A | 7/2010 |
| JP | 4500648 B2 | 7/2010 |
| JP | 2010-188250 A | 9/2010 |
| JP | 2010-194481 A | 9/2010 |
| JP | 2010-207699 A | 9/2010 |
| JP | 2010-234342 A | 10/2010 |
| JP | 4603395 B2 | 12/2010 |
| JP | 2011-011098 A | 1/2011 |
| JP | 4635666 B2 | 2/2011 |
| JP | 2011-041907 A | 3/2011 |
| JP | 2011-050905 A | 3/2011 |
| JP | 2011-056384 A | 3/2011 |
| JP | 2011-062632 A | 3/2011 |
| JP | 4649529 B1 | 3/2011 |
| JP | 2011-067820 A | 4/2011 |
| JP | 2011-078940 A | 4/2011 |
| JP | 2011-078949 A | 4/2011 |
| JP | 2011-083764 A | 4/2011 |
| JP | 4698274 B2 | 6/2011 |
| JP | 4699716 B2 | 6/2011 |

(56) References Cited

FOREIGN PATENT DOCUMENTS

| | | |
|---|---|---|
| JP | 2011-152544 A | 8/2011 |
| JP | 2011-177607 A | 9/2011 |
| JP | 2011-177608 A | 9/2011 |
| JP | 2011-189308 A | 9/2011 |
| JP | 4782576 B2 | 9/2011 |
| JP | 2011-194305 A | 10/2011 |
| JP | 2012-000585 A | 1/2012 |
| JP | 2012-024647 A | 2/2012 |
| JP | 4867180 B2 | 2/2012 |
| JP | 2012-040464 A | 3/2012 |
| JP | 2012-045510 A | 3/2012 |
| JP | 2012-061432 A | 3/2012 |
| JP | 2012-076005 A | 4/2012 |
| JP | 2012-076081 A | 4/2012 |
| JP | 2012-086120 A | 5/2012 |
| JP | 2012-086182 A | 5/2012 |
| JP | 2012-106161 A | 6/2012 |
| JP | 2012-152669 A | 8/2012 |
| JP | 2012-157849 A | 8/2012 |
| JP | 2012-161791 A | 8/2012 |
| JP | 4996379 B2 | 8/2012 |
| JP | 2012-176396 A | 9/2012 |
| JP | 2012-179556 A | 9/2012 |
| JP | 2013-013900 A | 1/2013 |
| JP | 2013-017920 A | 1/2013 |
| JP | 2013-039572 A | 2/2013 |
| JP | 5147267 B2 | 2/2013 |
| JP | 2013-052338 A | 3/2013 |
| JP | 2013-052339 A | 3/2013 |
| JP | 2013-052340 A | 3/2013 |
| JP | 5181987 B2 | 4/2013 |
| JP | 5182413 B2 | 4/2013 |
| JP | 2013-121570 A | 6/2013 |
| JP | 5203149 B2 | 6/2013 |
| JP | 2013-132602 A | 7/2013 |
| JP | 5230071 B2 | 7/2013 |
| JP | 2013-158764 A | 8/2013 |
| JP | 2013-163141 A | 8/2013 |
| JP | 2013-188710 A | 9/2013 |
| JP | 2013-192974 A | 9/2013 |
| JP | 2013-193074 A | 9/2013 |
| JP | 2013-198867 A | 10/2013 |
| JP | 2013-202467 A | 10/2013 |
| JP | 2013-202548 A | 10/2013 |
| JP | 2013-212470 A | 10/2013 |
| JP | 2013-212496 A | 10/2013 |
| JP | 2013-233483 A | 11/2013 |
| JP | 2013-236983 A | 11/2013 |
| JP | 2013-237040 A | 11/2013 |
| JP | 2003-340250 A | 12/2013 |
| JP | 2013-244455 A | 12/2013 |
| JP | 2013-248566 A | 12/2013 |
| JP | 2014-000495 A | 1/2014 |
| JP | 2014-012243 A | 1/2014 |
| JP | 5390499 B2 | 1/2014 |
| JP | 2014-018781 A | 2/2014 |
| JP | 2014-028331 A | 2/2014 |
| JP | 2014-034003 A | 2/2014 |
| JP | 5423184 B2 | 2/2014 |
| JP | 5497309 B2 | 5/2014 |
| JP | 2014-100627 A | 6/2014 |
| JP | 2014-113511 A | 6/2014 |
| JP | 2014-128784 A | 7/2014 |
| JP | 2014-128790 A | 7/2014 |
| JP | 2014-133206 A | 7/2014 |
| JP | 2014-172014 A | 9/2014 |
| JP | 5581578 B2 | 9/2014 |
| JP | 2014-188453 A | 10/2014 |
| JP | 2014-193452 A | 10/2014 |
| JP | 2014-200707 A | 10/2014 |
| JP | 2014-205110 A | 10/2014 |
| JP | 5617009 B1 | 10/2014 |
| JP | 2014-231033 A | 12/2014 |
| KR | 10-0624768 B1 | 9/2006 |
| KR | 10-0639824 B1 | 10/2006 |
| KR | 10-0834716 B1 | 6/2008 |
| KR | 10-0957047 B1 | 5/2010 |
| KR | 10-1018587 B1 | 2/2011 |
| KR | 10-1100715 B1 | 12/2011 |
| KR | 10-1133330 B1 | 4/2012 |
| KR | 10-2012-0058172 A | 6/2012 |
| KR | 2012-0138026 A | 12/2012 |
| KR | 10-2013-0082363 A | 7/2013 |
| KR | 10-1426361 B1 | 8/2014 |
| KR | 2014-0103609 A | 8/2014 |
| NZ | 603143 A | 3/2014 |
| RU | 98997 U1 | 11/2010 |
| RU | 2448912 C2 | 4/2012 |
| RU | 121499 U1 | 10/2012 |
| RU | 2537611 C2 | 1/2015 |
| TW | 2008-15296 A | 4/2008 |
| TW | I348389 B | 9/2011 |
| TW | 2013-13294 A | 4/2013 |
| WO | 00/21890 A1 | 4/2000 |
| WO | 2005/016826 A2 | 2/2005 |
| WO | 2005/082498 A1 | 9/2005 |
| WO | 2005/118116 A1 | 12/2005 |
| WO | 2007/131151 A2 | 11/2007 |
| WO | 2008/038436 A1 | 4/2008 |
| WO | 2008/048594 A1 | 4/2008 |
| WO | 2008/139836 A1 | 11/2008 |
| WO | 2008/141080 A1 | 11/2008 |
| WO | 2009/028435 A1 | 3/2009 |
| WO | 2009/041015 A1 | 4/2009 |
| WO | 2009/118787 A1 | 10/2009 |
| WO | 2009/118788 A1 | 10/2009 |
| WO | 2009/118789 A1 | 10/2009 |
| WO | 2009/145077 A1 | 12/2009 |
| WO | 2010/021959 A1 | 2/2010 |
| WO | 2010/035793 A1 | 4/2010 |
| WO | 2010/037868 A1 | 4/2010 |
| WO | 2010/056011 A2 | 5/2010 |
| WO | 2010/081228 A1 | 7/2010 |
| WO | 2010/101152 A1 | 9/2010 |
| WO | 2010/104054 A1 | 9/2010 |
| WO | 2010/120992 A1 | 10/2010 |
| WO | 2011/004743 A1 | 1/2011 |
| WO | 2011/041829 A1 | 4/2011 |
| WO | 2011/048681 A1 | 4/2011 |
| WO | 2011/052525 A1 | 5/2011 |
| WO | 2011/058835 A1 | 5/2011 |
| WO | 2011/065418 A1 | 6/2011 |
| WO | 2011/065520 A1 | 6/2011 |
| WO | 2011/108589 A1 | 9/2011 |
| WO | 2011/114897 A1 | 9/2011 |
| WO | 2011/116467 A1 | 9/2011 |
| WO | 2011/129023 A1 | 10/2011 |
| WO | 2011/130089 A1 | 10/2011 |
| WO | 2011/132497 A1 | 10/2011 |
| WO | 2011/158559 A1 | 12/2011 |
| WO | 2012/002427 A1 | 1/2012 |
| WO | 2012/079288 A1 | 6/2012 |
| WO | 2012/099140 A1 | 7/2012 |
| WO | 2012/117768 A1 | 9/2012 |
| WO | 2012/134127 A2 | 10/2012 |
| WO | 2012/139260 A1 | 10/2012 |
| WO | 2012/165121 A1 | 12/2012 |
| WO | 2013/001914 A1 | 1/2013 |
| WO | 2013/002242 A1 | 1/2013 |
| WO | 2013/008522 A1 | 1/2013 |
| WO | 2013/038954 A1 | 3/2013 |
| WO | 2013/048005 A1 | 4/2013 |
| WO | 2013/088097 A1 | 6/2013 |
| WO | 2013/103083 A1 | 7/2013 |
| WO | 2013/146613 A1 | 10/2013 |
| WO | 2013/146976 A1 | 10/2013 |
| WO | 2013/151051 A1 | 10/2013 |
| WO | 2013/167358 A1 | 11/2013 |
| WO | 2013/172241 A1 | 11/2013 |
| WO | 2013/176145 A1 | 11/2013 |
| WO | 2013/187513 A1 | 12/2013 |
| WO | 2014/003007 A1 | 1/2014 |
| WO | 2014/034836 A1 | 3/2014 |
| WO | 2014/103565 A1 | 7/2014 |

(56) References Cited

FOREIGN PATENT DOCUMENTS

| WO | 2014/104135 A1 | 7/2014 |
|---|---|---|
| WO | 2014/110429 A1 | 7/2014 |
| WO | 2014/128850 A1 | 8/2014 |
| WO | 2014/128851 A1 | 8/2014 |
| WO | 2014/132069 A2 | 9/2014 |
| WO | 2014/157057 A1 | 10/2014 |
| WO | 2014/157488 A1 | 10/2014 |
| WO | 2014/192416 A1 | 12/2014 |
| WO | 2014/192432 A1 | 12/2014 |
| WO | 2014/192476 A1 | 12/2014 |
| WO | 2014/196151 A1 | 12/2014 |
| WO | 2015/008346 A1 | 1/2015 |

OTHER PUBLICATIONS

Lu et al., "The Influence of Bubble 1-32 Characteristics on the Performance of Submerged Hollow Fiber Membrane Module used in Microfiltration", Separation and Purification Technology, vol. 61, No. 1, Jun. 6, 2008, pp. 89-95.

Examination Report received for European Design Patent Application No. 002979849, dated Feb. 22, 2016, 2 pages.

\* cited by examiner

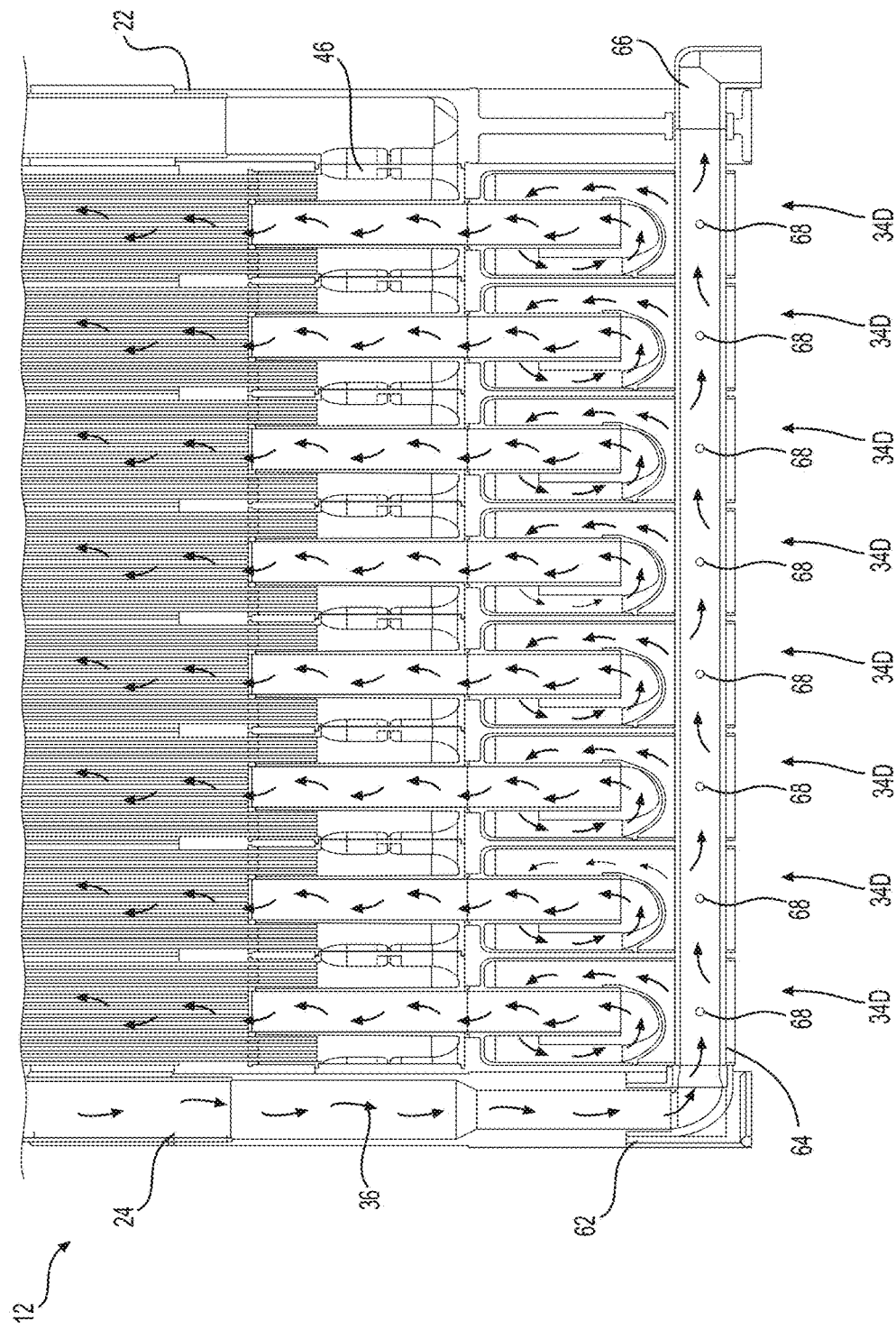

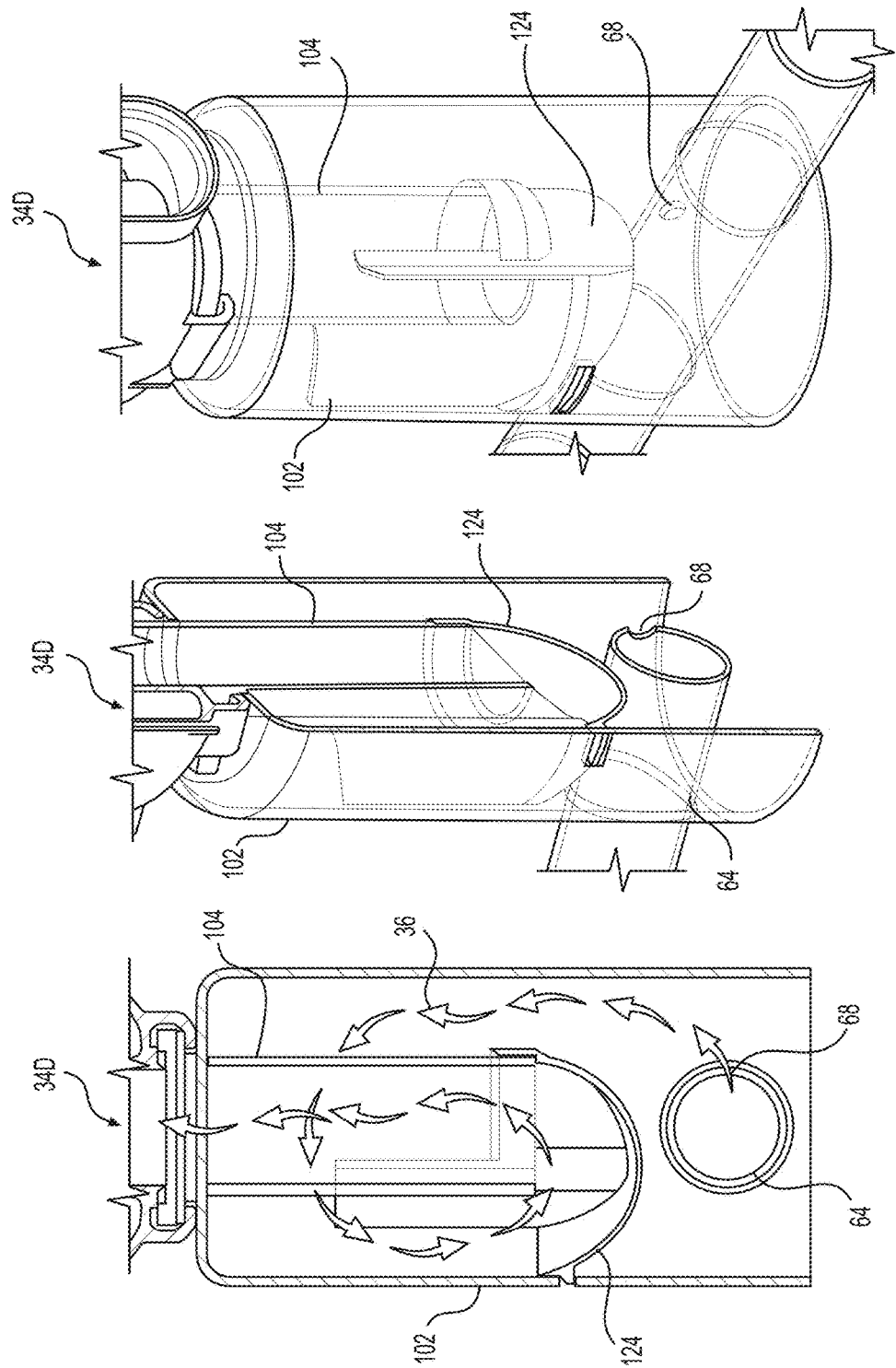

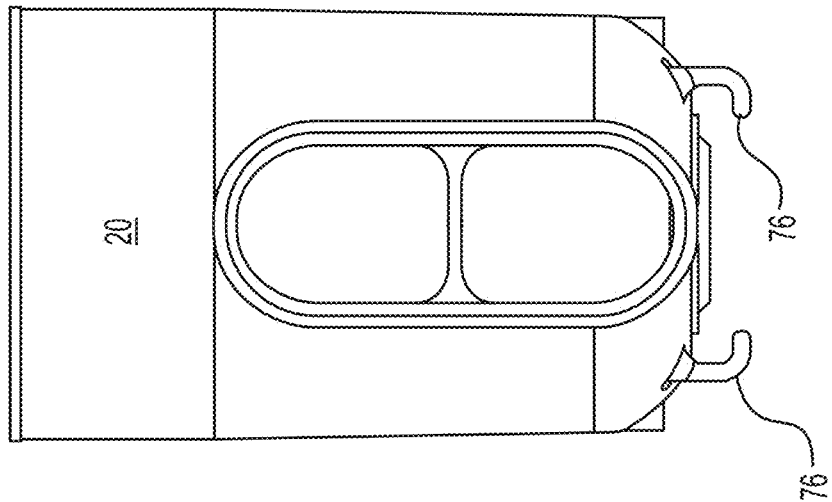
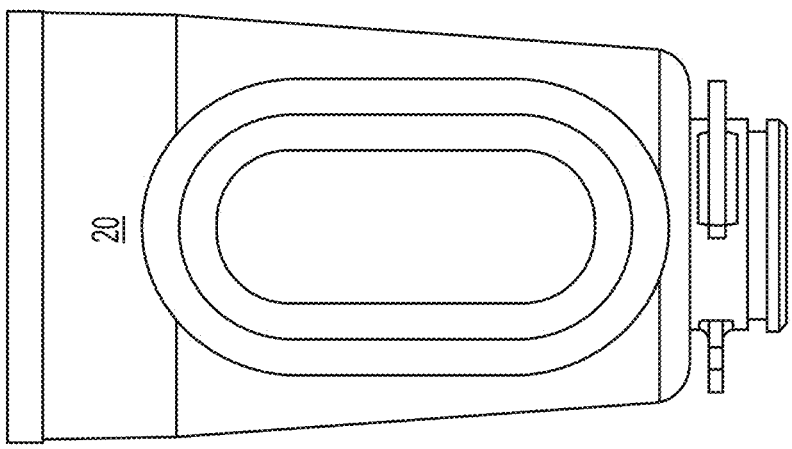
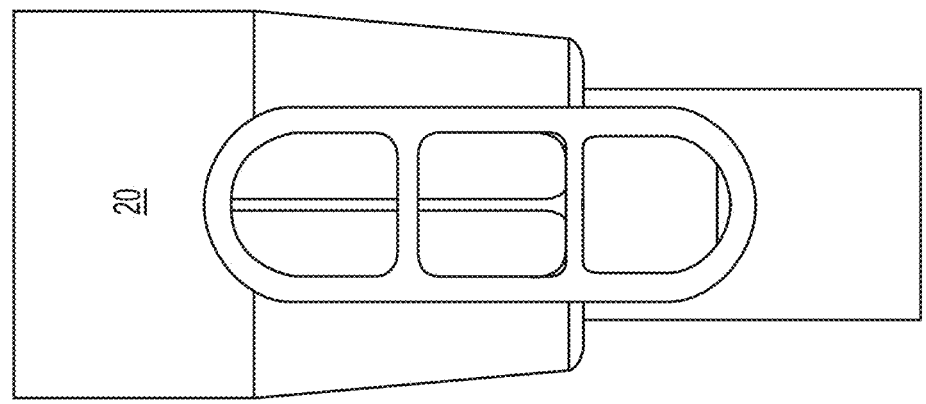

US 9,956,530 B2

MEMBRANE MODULE SYSTEM WITH BUNDLE ENCLOSURES AND PULSED AERATION AND METHOD OF OPERATION

CLAIM FOR PRIORITY

This application is a continuation of U.S. application Ser. No. 14/918,199 filed on Oct. 20, 2015, which claims the benefit of priority of U.S. Provisional Application No. 62/067,127, filed Oct. 22, 2014; PCT/US2015/019121, filed Mar. 16, 2015; and PCT/US2015/044489, filed Aug. 10, 2015, the subject matter of each is incorporated herein by reference in its entirety.

DESCRIPTION

Field of the Disclosure

The present disclosure relates to hollow-fiber membrane filtration systems with bundle enclosures and pulsed aeration designed for immersion in a tank of contaminated water, and a method of operation.

Background

A wide variety of membrane filtration systems have been used for many years to treat contaminated water, such as, for example, sewage or waste water. Such systems vary in complexity and cost. In an effort to make the treatment processes more cost efficient, submerged membrane filtration processes have been developed in which membrane modules including hollow fiber filtration membranes are submerged in a large tank, and filtrate is collected by way of suction applied to the filtrate side of the hollow fiber membranes. This results in suspended matter collecting on an external side of the hollow-fiber membrane surface, which reduces filtration performance. Thus, an effective method of removing the matter from the surfaces is required.

The effectiveness and viability of these membrane systems largely depend on having effective ways to clean the surfaces of the hollow fiber membranes, so that they do not become clogged and/or lose their effectiveness. Common methods of cleaning include backwash using a liquid permeate and/or gas, relaxing, chemical cleaning, and membrane surface aeration using a gas in the form of bubbles. In a gas aeration system, a gas is introduced into the base of the membrane module. The bubbles then travel upwards to scour the membrane surface to remove the fouling substances formed on the membrane surface. The shear force produced largely relies on the initial gas bubble velocity, bubble size, and resultant forces applied to the bubbles. To enhance scrubbing, more gas has to be applied. However, energy consumption increases as the volume of gas increases. For applications where the liquid being treated has large quantities of suspended matter, the gas aeration system is susceptible to becoming blocked.

One way to reduce energy consumption, while still obtaining efficient membrane cleaning, is cyclic aeration (e.g., small bubble dispersed aeration). Cyclic aeration systems provide gas bubbles on a cyclic basis, instead of a continuous basis. In order to provide for such cyclic operation, such systems normally require complex valve arrangements and control schemes, the cost of which offsets the operational savings of a cyclic system. In addition, cyclic aeration systems can have a limited range of air flow rate operation limiting the ability to reduce operational cost. For example, issues may arise with cyclic aeration systems when the air flow rate is turned down below a minimum threshold. Such issues may include, for example, insufficient circulation of the liquid within the membrane tank, insufficient scouring of the membrane surface leading to fouling and sludging, and increased probably of clogging of aeration system components (e.g., nozzles and distribution piping).

Another option to reduce energy consumption, is to have a pulsed air-lift system similar to that described in U.S. Pat. No. 8,287,743 (the '743 patent) to Zha et al. According to the '743 patent, the system includes membrane modules that have a pulsed gas-lift pump device provided below a distribution chamber of the membrane modules. The pulsed gas-lift pump device is configured to receive gas from a pressurized source, which displaces feed liquid within a gas collection chamber of the pulsed gas-lift device until it reaches a certain level. Once the volume of gas reaches a certain level the gas breaks the liquid seal and is discharged in the form of bubbles through the distribution chamber and into the base of the membrane module. The discharge of gas also sucks feed liquid through the pulsed gas-lift pump producing a two-phase gas/liquid pulse designed to scour the surfaces of the membranes.

The system and method of the '743 patent may provide some benefits in some applications. However, it may have certain drawbacks and inefficiencies, for example, the bubble formed by the pulsed air-lift can deform or shift as it moves up the membrane module, thereby reducing scrubbing efficiency. The disclosed embodiments may help solve these drawbacks and inefficiencies as well as other problems.

SUMMARY

In one aspect, the present disclosure is directed to a membrane filter module configured to treat a liquid contained in a tank at an ambient pressure. The module may include a header and a bundle containing a plurality of substantially vertical hollow fiber membranes, wherein a lower end of each hollow fiber membrane is fixed in the header. The module may also include a gasification device adapted to periodically generate a gaseous bubble and configured to release the gaseous bubble within the bundle. The module may further include an enclosure that substantially surrounds the bundle that extends from a lower region to an upper region of the membrane bundle, wherein the enclosure is configured to retain the liquid introduced into the enclosure such that the liquid surrounds the membrane bundle. The gaseous bubble may have a cross-sectional area that corresponds with a cross-sectional area of the enclosure, such that the cross-sectional area of the gaseous bubble occupies substantially the entire cross-sectional area of the enclosure as it flows along the bundle.

In another aspect, the present disclosure is directed to a membrane filter module configured to treat a liquid contained in a tank at an ambient pressure. The module may include a header and a bundle containing a plurality of substantially vertical hollow fiber membranes, wherein a lower end of each hollow membrane is fixed in the header. The module may also include a gasification device adapted to periodically generate a gaseous bubble and configured to release the gaseous bubble. The module may further include an enclosure that substantially surrounds the bundle that extends from a lower region to an upper region of the membrane bundle. The enclosure may be configured to retain the liquid introduced into the enclosure such that the liquid surrounds the membrane bundle, and retain the gaseous bubble introduced into the enclosure such that the gaseous bubble maintains contact with the bundle along the entire length of the bundle.

In another aspect, the present disclosure is directed to a method of operating a membrane filter module having hollow fiber membranes arranged in a substantially vertical orientation, that are immersed in a liquid in a tank. The method may include operating the module submerged in the liquid. The module may include a header and a bundle containing a plurality of hollow fiber membranes, wherein a lower end of each hollow fiber membrane is fixed in the header. The module may also include a gasification device adapted to periodically generate a gaseous bubble and configured to release the gaseous bubble within the bundle. The module may further include an enclosure that substantially surrounds the bundle that extends from a lower region to an upper region of the membrane bundle, wherein the enclosure is configured to retain the liquid introduced into the enclosure such that the liquid surrounds the membrane bundle. The method may also include applying a pressure that is less than an ambient pressure of the tank to a permeate collection chamber, that is in fluid communication with the hollow fiber membranes, wherein applying the pressure is configured to cause a portion of the liquid to pass through the hollow fiber membranes as permeate into the permeate collection chamber. The method may further include supplying a gas stream to the gasification device to produce the gaseous bubble. The gaseous bubble has a cross-sectional area that corresponds with a cross-sectional area of the enclosure, such that the cross-sectional area of the gaseous bubble occupies substantially the entire cross-sectional area of the enclosure as it flows along the bundle.

In another aspect, the present disclosure is directed to a method of scouring external surfaces of hollow fiber membranes arranged in a substantially vertical orientation that are immersed in a liquid in a tank. The method may include operating the module submerged in the liquid. The module may include a header and a bundle containing a plurality of hollow fiber membranes, wherein a lower end of each hollow fiber membrane is fixed in the header. The module may also include a gasification device adapted to periodically generate a gaseous bubble and configured to release the gaseous bubble within the bundle. The module may further include an enclosure that substantially surrounds the bundle that extends from a lower region to an upper region of the membrane bundle, wherein the enclosure is configured to retain the liquid introduced into the enclosure such that the liquid surrounds the membrane bundle. The method may also include applying a pressure that is less than an ambient pressure of the tank to a permeate collection chamber, that is in fluid communication with the hollow fiber membranes, wherein applying the pressure is configured to cause a portion of the liquid to pass through the hollow fiber membranes as permeate into the permeate collection chamber. The method may further include supplying a gas stream to the gasification device to produce the gaseous bubble, wherein the enclosure causes the gaseous bubble to maintain contact with the bundle along the entire length of the bundle.

In another aspect, the present disclosure is directed to a method of desludging a hollow fiber membrane module. The method may include temporarily ending a vacuum pressure applied to the module. The module may include a header and a bundle containing a plurality of hollow-fiber membranes, wherein a lower end of each hollow fiber membrane is fixed in the header. The module may also include a gasification device adapted to periodically generate a gaseous bubble and configured to release the gaseous bubble within the bundle. The module may further include an enclosure that substantially surrounds the bundle that extends from a lower region to an upper region of the membrane bundle, wherein the enclosure is configured to retain the liquid introduced into the enclosure such that the liquid surrounds the membrane bundle. The method may also include supplying a gas stream to the gasification device to generate a plurality of gaseous bubbles, wherein the gaseous bubble maintains contact with the bundle along the entire length of the bundle. The gaseous bubbles may desludge the hollow-fiber membranes by breaking apart and lifting the sludge up and out the top of the enclosure.

In another aspect, the present disclosure is directed to a gasification device for use with a membrane filter module submerged in a liquid. The device may include an outer sleeve coupled to a nozzle that defines a main chamber, wherein the main chamber has an open lower end. The device may also include a tube that extends within the main chamber such that a lower end of the tube is elevated above the lower end of the outer sleeve. The device may further include a bucket positioned outside the tube, within the main chamber, wherein a bottom of the bucket is below the lower end of the tube. The gasification device may be configured to pulse a gaseous bubble up through the tube into a bundle of the membrane filter module when the volume of a gas in the main chamber displaces a sufficient volume of the liquid and reaches the lower end of the tube.

BRIEF DESCRIPTION OF THE DRAWINGS

FIG. 19A is a side schematic cross-sectional view of an exemplary embodiment of a membrane row configured to a lower aeration tube.

FIGS. 22A, 22B, and 22C are cross-sectional and perspective views of a gasification device according to an exemplary embodiment.

FIGS. 23A, 23B, and 23C are side views of bundle bodies according to exemplary embodiments.

DETAILED DESCRIPTION

Figure 1:
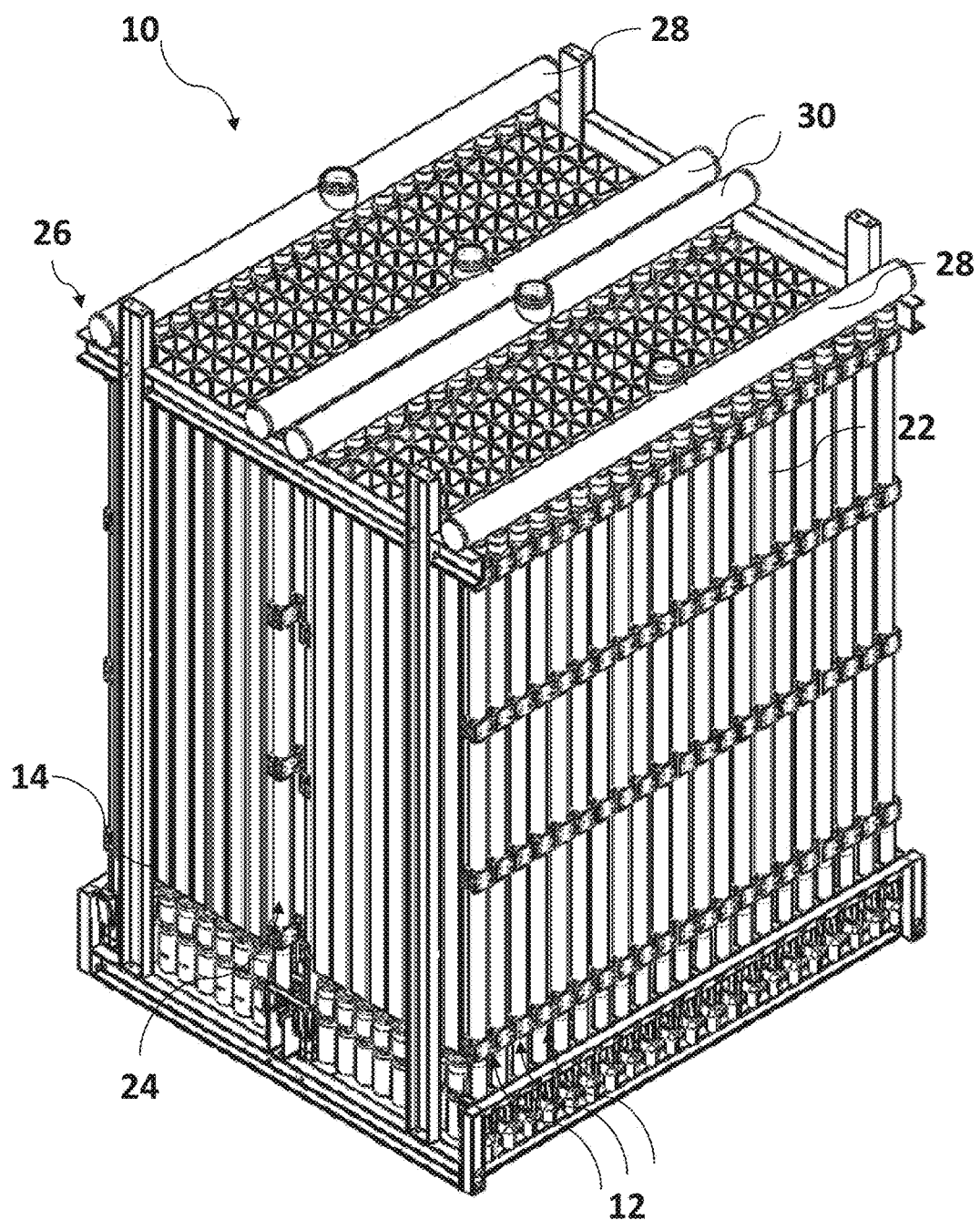
FIG. 1 is a perspective view of an exemplary embodiment of a membrane filter module.
Figure 2:
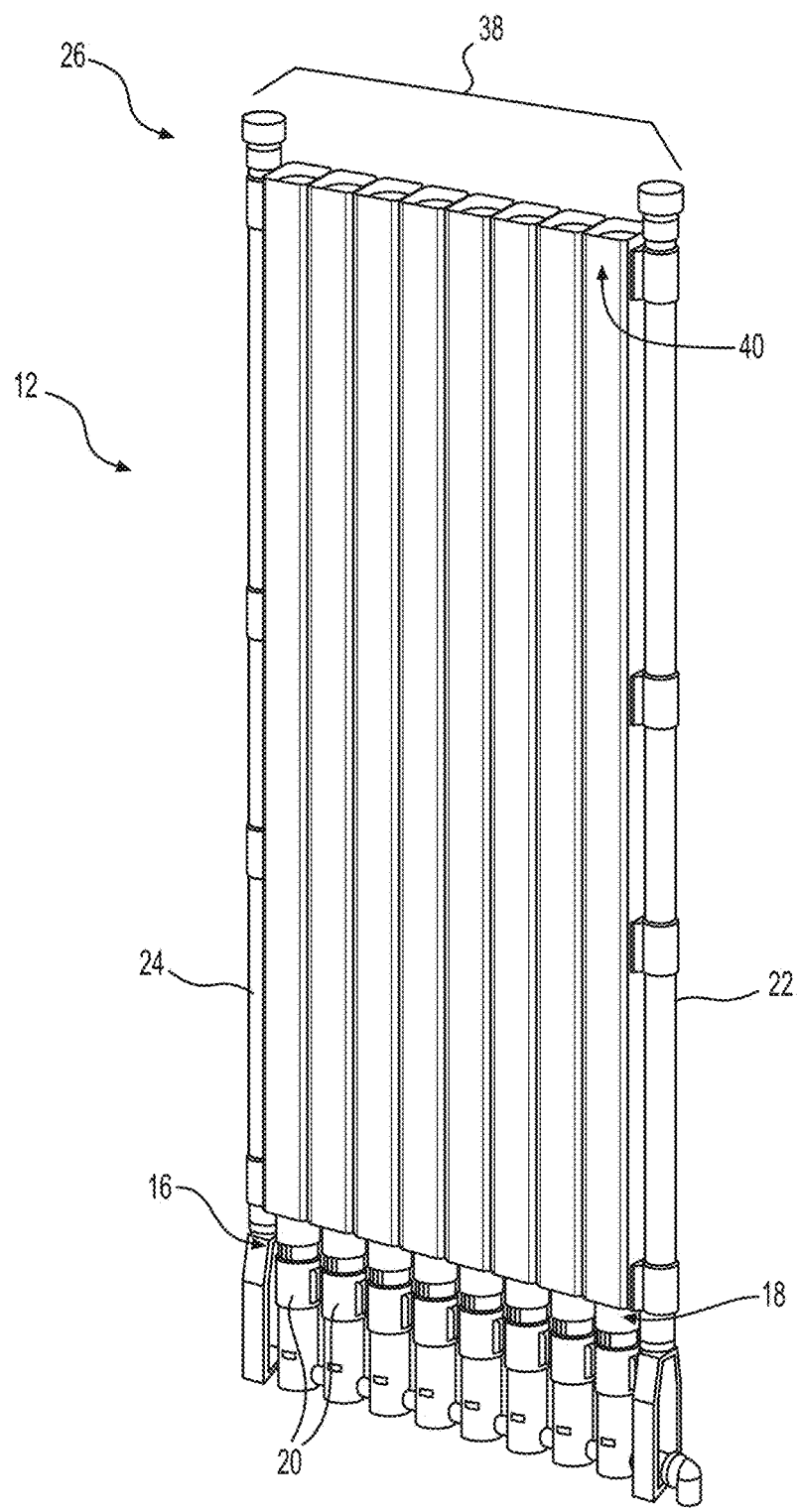
FIG. 2 is a perspective view of an exemplary embodiment of a membrane row.
Figure 3:
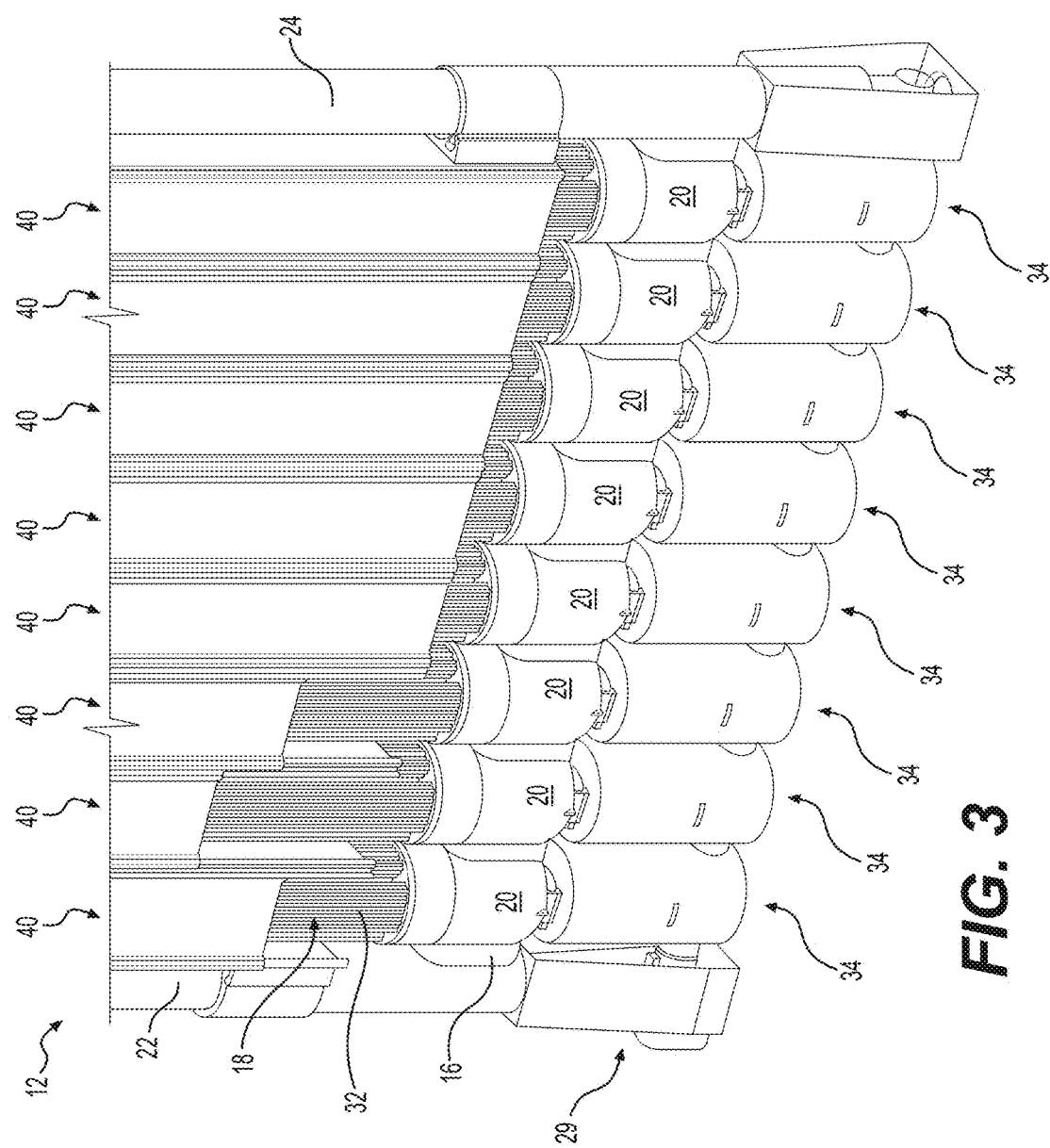
FIG. 3 is an enlarged perspective view of a portion an exemplary embodiment of a membrane row.

FIG. 1 illustrates an exemplary embodiment of a membrane filter module 10 configured for use in a membrane filtration system (not shown). Module 10 may include one or more membrane rows 12, which may be arranged in a frame 14, adjacent one another to form module 10. An individual membrane row 12, as shown in FIGS. 2 and 3, may include a header 16 having one or more hollow-fiber membrane bundles 18, attached to one or more bundle bodies 20 of header 16. Hollow-fiber membrane bundles 18 may include a plurality of hollow-fiber membranes 32, and are also referred to herein as fiber bundles. Each hollow fiber membrane 32 may have an external surface, a lower end fixed in header 16, and a sealed, freely movable upper end suspended by and adapted to float in a liquid in a tank.

An individual membrane row 12 may also include a permeate riser pipe 22 at one end and an aeration riser pipe 24 at the other end in fluid communication with header 16. As shown in FIG. 1, the permeate riser pipe 22 and the aeration riser pipe 24 may extend vertically from header 16 along the hollow-fiber membrane bundles 18 to an upper end 26 of membrane row 12 where permeate riser pipe 22 may be connected a permeate manifold 28 and aeration riser pipe 24 may be connected to an aeration manifold 30. Permeate manifold 28 and aeration manifold 30 may be configured to fluidly connect to any number of membrane rows 12 of module 10.

FIG. 3 shows a close up of a lower end 29 of an individual membrane row 12. As shown in FIG. 3, positioned below and in fluid communication with header 16 may be one or more gasification devices 34. Each gasification device 34 may be configured to receive a gas stream 36 supplied through aeration riser pipe 24. Using gas stream 36, each gasification device 34 may be configured to produce and release gaseous bubbles from a bundle body 20 of header 16. For example, gasification device 34 and header 16 may be configured to release gaseous bubbles into the center of each fiber bundle 18. Module 10 may be configured such that header 16 has one gasification devices 34 corresponding to each fiber bundle 18 and bundle body 20.

Figure 4A:
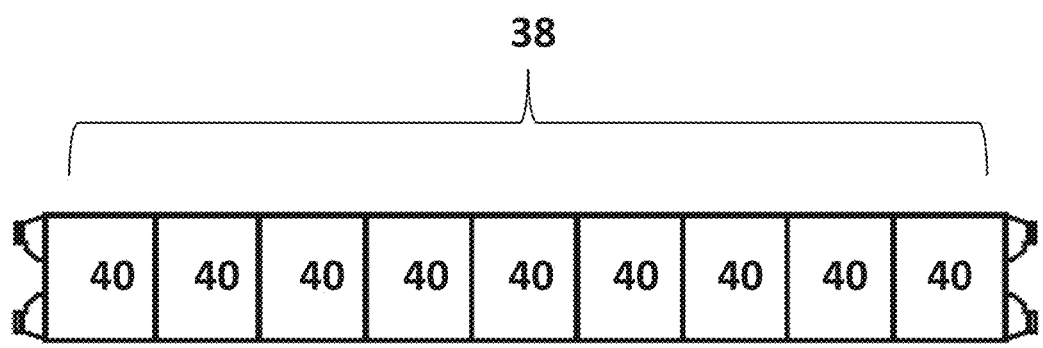
FIG. 4A is a top view of an exemplary bundle enclosure assembly.

Module 10 may also include a row enclosure assembly 38 that may include one or more bundle enclosures 40 corresponding to each fiber bundle 18. As shown in FIG. 2, row enclosure assembly 38 may be configured to couple to riser pipes 22, 24, for example, at each end of membrane row 12. Each bundle enclosure 40 may surround a fiber bundle 18 by extending from the lower end 29 to the upper end 26 of the corresponding fiber bundle 18, as shown in FIGS. 1 and 2. FIG. 4A is a top view of an exemplary row enclosure assembly 38 for an individual membrane row 12 of module 10, according to an exemplary embodiment. Row enclosure assembly 38 may include multiple bundle enclosures 40 adjacent one another across a width of membrane row 12. This particular embodiment includes nine bundle enclosures 40; however, more or less than nine bundle enclosures 40 may be included in row enclosure assembly 38 for membrane row 12. For example, a row enclosure assembly 38 may include 10, 11, 12, or more, and conversely 8, 7, 6, 5, or less, bundle enclosures depending on the number of fiber bundles 18 a membrane row 12 includes.

Figure 4B:
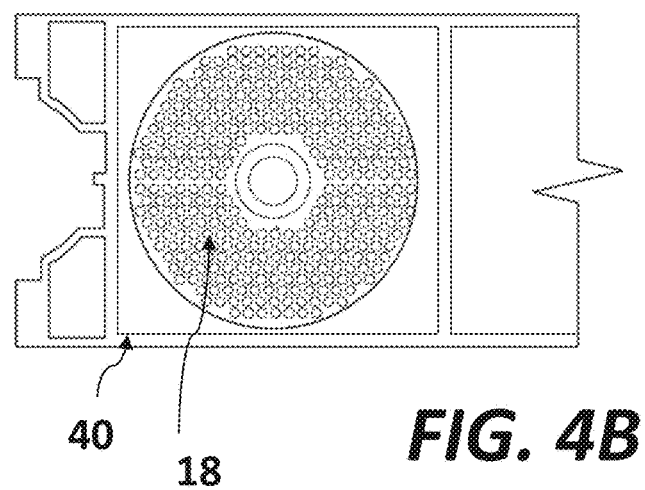
FIG. 4B is a top view of a portion of an exemplary bundle enclosure assembly and a fiber bundle.

FIG. 4B is an enlarged view of one bundle enclosure 40. An individual fiber bundle 18 may be positioned within each of the inner openings of each bundle enclosure 40. By surrounding each fiber bundle 18, the bundle enclosures 40 may be configured to retain a liquid introduced into each bundle enclosure 40 such that the liquid surrounds the corresponding fiber bundle 18. Fiber bundle 18 may be shown as having a generally circular shape when viewed from the top or bottom, as shown in FIG. 4B. However, fiber bundles 18 may have an outer shape besides a circle, for example, oval, rectangle, square, or other like shape.

Figure 5A:
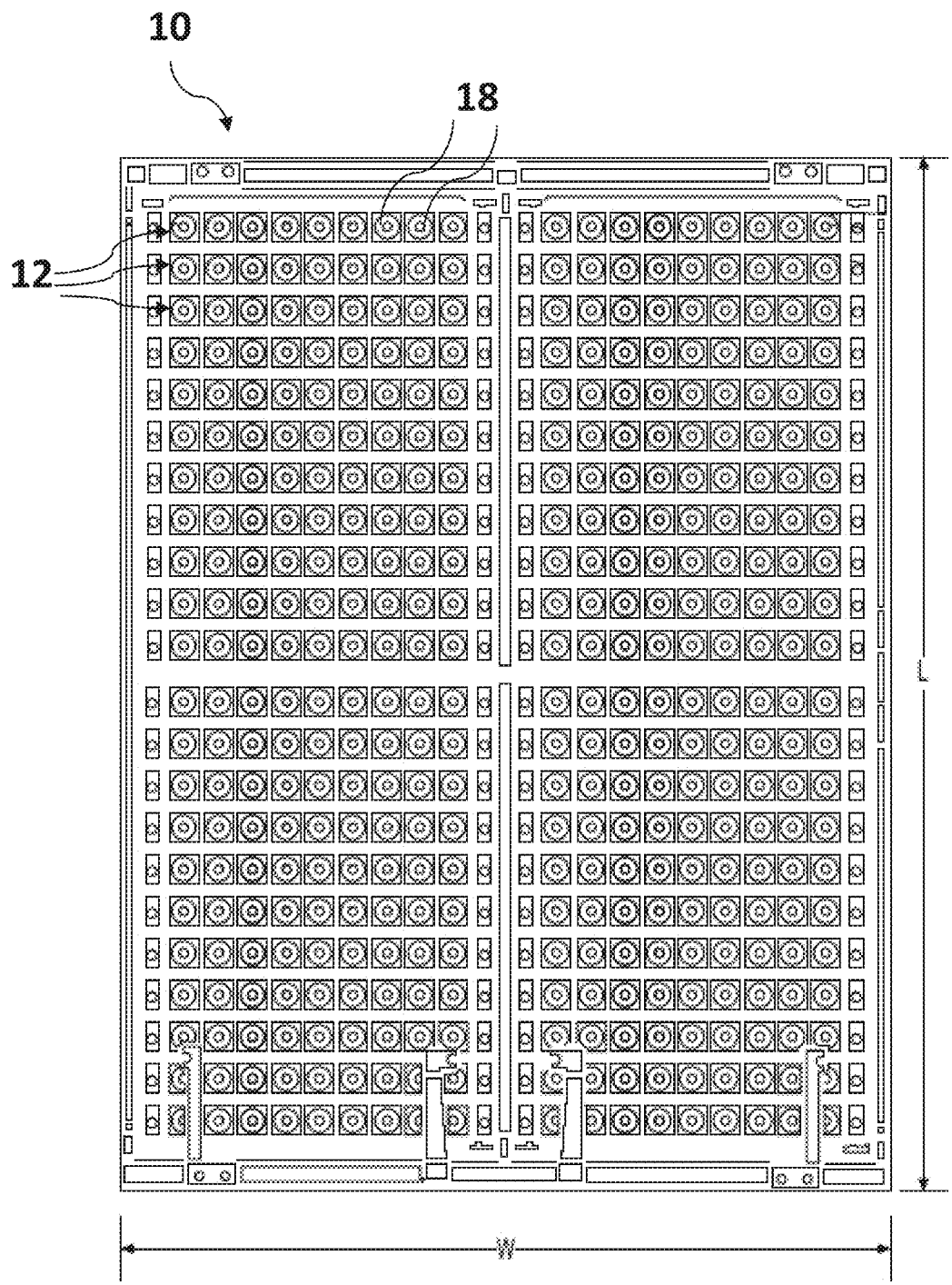
FIG. 5A is a top view of an exemplary embodiment of a membrane filter module.

As shown in FIG. 5, membrane rows 12 may be arranged adjacent one another to form module 10. The exemplary module 10 shown in FIG. 5 has a module length L and a module width W, wherein the number of membrane rows 12 creates the size and shape of the module array. In the exemplary embodiment shown in FIG. 5, module 10 includes two columns of 22 membrane rows 12 each, and each of the 44 rows includes nine fiber bundles 18, for a total of 396 fiber bundles 18 of hollow-fiber membranes 32 in this single exemplary module 10. For example, in embodiments in which each fiber bundle 18 contains 280 hollow-fiber membranes 32, the module 10 will contain 110,880 hollow-fiber membranes 32. Other filtration module configurations are contemplated. For example, in embodiments where each module 10 has 450 fiber bundles 18, each containing 364 hollow-fiber membranes 32, module 10 will include 163,800 hollow-fiber membranes 32.

Figure 5B:
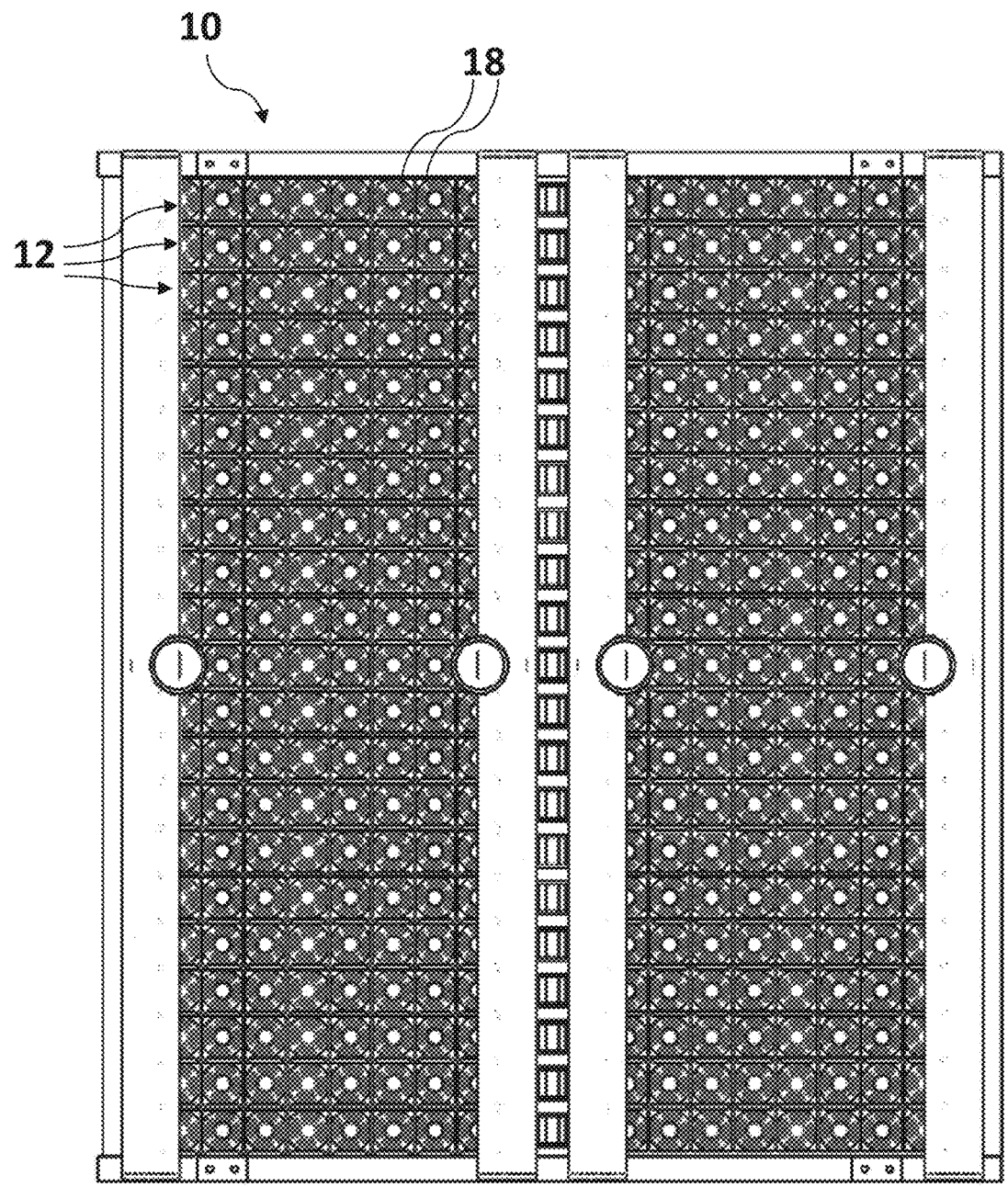
FIG. 5B is a top view of an exemplary embodiment of a membrane filter module.

In another exemplary embodiment, as shown in FIG. 5B, eight bundle enclosures 40 and fiber bundles 18 may be included in each membrane row 12. Please note a portion of each bundle enclosure 40 and fiber bundle 18 at each end of the membranes rows 12 is partially hidden due to the permeate manifolds 28 and aeration manifolds 30. In this configuration, module 10 includes two columns of 21 membrane rows 12 each, and each of the 42 rows includes eight fiber bundles 18, for a total of 336 fiber bundles 18 of hollow-fiber membranes 32 in this single exemplary module 10. For example, in embodiments in which each fiber bundle 18 contains 336 hollow-fiber membranes 32, the module 10 will contain 112,896 hollow-fiber membranes 32.

The active membrane area of each module 10 may vary, for example, with changes in the number of hollow-fiber membranes 32 in a bundle 18 (i.e., the packing density of a fiber bundle 18), the length of each hollow-fiber membrane 32 from a fiber plate surface to the start of a fiber tip seal as explained more detail herein, the size and number of fiber bundles 18, and the number of membrane rows 12 installed or used. According to some embodiments, the module 10 may be configured to operate with partial loading and/or may include membrane rows 12 added or removed, as desired.

The length of the hollow-fiber membranes utilized with a membrane row and module 10 may vary. In some embodiments the hollow-fiber membranes may be, for example, about 1.5 m to about 1.65 m, about 1.65 m to about 1.75 m, about 1.75 m to about 1.85 m, about 1.85 m to about 1.95 m, about 1.95 m to about 2.05 m, about 2.05 to about 2.15 m, about 2.15 m to about 2.25 m, about 2.25 m to about 2.35 m, about 2.35 m to about 2.45 m, about 2.45 m to about 2.55 m, about 2.55 m to about 2.65 m, or about 2.65 m to about 2.75 m.

The diameter of the hollow-fiber membranes utilized with a membrane row and module may vary. In some embodiments, the hollow-fiber membrane diameter may be, for example, from about 1 mm to about 5 mm or from 2 mm to about 3 mm. The fiber diameter may impact various factors regarding design and system performance. For example, the fiber diameter may affect packing density. More specifically, the larger the fiber diameter the smaller the number of fibers that may be packed into a bundle of the same cross-sectional area. Larger fibers may have greater membrane surface area per fiber, but overall membrane area per bundle may decrease due to less fibers being included per bundle of the same cross-sectional area. The rigidity of the fibers, which may be dependent on the fiber diameter, may affect the movement of the fibers during operation. The effect on the movement of the fibers may affect fouling characteristics. For example, fibers of greater diameter may be more rigid, which may reduce the range of motion during operation making the fiber surface more susceptible to fouling.

Membrane Module Operation Overview

Figure 6:
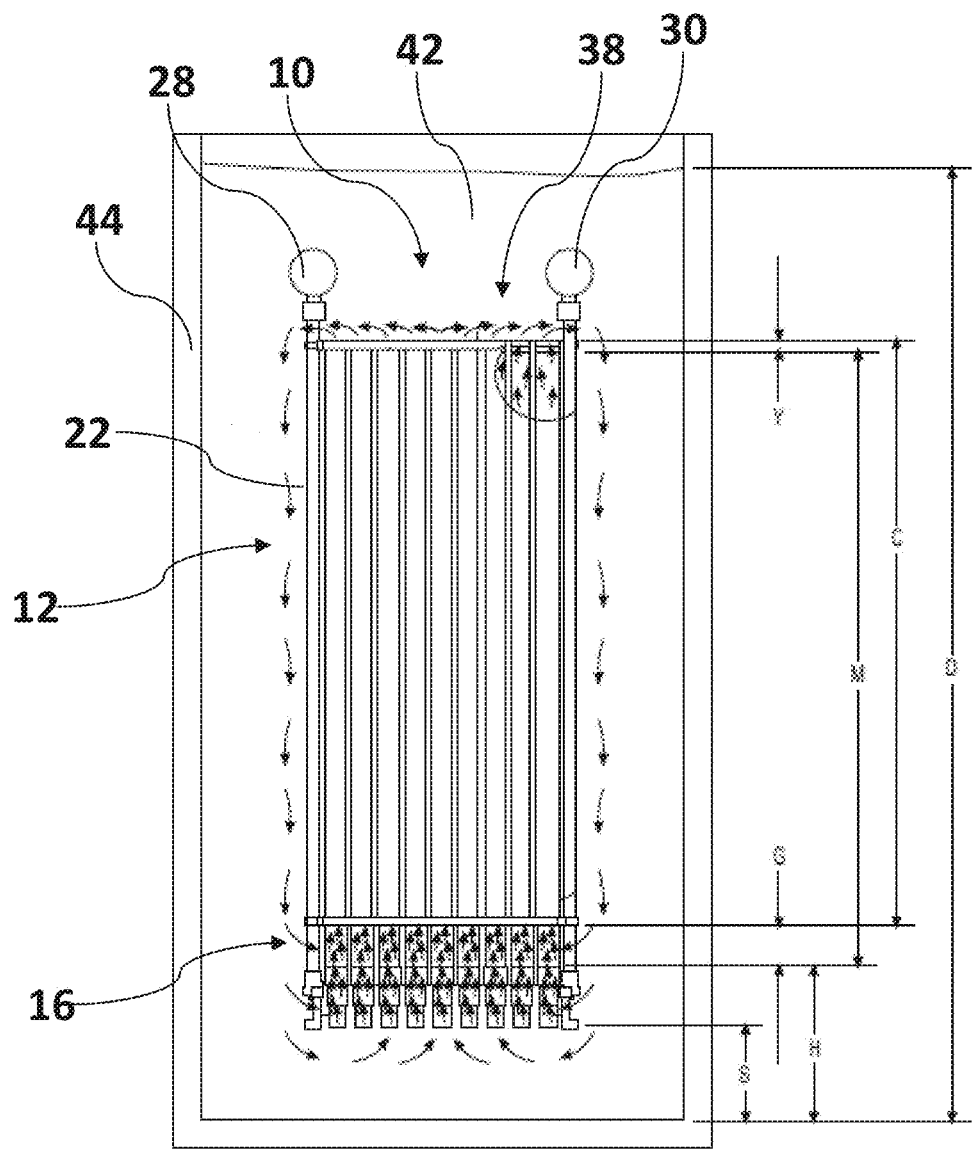
FIG. 6 is a side view of an exemplary embodiment of a membrane filter module submerged in a tank.

Module 10 as described herein may be used with a membrane filtration system to treat a liquid 42 containing solids (e.g., suspended solids) that is contained or held in a tank 44 or other container (e.g., basin, pool, reservoir, etc.) at ambient pressure. As shown in FIG. 6, module 10 may be positioned (e.g., suspended) within tank 44 and submerged in liquid 42. Module 10 shown in FIG. 6 may include any number of membrane rows 12. For example, module 10 may include 1, 2, 3, 4, 5, 6, 7, 8, 9, 10, 12, 14, 16, or more membrane rows 12.

As illustrated in FIG. 6, an exemplary tank 44 may be shown having a liquid depth D that is greater than a row enclosure assembly height C of module 10. The distance or space between the bottom of module 10 and the bottom of tank 44 may be referred to as a module space and is designated by the reference letter S. The portion of module 10 that includes active membrane material may have a height M that may be at least slightly larger than row enclosure assembly height C, wherein maximizing height M relative to row enclosure assembly height C can provide for the maximum amount of active membrane area for a particular module.

A portion at the bottom of the active membrane may be illustrated as a cage gap G, which can be determined to optimize the filtration performance of a given module. A height for cage gap G may be selected to provide a desired amount of influx of new liquid 42 (e.g., sludge) into membrane row 12, as this may be the only open area of membrane row 12 that is exposed to the incoming liquid 42. In other words, the selection of this cage gap G height is helpful in optimizing the performance of each membrane row 12 and module 10, and can be selected depending on a number of factors, including the speed at which filtration is desired to occur, the level of contamination of the incoming liquid 42 sludge, along with a number of additional factors. Cage gap G according to an exemplary embodiment may be greater than 0 and less than 6 inches in height, including between 1 and 5 inches in height. Cage gap G may be maintained with a gap spacer or other structural member that is placed below row enclosure assembly 38, if desired. In some embodiments, the cage gap G may be, for example, about 0.5 inches, 1 inch, 2 inches, 3 inches, 4 inches, 5 inches, or more.

A distance from the bottom of the cage gap to the bottom of tank 44 may be height H and referred to as the mixing zone of tank 44. The arrows shown in FIG. 6 schematically depict an exemplary flow path for liquid 42 in relation to module 10. As illustrated by the arrows, liquid 42 may flow up through row enclosure assembly 38 and out the top of module 10. From the top of module 10, liquid 42 may flow back down mixing along the way.

Figure 7:
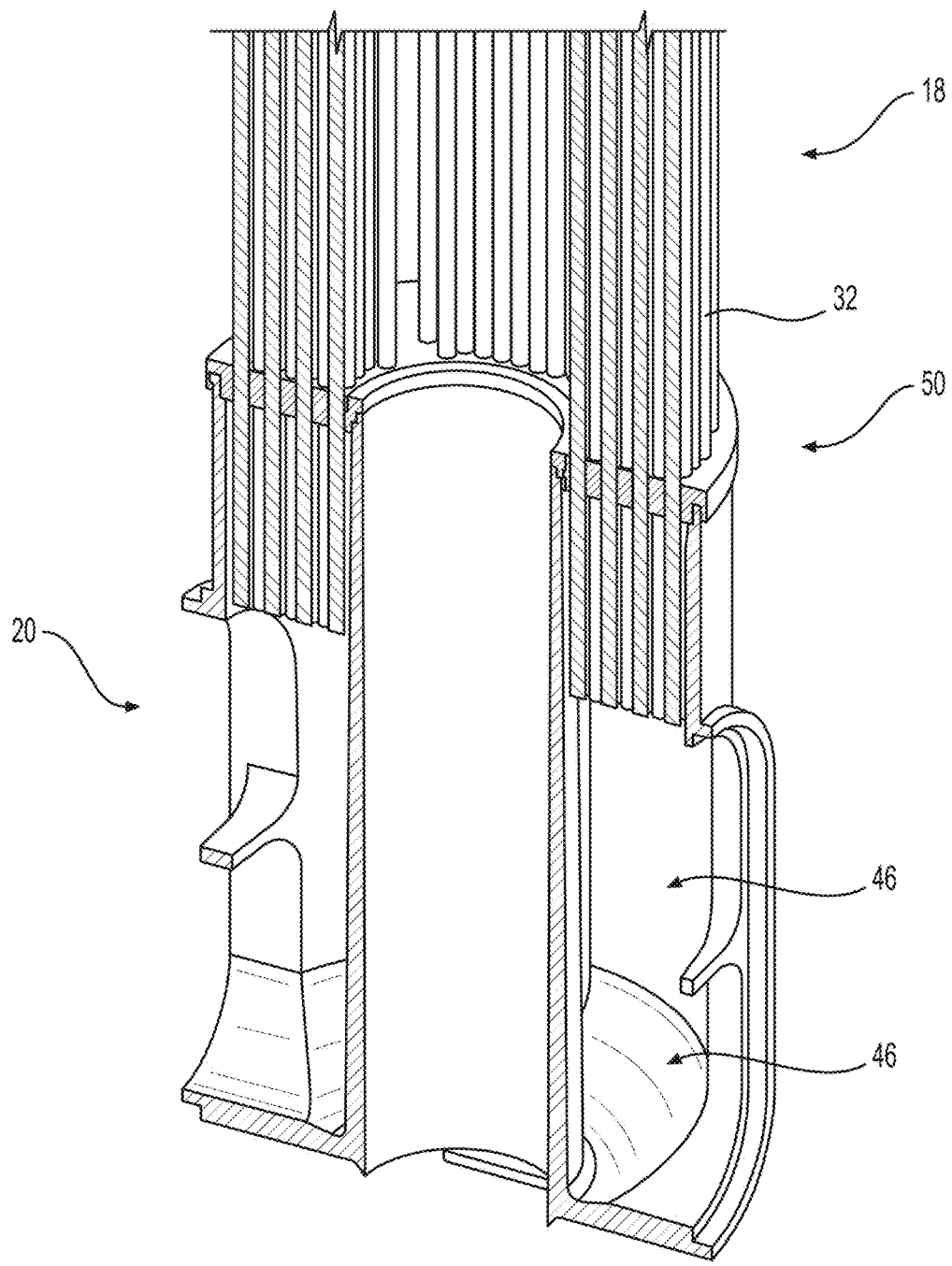
FIG. 7 is a side cross-sectional view of an exemplary bundle body and portion of a fiber bundle.

Pressure that is less than the ambient pressure i.e., a vacuum) may be applied to module 10 and across the fiber bundles 18 to cause filtration to occur. This pressure may be applied to each membrane row 12 of module 10 through permeate manifold 28 and permeate riser pipe 22, which may be in fluid communication with a permeate chamber 46 (see FIG. 7) within header 16. FIG. 7 shows a cross-section of one bundle body 20 of header 16 including a portion of permeate chamber 46, according to an exemplary embodiment. Permeate chamber 46 may be in fluid communication with the internal hollow cavities within the plurality of hollow-fiber membranes 32. Thus, when the internal cavities of hollow-fiber membranes 32 are subjected to differential pressure, a portion of liquid 42 surrounding the fiber bundle 18 will pass through pores of the hollow-fiber membranes 32 and will be filtered to produce a clarified liquid (permeate), which may then be collected. At least some of the solid material from the previously untreated liquid 42 may be retained on the side of hollow-fiber membranes 32 or get retained in the pores of hollow-fiber membranes 32. The permeate may be drawn by the pressure through permeate chamber 46 of header 16, up through permeate riser pipe 22 (see e.g., FIG. 2), and out the permeate manifold 28 (see e.g., FIG. 1).

In some embodiments, header 16 as shown in FIGS. 1-2 may be formed of a plurality of bundle bodies 20 stacked adjacent one another. For example, header 16 according to some embodiments may be formed of one, two, three, four, five, six, seven, eight, nine, or more bundle bodies 20 stacked adjacent each other. According to some embodiments, the diameter of the bundle bodies 20 and the corresponding diameter of fiber bundles 18 and the number or diameter of the hollow-fiber membranes 32 may increase or decrease depending on the number of bundle bodies 20 making up a membrane row 12.

To limit or reduce the buildup of solids at the surface of hollow-fiber membranes 32 as well as to facilitate circulation of liquid 42, gaseous bubbles may be released from the one or more gasification devices 34. The gaseous bubbles may pass along the hollow-fiber membranes 32 thereby introducing new liquid 42 while also scouring the surface of the hollow-fiber membranes 32 and controlling the buildup of solids at the surface. This process of releasing gaseous bubbles to the hollow-fiber membranes 32 may be referred to herein as aeration or air scouring.

Gasification Device Design and Operation

There are a variety of methods and gasification devices that may be used for aeration of hollow-fiber membranes 32. For example, methods of aeration may include continuous aeration, intermittent aeration, and pulsed aeration. Continuous aeration may include aeration in which a substantially continuous stream of small bubbles is released continuously from each gasification device to scour the surface of the hollow-fiber membranes 32. Intermittent aeration may include aeration in which a substantially continuous stream of small bubbles is released for a period (e.g., cycled on and off) from each gasification device to scour the surface of hollow-fiber membranes 32 when gas stream 36 is supplied to module 10. Traditionally, intermittent aeration has been the conventional method of aeration utilized for cleaning submerged membranes. For example, U.S. Pat. No. 6,245, 239 discloses a cyclic aeration for submerged membranes modules.

Intermittent aeration has been preferred over continuous aeration due to the energy saving, which may be achieved by not aerating all the membranes continuously and still maintain satisfactory performance. More recently, pulsed aeration has been introduced in which periodically a larger bubble may be released from the gasification device to scour the surface of the hollow-fiber membranes 32 when gas stream 36 is supplied to module 10. For pulsed aeration, gas stream 36 may be supplied to the gasification devices continuously and the rate at which a larger bubble is released is dependent on the flow rate of gas stream 36.

Intermittent Aeration Gasification Device

Figure 8:
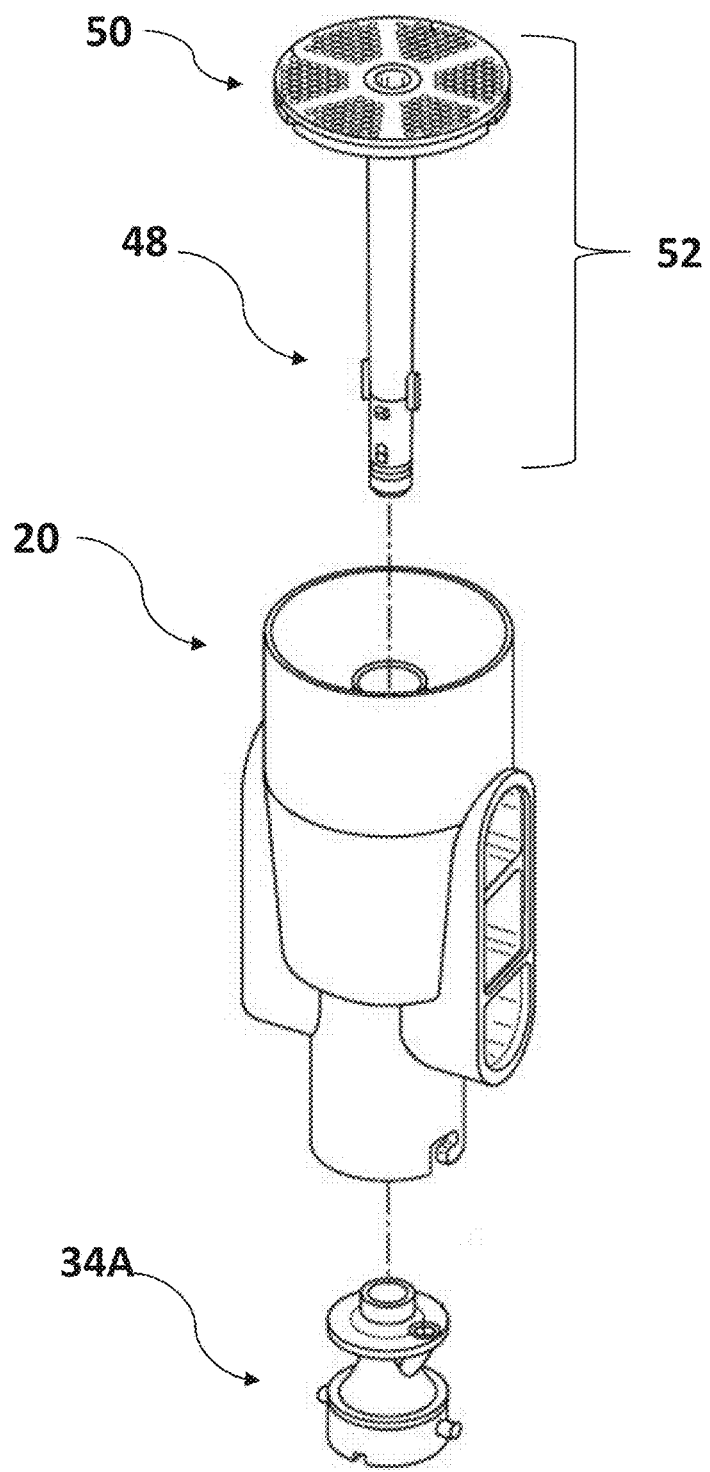
FIG. 8 is an assembly view of exemplary embodiments of components related to a fiber bundle assembly.

One embodiment of a gasification device 34A configured for intermittent aeration is shown in FIG. 8. FIG. 8 is an exploded assembly view showing gasification device 34A, one embodiment of an individual bundle body 20, an aeration tube 48, and a fiber plate 50. Fiber plate 50, aeration tube 48, and hollow-fiber membranes 32 (not shown) can comprise a fiber bundle assembly 52.

Figure 9:
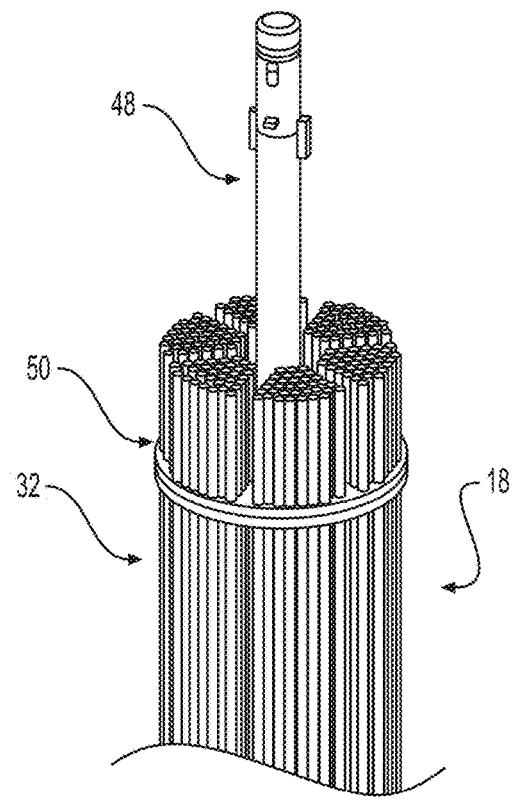
FIG. 9 is an inverted partial perspective view of a portion of an exemplary embodiment of a fiber bundle assembly.
Figure 10:
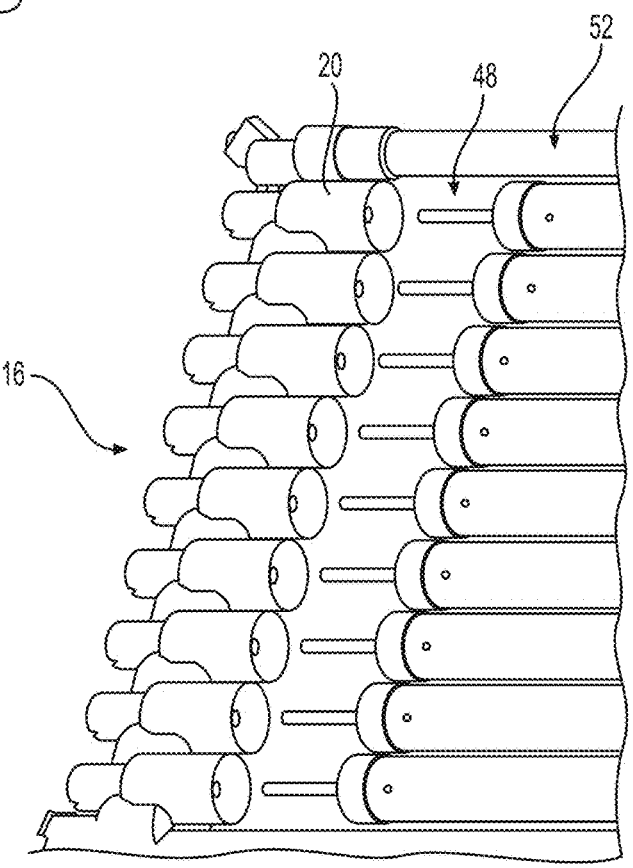
FIG. 10 is a perspective view of a portion of an exemplary membrane row.

FIG. 9 shows bundle 18, fiber plate 50, and aeration tube 48 from FIG. 8 in an assembled condition and inverted such that aeration tube 48 extends beyond the hollow-fiber membranes 32. As shown in FIG. 9, each of the plurality of hollow-fiber membranes 32 may extend through a corresponding hole in fiber plate 50. FIG. 10 illustrates multiple fiber bundle assemblies 52 with extending aeration tubes 48 that are positioned relative to their respective bundle bodies 20, which in turn may be positioned in header 16 of membrane row 12.

Figure 11:
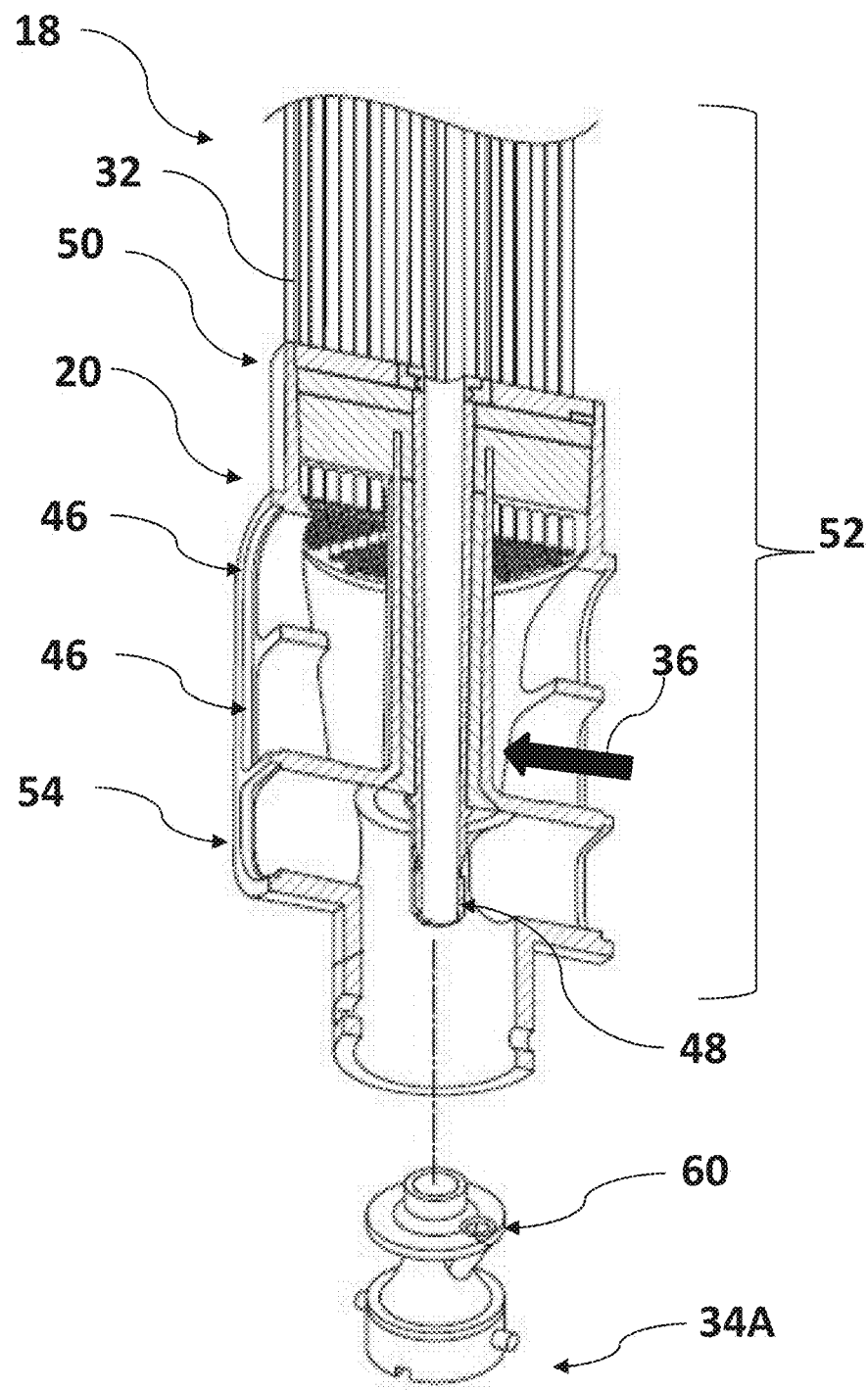
FIG. 11 is an inverted partial perspective section view of an exemplary embodiment of a bundle body and fiber bundle assembly.

FIG. 11 is a cross-sectional perspective view that shows a bundle body 20 in its assembled position relative to fiber bundle assembly 52, and additionally illustrates aeration tube 48 engaged with bundle body 20. In particular, the outer surface of aeration tube 48 is provided with structure (e.g., an extending circular flange) that can engage with an inner structure of bundle body 20 to lock the components relative to each other. As shown, aeration tube 48 may extend through the center of bundle body 20, with one of its ends positioned within an aeration chamber 54 that may be located near a distal end of aeration tube 48. As shown, bundle body 20, may also include at least one permeate chamber 46.

Alternatively, in some embodiments of bundle body 20 (e.g., FIGS. 7 and 11) aeration tube 48 may stop within the potting material just below fiber plate 50. In this configuration (not shown), the fiber plate can be modified to accommodate the gap left between the aeration tube 48 and the fiber bundle 18. Another option is to insert a releasable potting plug between the aeration tube 48 and the fiber plate 50, which acts as a seal to prevent potting material from entering the aeration tube. Once the potting material hardens, the potting plug is removed. FIG. 11 is shown with gasification device 34A uncoupled, but gasification device 34A may be rotatably coupled to bundle body 20. In other embodiments, not shown in FIG. 11, gasification device can be attached to bundle body using other traditional means, such as adhesive, fasteners, latches, friction fit, or thread-screw lock. When coupled to bundle body 20, gasification device 34A may receive gas stream 36 from aeration chamber 54 via an orifice 60 and direct gas stream 36 into the center of gasification device 34A, which is in fluid communication with aeration tube 48. Thus, when gas stream 36 is supplied to gasification device 34A, gasification device 34A may produce a generally continuous stream of small bubbles that may be released into the center of fiber bundle 18 via aeration tube 48.

The intermittent aeration process may include supplying gas stream 36 intermittently for a specific period of time to gasification device 34A via aeration chamber 54, and then stopping gas stream 36. For example, according to one embodiment, aeration may be turned on for a time of about 120 seconds to 24 hours, and then it may be stopped for a period of just more than 0 seconds to about 120 seconds. Depending on the length of time the aeration is turned on or activated, the cycle can be repeated at least once and possibly many times throughout each 24-hour period.

Pulsed Aeration

Figure 13:
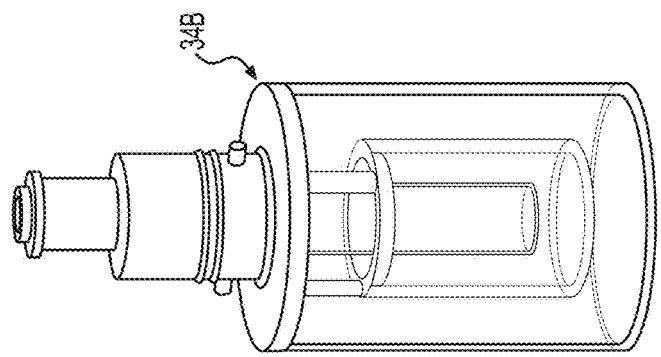
FIG. 13 is a perspective view of the gasification device of FIG. 12.
Figure 12:
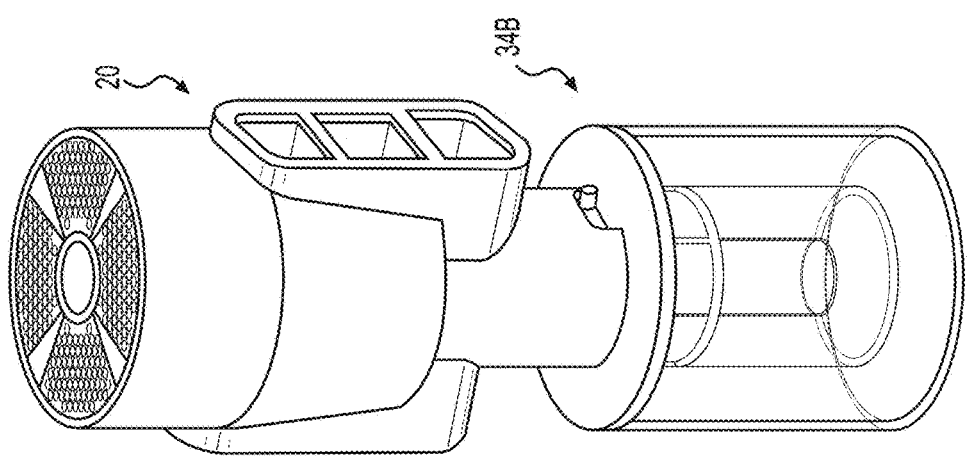
FIG. 12 is a perspective view of a bundle body and an exemplary gasification device.

For pulsed aeration, gas stream 36 may be supplied to a gasification device continuously or intermittently. But unlike intermittent aeration, the gasification device may be configured such that a large gaseous bubble may be released periodically rather than a plurality of smaller gaseous bubbles being released continuously while gas stream 36 is supplied. FIGS. 12 and 13 illustrate one exemplary embodiment of a gasification device 34B configured for pulsed aeration. FIG. 12 illustrates gasification device 34B attached to bundle body 20 while FIG. 13 illustrates gasification device 34B uncoupled from bundle body 20. Additional embodiments of gasification devices for pulsed aeration are disclosed herein and will also be described in detail.

Figures 14A, 14B, 14C:
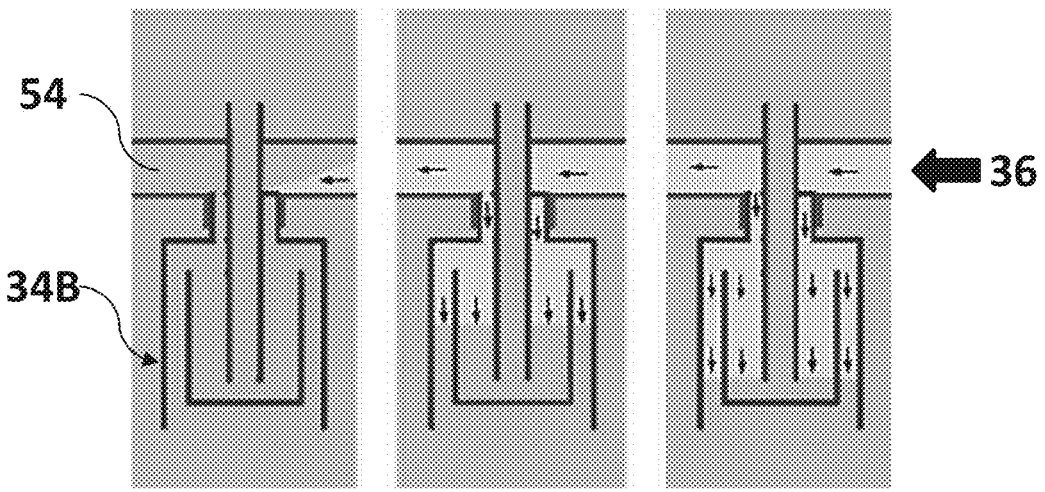
FIG. 14A-14C illustrate the air intake cycle for generating a gaseous bubble in the gasification device of FIG. 12.
Figures 15A, 15B, 15C:
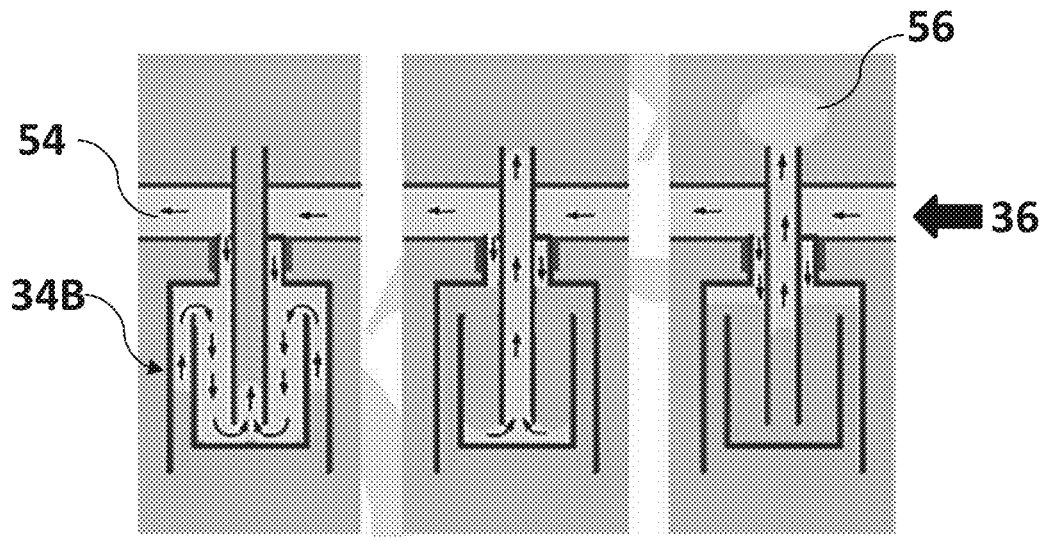
FIG. 15A-15C illustrate the exhaust cycle for generating a gaseous bubble in the gasification device of FIG. 12.

The process by which pulsed aeration may be carried out is illustrated by FIGS. 14A-14C and 15A-15C. FIGS. 14A-14C illustrate an intake cycle while FIGS. 15A-15C illustrate an exhaust cycle for a pulsed aeration gasification device 34B. The structure of gasification device 34B as shown in FIGS. 14A-14C and 15A-15C corresponds with the embodiment shown in FIGS. 12-13. However, the structure is for illustrative purposes only and the process of pulsed aeration as described and illustrated herein is not limited to gasification device 34B, but rather is generally applicable to all the pulsed aeration gasification devices including those disclosed herein.

As shown in FIGS. 14A-14C, gas stream 36 may be supplied to gasification device 34B and the gas may fill the interior working volume of gasification device 34B. In some embodiments, gas stream 36 may be supplied to each gasification device 34 via an aeration chamber 54 or an aeration tube (not shown) that is positioned below the gasification device 34, as described in detail further herein. The liquid level within gasification device 34B may be displaced downward by the gas until it reaches the bottom open end of the tube. As shown in FIGS. 15A-15C, by breaking the hydraulic seal, substantially all of the volume of air collected in the interior working volume may be drawn rapidly up through the tube causing a pulse of air to exit from the upper end of the tube as a large gaseous bubble 56.

Concentric Gasification Device

Figure 16:
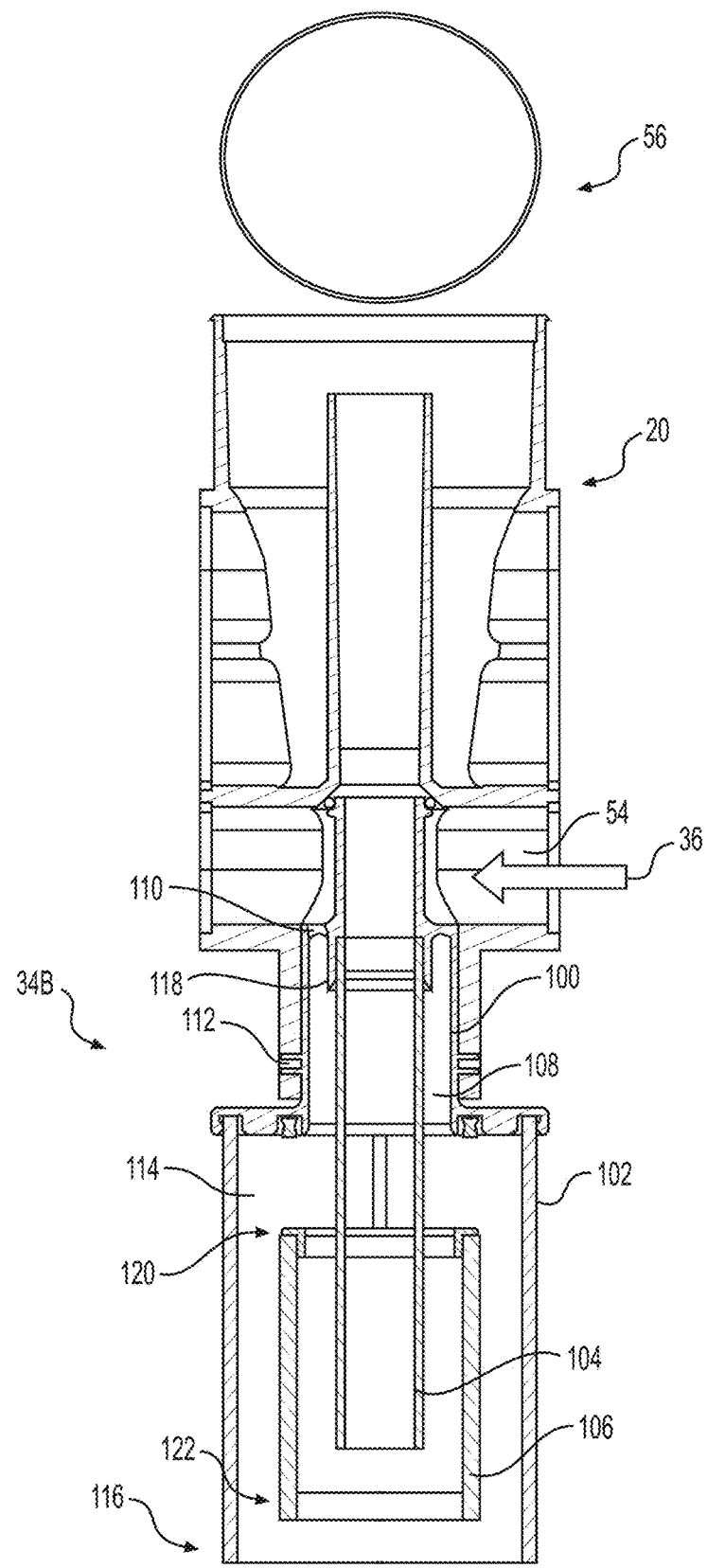
FIG. 16 is a cross-sectional view of a bundle body and the gasification device of FIG. 12.

FIG. 16 illustrates a cross sectional view of gasification device 34B configured for pulsed aeration, coupled to a bundle body 20 (hollow-fiber membranes 32 are not shown). Gasification device 34B may be referred to herein as the concentric gasification device. As shown in FIG. 16, concentric gasification device 34B may have a nozzle 100, an outer sleeve 102, a tube 104, and a bucket 106. Nozzle 100 may define a feed chamber 108 and a throttle 110 configured to receive gas stream 36 from aeration chamber 54 into the feed chamber 108. In some embodiments, nozzle 100 may be configured to releasably and rotatably couple to bundle body 20. Nozzle 100 may have, for example, one or more tabs 112 that extend out from nozzle 100 and are configured to engage slots in bundle body 20.

Outer sleeve 102 may be coupled to nozzle 100 and configured to define a main chamber 114. Main chamber 114 may be in fluid communication with feed chamber 108. Outer sleeve 102 may form a generally cylindrical shape having an open lower end 116. In other embodiments, outer sleeve 102 may define other shapes, for example, square, oval, rectangle, ellipsis, etc.

As shown in FIG. 16, tube 104 may be configured to couple to nozzle 100, for example, by insertion into a recess 118 of nozzle 100. In some embodiments tube 104 may be fixed or integral to nozzle 100. Tube 104 may extend down from recess 118 through feed chamber 108 and into main chamber 114. Tube 104 may extend into main chamber 114 a distance above lower end 116 of outer sleeve 102. Lower end 116 of tube 104 may be open to main chamber 114.

As shown in FIG. 16, bucket 106 may be positioned outside tube 104 within main chamber 114. Bucket 106 may be configured to attach to tube 104, outer sleeve 102, and/or nozzle 100 and may be concentric to tube 104, outer sleeve 102, and bundle body 20. An upper end 120 of bucket 106 may be open to main chamber 114 and a cap 122 of bucket 106 may be sealed. Cap 122 of bucket 106 may be positioned below tube 104 so the volume defined by bucket 106 may be in fluid communication with tube 104. Cap 122 of bucket 106 may also be elevated above lower end 116 of outer sleeve 102, as shown in FIG. 16. The various components of gasification device 34B may be sized such that when viewed from above or below, gasification device 34B is contained within a footprint of bundle body 20.

When gas stream 36 is not supplied to gasification device 34B, main chamber 114 and feed chamber 108 can flood with liquid 42 (not shown) introduced via the open lower end 116 of outer sleeve 102. When gas stream 36 is supplied to aeration chamber 54, gas may flow through throttle 110 into feed chamber 108 and main chamber 114 and displace liquid 42. When the volume of gas in main chamber 114 displaces a sufficient volume of liquid 42 such that the level of liquid 42 reaches the lower end of tube 104, the hydraulic seal may be broken and the volume of air collected in feed chamber 108 and main chamber 114 may be drawn (e.g., siphoned) up through tube 104 as a pulse of air and the pulse of air may be released as gaseous bubble 56 from bundle body 20. Gaseous bubble 56 may be released from the center of bundle body 20 into the center of fiber bundle 18 (not shown).

Offset Gasification Devices

Figure 17:
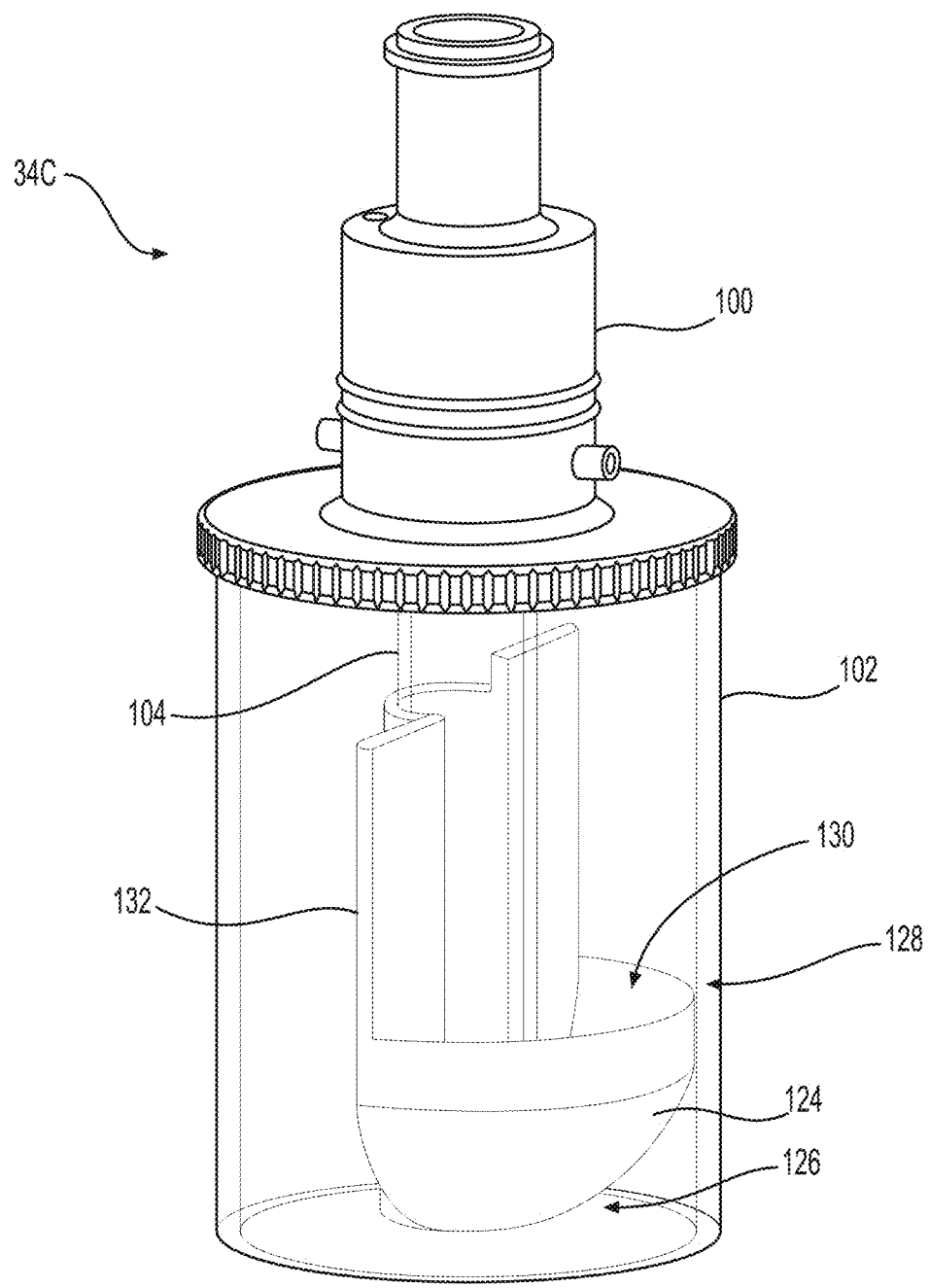
FIG. 17 is perspective view of an exemplary gasification device.

FIG. 17 shows a gasification device 34C, according to another embodiment, configured for pulsed aeration. This embodiment may be referred to herein as the 180 degree offset gasification device 34C. Gasification device 34C may be similar to the concentric gasification device as described herein. More specifically, gasification device 34C may include the same or substantially similar nozzle 100, outer sleeve 102, and tube 104. The primary difference between concentric gasification device 34B and 180 degree offset gasification device 34C may be the bucket. Gasification device 34C may include a bucket 124, but as shown in FIG. 17, bucket 124 may be different than bucket 106 of concentric gasification device 34B.

Figure 18:
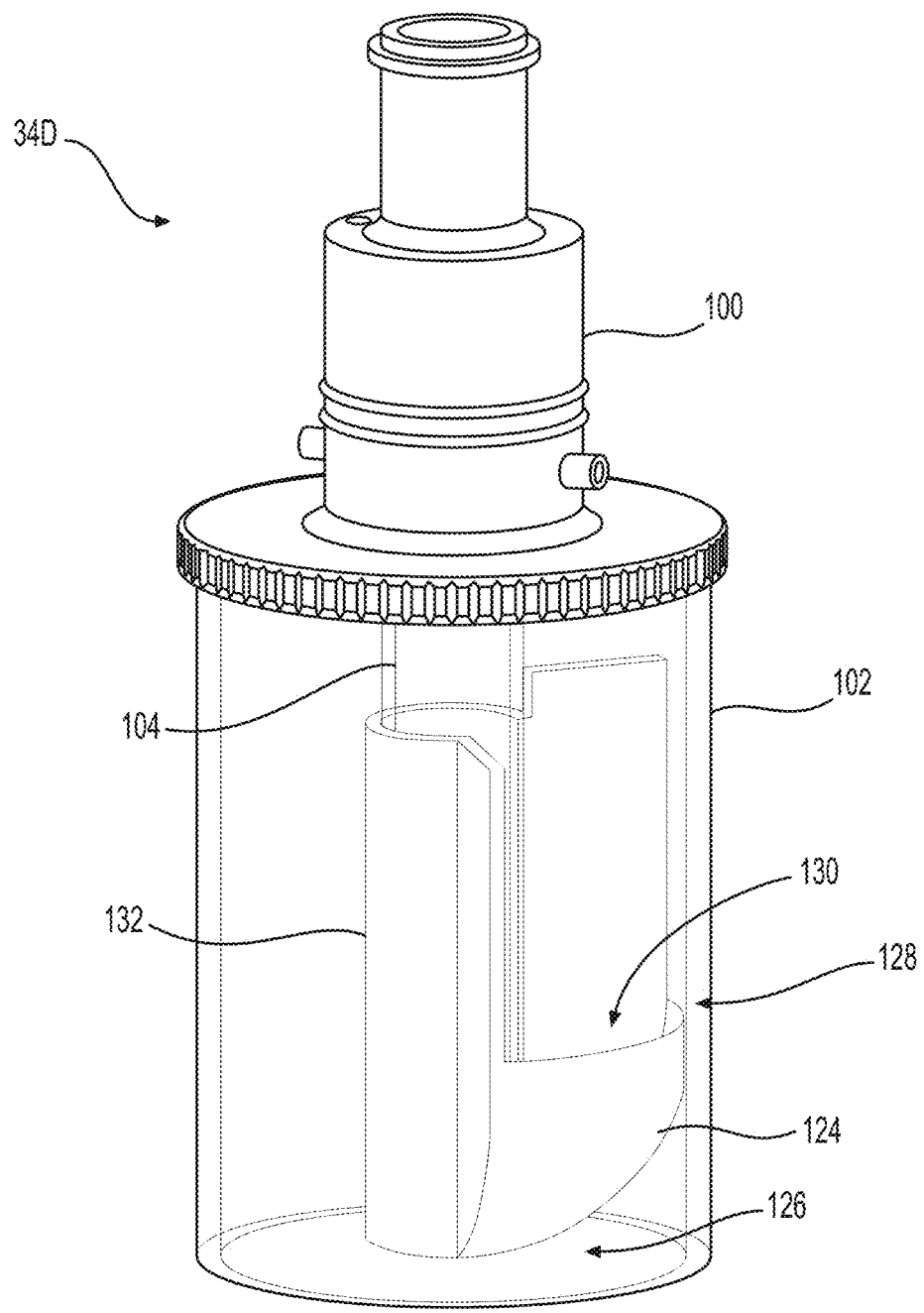
FIG. 18 is perspective view of an exemplary gasification device.

Bucket 124, as shown in FIG. 17, may have a closed bottom 124 and an open top 128. Bucket 124 may be configured to define a generally bowl shaped chamber 130. An inner surface of the bowl shaped chamber may be concave moving from top 128 to bottom 126. Bucket 124 may also be configured such that chamber 130 extends only a portion of the way around tube 104. For example, as shown in FIG. 17, chamber 130 may extend about 180 degrees around the circumference of tube 104. In other embodiments, chamber 130 may extend more than 180 degrees or less than 180 degrees around tube 104. For example, FIG. 18 illustrates another embodiment of a gasification device 34D configured for pulsed aeration. This embodiment may be referred to herein as the 100 degrees offset gasification device 34D. Gasification device 34D may be configured the same or substantially similar to gasification device 34C, but chamber 130 may extend about 100 degrees around tube 104. As shown in FIGS. 17 and 18, bucket 124 may have a side wall 132 that wraps around tube 104 and extends radially from the outer surface of tube 104 to an inner surface of outer sleeve 102. Side wall 132 may be configured to extend from bottom 126 to the top of chamber 130 or as shown in FIGS. 17 and 18, side wall 132 may extend up beyond top 128 of the bowl towards nozzle 100. In some embodiments, for example as shown in FIG. 17, each side of side wall 132 may be at a different height from top 128. Having side walls 132 of different height causes liquid 42 to first enter chamber 130 of bucket 124 from one direction over the lower of the two side walls 132 and then liquid enters from the opposite direction over the higher of the two side walls 132. Having liquid 42 enter bucket 124 first from one direction and then adding a second direction can increase the turbulence within bucket 124. The increased turbulence can help with removing debris from bucket 124.

It is contemplated that in other embodiments, one or more of the components (e.g., nozzle 100, outer sleeve 102, tube 104, and buckets 106 and 124) of gasification devices 34A, 34B, and 34C may be altered, combined, or modified. For example, in other embodiments, nozzle 100, outer sleeve 102, and tube 104 may all be one continuous piece.

Lower Aeration

In some exemplary embodiments of membrane row 12, gas stream 36 may be supplied to the gasification devices 34 (e.g., 34B, 34C, and 34D) via a lower aeration tube rather than supplying gas stream 36 through aeration chamber 54 of header 16. For example, as shown in FIG. 19A, membrane row 12 may be configured such that gas stream 36 may be directed from aeration riser pipe 24 through an aeration foot 62 to a lower aeration tube 64. Lower aeration tube 64 may extend from one side of membrane row 12 to the other side. In some embodiments, as shown in FIG. 19A, lower aeration tube 64 may pass through a lower portion of the gasification devices 34. In some embodiments, lower aeration tube 64 may be configured to pass below the gasification devices 34. As shown in FIG. 19A, lower aeration tube 64 may include a flush leg 66 at the end opposite end where gas stream 36 may be supplied.

Figure 19C:
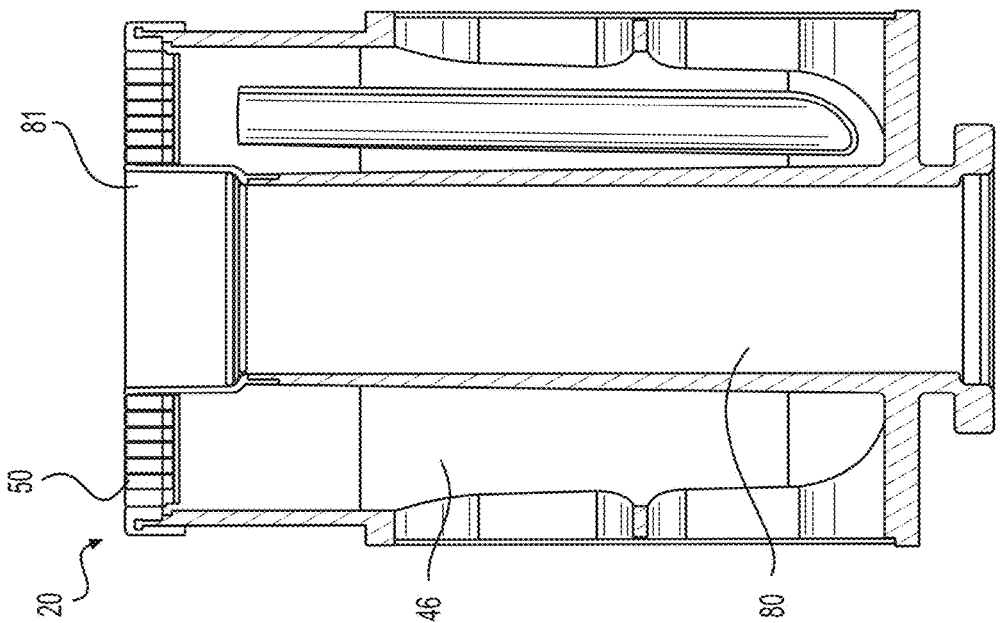
FIG. 19C is a side cross-sectional view of another exemplary embodiment a bundle body configured for a lower aeration tube.
Figure 19B:
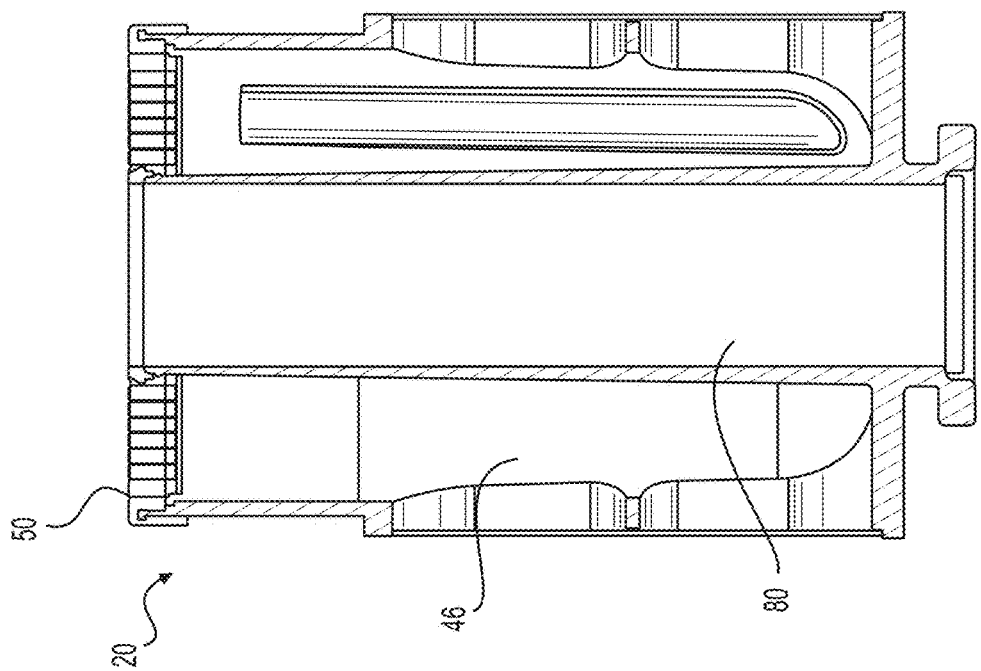
FIG. 19B is a side cross-sectional view of an exemplary embodiment of a bundle body configured for a lower aeration tube.

As shown in FIG. 19A, for embodiments utilizing a lower aeration tube 64, aeration chamber 54 may be eliminated from bundle bodies 20 thereby enabling an increase in permeate chamber 46. For example, as shown in FIG. 19A, each bundle body 20 may include a single chamber (i.e., a permeate chamber) that is in fluid communication with the hollow interiors of the hollow-fiber membranes 32 and permeate riser pipe 22. FIG. 19B shows a cross-sectional view of an individual bundle body 20, which may include a single chamber (i.e., permeate chamber 46) that is in fluid communication with the hollow interiors of the hollow-fiber membranes 32 (not shown in FIG. 19B). As shown in FIG. 19B, an aeration tube 80 may extend from the bottom of bundle body 20 through permeate chamber 46 up through fiber plate 50 configured to direct gaseous bubbles 56 through bundle body 20. In some embodiments, bundle body 20 may be configured to include an expansion chamber at an upper region of bundle body 20. For example, FIG. 19C shows another exemplary embodiment of bundle body 20, which includes an expansion chamber 81. As shown in FIG. 19C, expansion chamber 81 may have a greater diameter than that of aeration tube 80. The increased diameter of expansion chamber 81 may be configured to allow gaseous bubbles 56 to expand before they exit bundle body 20. Expansion chamber 81 may be configured to releasably couple (e.g., snap) to an upper end of aeration tube 80, as shown in FIG. 19C. In this configuration, the upper end of the aeration tube stops within the potting material and does not pass through. Further, expansion chamber 81 may be integrated into fiber plate 50.

Figure 19F:
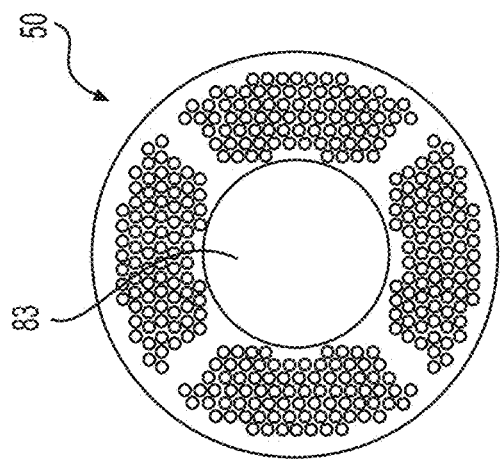
FIG. 19F is an exemplary embodiment of a fiber plate.
Figure 19E:
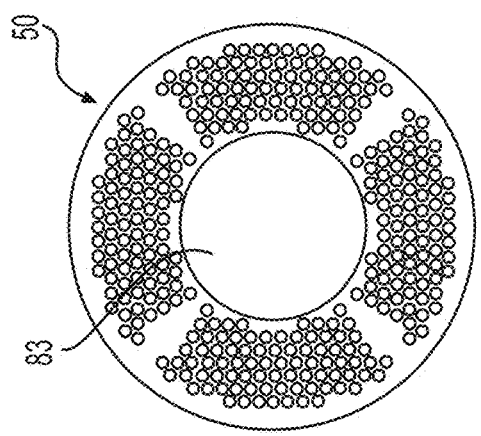
FIG. 19E is an exemplary embodiment of a fiber plate.
Figure 19D:
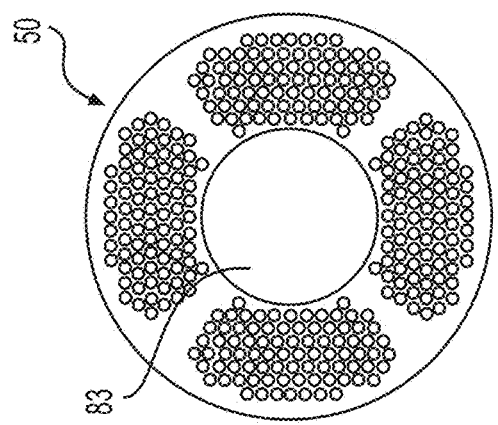
FIG. 19D is an exemplary embodiment of a fiber plate.

The configuration and arrangement of fiber holes for fiber plate 50, utilized in conjunction with the embodiment of bundle body 20, as shown FIG. 19B may vary. FIG. 19D shows one exemplary embodiment of a fiber plate 50 having a fiber holes arrangement. Fiber plate 50, as shown in FIG. 19D may have a total of about 336 fiber holes and may have a center passage 83 having a diameter of about 1.42 inches. Similarly, the configuration and arrangement of fiber holes for fiber plate 50, utilized in conjunction with the embodiment of bundle body 20, as shown in FIG. 19C may also vary. For example, FIGS. 19E and 19F each show an exemplary embodiment of fiber plate 50 having a fiber holes arrangement. The embodiment of fiber plate 50 shown in FIG. 19E may have a total of 340 holes while the embodiment of fiber plate 50 shown in FIG. 19F may have a total of about 332 holes. The diameter of center passage 83 for both the embodiment of FIG. 19E and the embodiment of FIG. 19F may be about 1.52 inches. The larger diameter center passage 83 may be configured to accommodate the increased diameter of expansion chamber 81.

Lower aeration tube 64 may include a plurality of orifices 68 configured to direct gas stream 36 to each gasification device 34. For example, as shown in FIG. 19A, lower aeration tube 64 may have at least one orifice 68 that generally aligns with, for example, the center of each gasification device 34. Orifices 68 may be positioned in a variety of locations along the circumference of lower aeration tube 64. In some embodiments, the orifices 68 may be positioned at the bottom or top of lower aeration tube 64. According to an exemplary embodiment, as shown in FIG. 19A, orifices 68 may be positioned midway between the top and bottom (i.e., 90 degrees offset from the bottom) of lower aeration tube 64. Positioning the orifices 90 degrees offset from the bottom may reduce the likelihood of clogging compared to orifices positioned on the bottom of the lower aeration tube 64 where debris may collect. Further, the 90 degrees offset maintains substantially consistent pressure drop along the lower aeration tube 64.

The cross-sectional area of lower aeration tube 64 and the cross-sectional area of the orifices 68 may be optimized such that an equal and sufficient amount of gas stream 36 may be discharged from each orifice 68 while minimizing the amount of gas stream 36 discharged from flush leg 66. As will be known to one of skill in the art, the size of the orifices depends on volumetric air flow and quantity of orifices.

Further, the lower aeration tube 64 cross-sectional area and orifice size can be varied to manage velocity and pressure drop. In some embodiments, orifices 68 may be about 5 mm, 6 mm, 7 mm, 8 mm, 9 mm, 10 mm, or greater.

Figure 20:
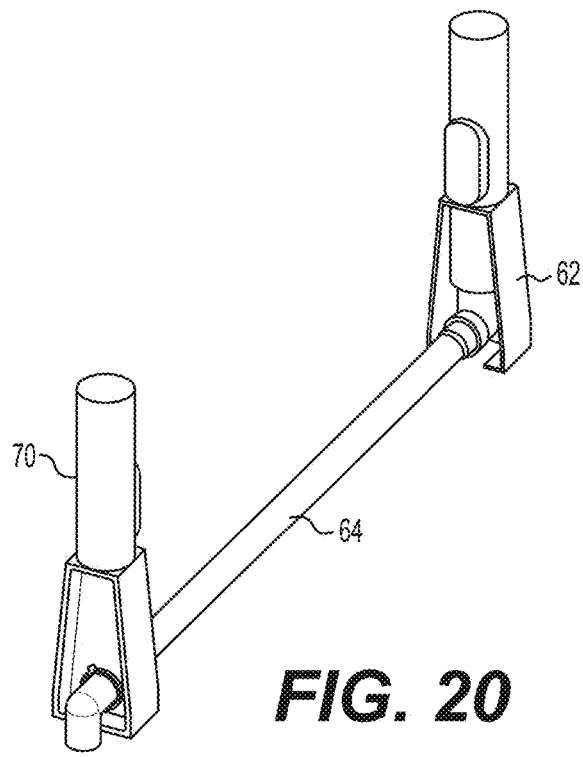
FIG. 20 is a perspective view of a lower aeration tube assembly according to an exemplary embodiment.
Figure 21:
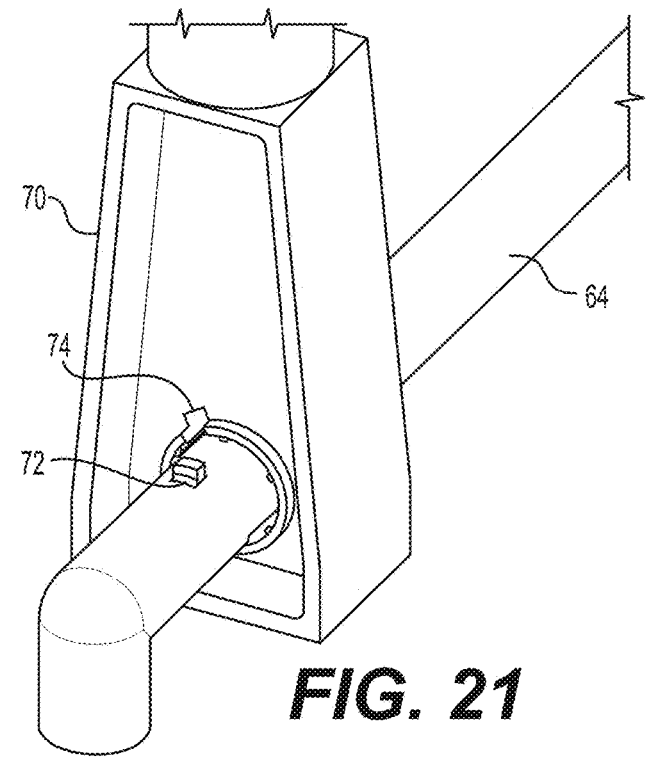
FIG. 21 is an enlarged perspective view of a portion of a lower aeration tube assembly according to an exemplary embodiment.

As shown in FIG. 20, lower aeration tube 64 may be configured to extend from aeration foot 62 of row 12 (not shown) to a permeate foot 70. Lower aeration tube 64 may be configured to slide and lock in place. For example, as shown in FIG. 20, one end of lower aeration tube 64 may be configured to get inserted into aeration foot 62 and may be sealed, for example, with an O-ring. The other end of lower aeration tube 64 may include a key protrusion 72, as shown in FIG. 21. Key protrusion 72 may be configured to pass through a key slot 74 in permeate foot 70 and once passed through lower aeration tube 64 may be rotated so that key protrusion 72 no longer aligns with key slot 74 and therefore rests against an inner surface of permeate foot 70. Lower aeration tube 64 may be removed from row 12 by reversing rotation of lower aeration tube 64 such that key protrusion 72 aligns with key slot 74 and thereby lower aeration tube 64 may be retracted from permeate foot 70.

Any of the gasification devices (e.g., 34B, 34C, and 34D) disclosed herein may be modified for utilization with lower aeration tube 64 configuration of membrane row 12. For example, row 12 shown in FIG. 19A utilizes lower aeration tube 64 with 110 degree offset gasification device 34D. FIGS. 22A, 22B, and 22C show an exemplary embodiment of gasification device 34D, which has been modified such that it may be utilized with the lower aeration tube 64 configuration. As shown in FIGS. 22A-22C, the modifications to gasification device 34D may include extending outer sleeve 102 further below bucket 124 and outer sleeve 102 may include corresponding openings in the lower portion configured to allow lower aeration tube 64 to pass through. Another modification may be the elimination of feed chamber 108 and throttle 110, as shown in FIGS. 22A-22C. A similar modification may be made to gasification device 34D and 34C to utilize lower aeration tube 64.

Figure 24C:
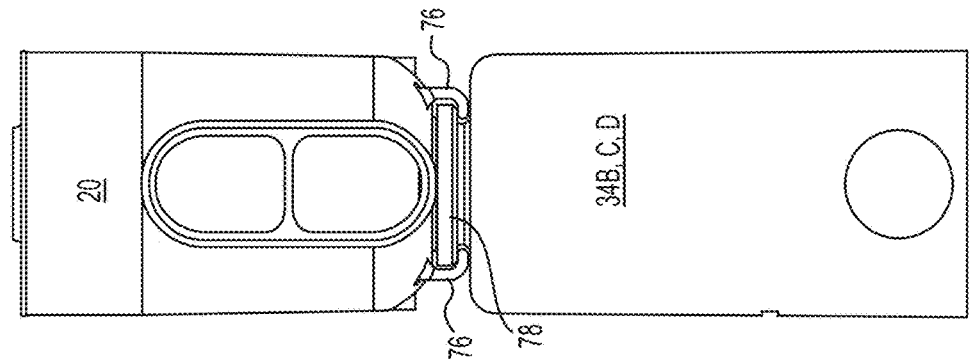
FIGS. 24A, 24B, and 24C are side views of a bundle body and gasification device according to an exemplary embodiment.
Figure 24B:
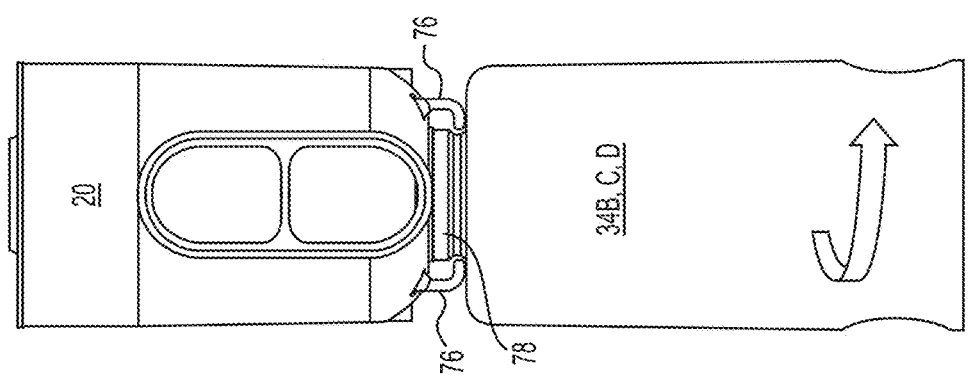
Figure 24A:
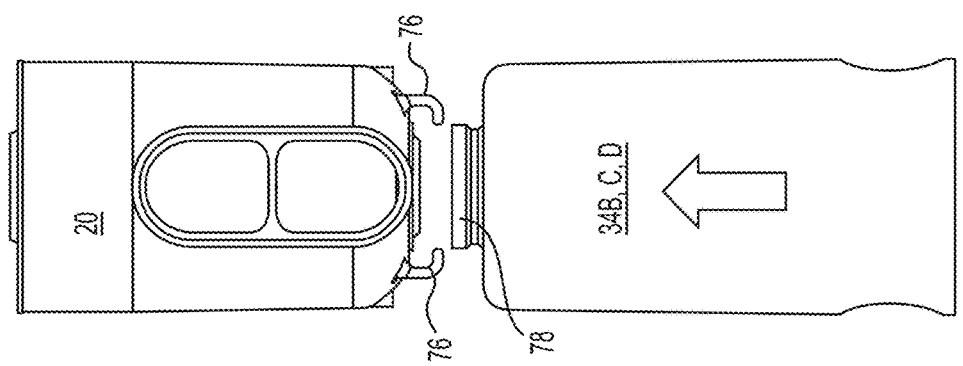

According to an exemplary embodiment, the gasification devices 34 may be configured to be releasably coupled to a bundle body 20. One example is shown in FIGS. 12-13 where gasification device 34B may have lateral projections that may interlock with slots on bundle body 20 (e.g., see FIG. 23A) when the projections and slots are aligned and gasification device 34B is rotated. In another example, as shown in FIG. 23B, bundle body 20 may have projections extending radially outward which may be configured to interlock to corresponding slots on a gasification device 34 (e.g., 34B, 34C, 34D) when rotated. According to an exemplary embodiment, as shown in FIG. 23C, bundle body 20 may have two coupling features 76 that extend from the bottom of bundle body 20. Gasification devices 34 may have a corresponding coupling feature to interlock with coupling features 76. For example, as shown in FIGS. 24A-24C, gasification device 34B, 34C, and 34D may have a corresponding coupling feature 78 that extends from the top of the gasification device 34, which may be configured to be inserted between the coupling features 76 of bundle body 20 and then rotation of the gasification device 90 degrees, as shown in FIG. 24B, will interlock coupling features 76 and coupling feature 78. Gasification device 34B, 34C, 34D or bundle body 20 may be configured to house an O-ring to fluidly seal the connection of coupling features 76 and coupling feature 78 thereby fluidly connecting tube 104 of the gasification device with a tube 104 of the corresponding bundle body 20.

Figure 25:
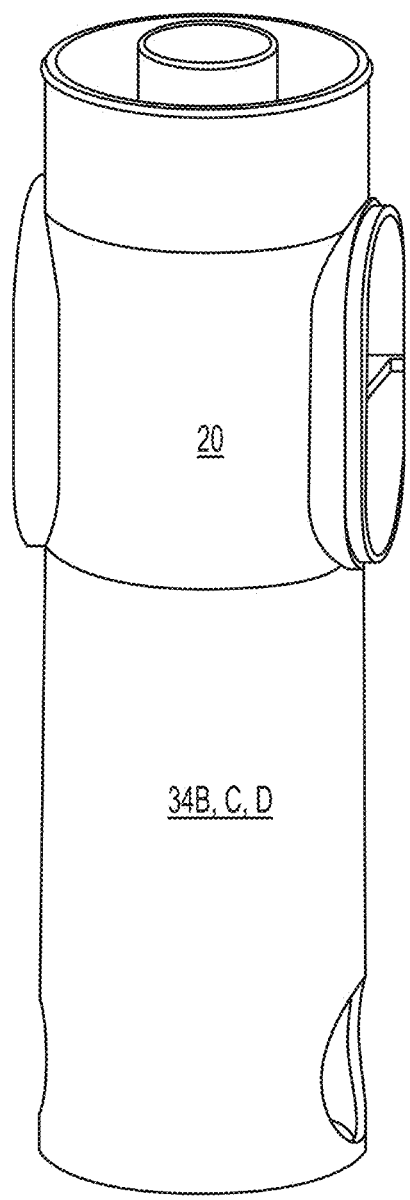
FIG. 25 is a perspective view of a bundle body and gasification device according to an exemplary embodiment.
Figure 26C:
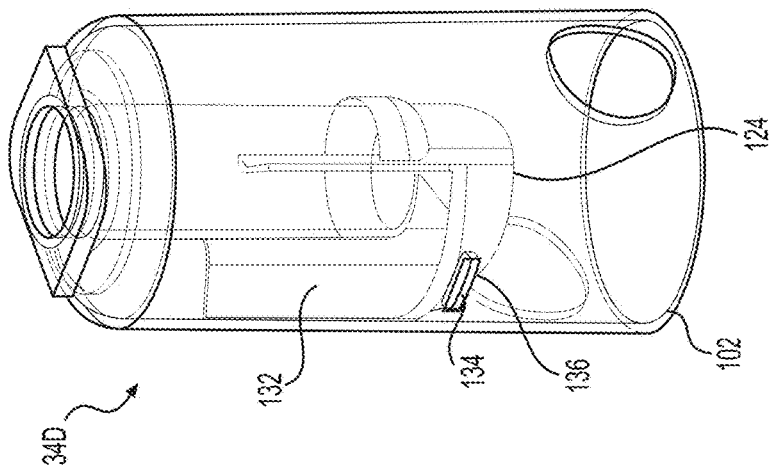
FIGS. 26A, 26B, and 26C are cross-sectional and perspective views of a gasification device according to an exemplary embodiment.
Figure 26B:
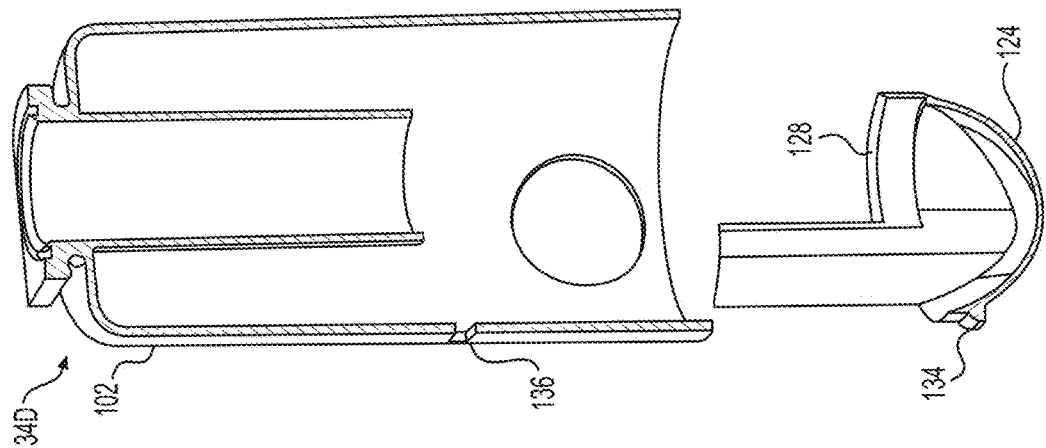
Figure 26A:
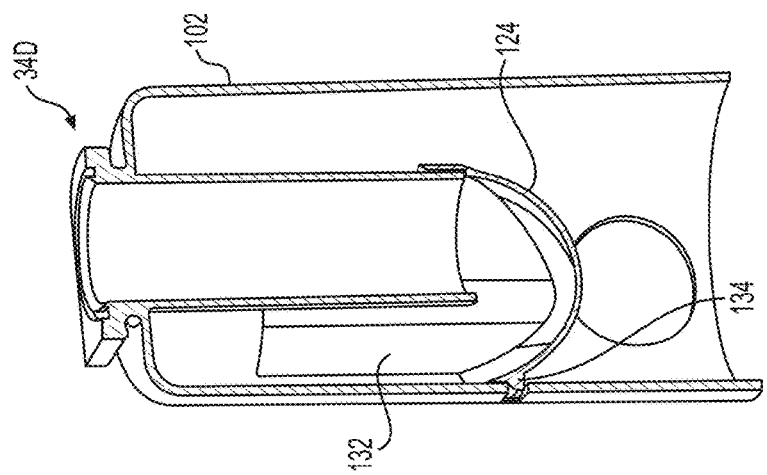

In some embodiments, bundle body 20 and gasification device 34 may be configured as one integral component. For example, as shown in FIG. 25, gasification device 34 may be configured to be a lower extension of bundle body 20. In some embodiments, gasification devices 34B, 34C, and 34D may be configured such that bucket 124 may be removable from outer sleeve 102. For example, as shown in FIGS. 26A-26C, bucket 124 may be inserted through lower end 112 of outer sleeve 102 and bucket 124 may have a tab 134 that may be snapped into an opening 136 in the wall of outer sleeve 102. Bucket 124 may be removed by depressing tab 134 through opening 136 and pulling down on bucket 124. If there is a need for cleaning, repairing, or inspecting, the ability to remove or replace bucket 124 may increase serviceability. In addition, the ability to replace bucket 124 may allow for replacement of the bucket 124 configuration or size. For example, 110 degree offset gasification device 34D may be converted to a 180 degree offset gasification device 34C by replacing bucket 124 with a bucket 124 that extends 180 degrees around tube 102. In some embodiments, a bucket 124 that extends less than or greater than 100 degrees may be used as the replacement. In some embodiments, rather than the replacement bucket 124 having a different degree of offset the replacement bucket 124 may have other dimensional features that may be changed. For example, the replacement bucket 124 may have higher or lower side walls 132 extending about the top 128 of bucket 124.

Gasification Device Dimensions Optimization

The size and dimensions of the gasification devices 34 (e.g., 34B, 34C, and 34D) described herein may be varied in numerous ways to optimize performance. For example, a height, a diameter, or a length may be varied for outer sleeve 102, tube 104, bucket 106, thereby adjusting the volumes of main chamber 114 and chamber 130. The overall height and diameter of outer sleeve 102 may determine the maximum working volume. The working volume may be selected based on a preferred pulse frequency at a given volumetric flow rate for gas stream 36.

Figure 27:
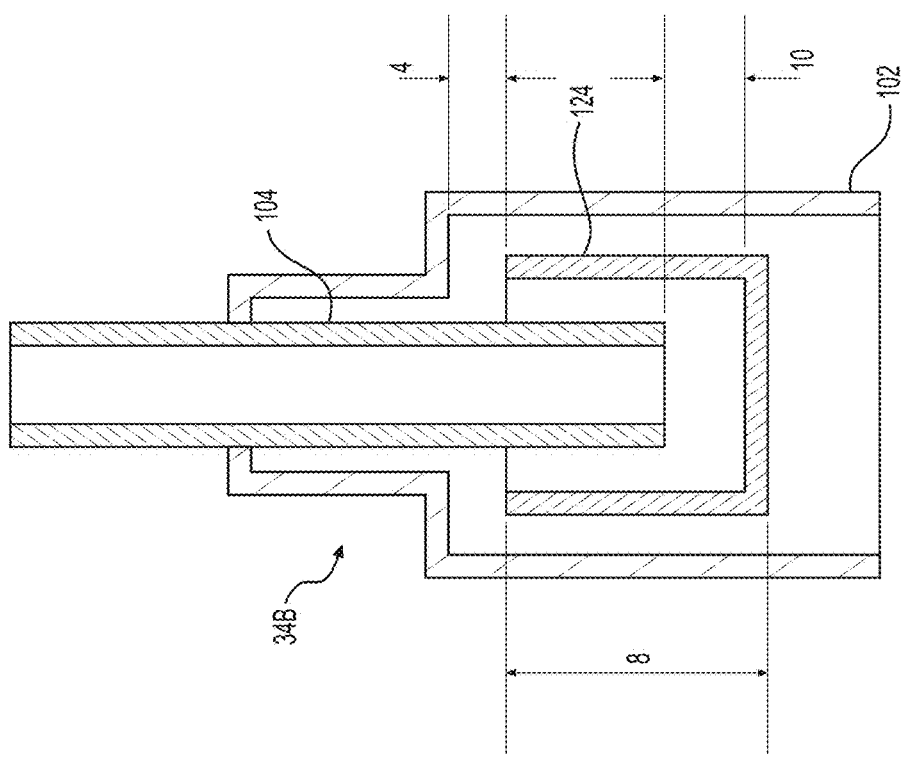
FIG. 27 is a schematic of a gasification device according to an exemplary embodiment.

To determine an optimal working volume and corresponding dimensions for the gasification devices 34, three different size concentric gasification devices 34B were tested and operated at air flow rates between 2 and 10 m³/hr/row. Only three dimensions were varied between the three gasification devices 34B as indicated in Table 1 below and illustrated in FIG. 27.

TABLE 1

| Inner Bucket Configuration | Dim 4 (mm) | Dim 8 (mm) | Dim 10 (mm) |
|---|---|---|---|
| Tall | 18 | 67.6 | 10.7 |
| Medium | 22.6 | 58.4 | 10.7 |
| Short | 41.1 | 41.3 | 10.7 |

The performance of each gasification device 34B tested was measured both visually as well as by timing the number of pulses per minute at a given flow rate. The goal was to determine the best configuration that utilizes the complete hold-up volume of the gasification device consistently at the air flow rates being applied. The number of pulses per minute at a given flow rate indicates whether or not the gasification device is firing efficiently. A properly functioning gasification device will pulse fewer times per minute than an improperly functioning gasification device. This is because a gasification device that is short circuiting or not completely evacuating will tend to fire more rapidly. The overall air usage will be the same, but the bubble size will be reduced with higher frequencies. Ultimately, pumping efficiency created by a bubble filling the bundle chamber cross-section will be compromised. Table 2 below provides the results of the test. From the results it is clear that the medium-sized bucket allowed the gasification device to function more efficiently, meaning more of the hold-up volume of gas stream 36 within the gasification device 34B was consistently evacuated with every pulse cycle.

TABLE 2

| Air Flow Rate | Tall Bucket | Short Bucket | Medium Bucket |
|---|---|---|---|
| 2 Nm³/hr/row | 14 bb/min | 16 bb/min | 13 bb/min |
| 3 Nm³/hr/row | 20 bb/min | 23 bb/min | 19 bb/min |
| 5 Nm³/hr/row | 25 bb/min | 31 bb/min | 24 bb/min |
| 7 Nm³/hr/row | 32 bb/min | 64 bb/min | 32 bb/min |
| 10 Nm³/hr/row | 58 bb/min | 64 bb/min | 56 bb/min |

Similar testing was done to test the pulse rates of the concentric gasification device 34B against the 180 degree offset gasification device 34C and the 100 degree offset gasification device 34D. The results of the testing for the three gasification devices are shown in Table 3 below.

TABLE 3

| | Pulses Per Minute (Average over 5 minutes) | | | |
|---|---|---|---|---|
| Nozzle Type | 20 cfh | 30 cfh | 40 cfh | 50 cfh |
| Concentric | 25.5 | 40.1 | 54.1 | 64.2 |
| Offset 180 | 25.9 | 39.8 | 54 | 68.2 |
| Offset 100 | 26.9 | 41 | 57.8 | 69.2 |

Figure 28:
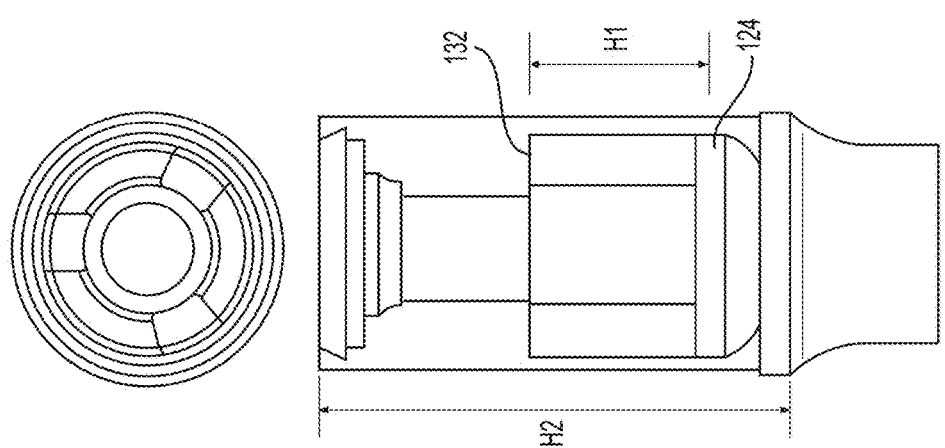
FIG. 28 is a side view of a gasification device according to an exemplary embodiment.

As indicated by the results of the table, all three gasification devices were pulsing evenly up to 50 cfh, which equates to 11.3 Nm³/hr/row (8 bundle row). Therefore, all three gasification devices 34B, 34C, and 34D may be configured and sized to handle the air flow capacity utilized during normal operation of module 10. As a result of further testing and observation of gasification device 34 in operation, it was determined that further improvement in pulse efficiency of gasification device 34 may be achieved when side wall 132 height of bucket 124 is a certain ratio to the overall height of gasification device 34. For example, when height H1 is about 39% of height H2, as indicated in FIG. 28, improved pulse efficiency may be achieved. In some embodiments, this percentage may be, for example, about 39% to about 40%, about 38% to about 41%, or about 37% to about 42%. According to an exemplary embodiment, height H1 may be about 2.34 inches and height H2 may be about 6.00 inches. This height ratio may be utilized in a variety of gasification devices including gasification devices 34B, 34C, and 34D of varying sizes.

Testing was also conducted on the pulsed aeration gasification devices to determine the upper and lower limits of air flow rate operation and the corresponding pulse rates at those air flow rates. The testing revealed that for a gasification device 34, as shown in FIG. 28, the upper limit (e.g., maximum) air flow rate is about 13.1 Nm3/hr/row (with an 8 bundle row) or 1.6375 Nm3/hr/gasification device. An air flow rate of 1.6375 Nm3/hr/gasification device produced about 70 pulses per minute. It was determined that at air flow rates about 1.6375 Nm3/hr/gasification device the gasification devices no longer pulsed, but instead began to function like a dispersed or intermittent aeration gasification device. The aeration flow rate upper limit will be a function of the dimensions and configuration of the gasification device. Therefore, depending on the dimensions and configuration the upper limit may be higher or lower than 13.1 Nm3/hr/row (with an 8 bundle row) or 1.6375 Nm3/hr/gasification device.

The testing also revealed that for a gasification device 34, as shown in FIG. 28, the air flow rate may be reduced to 1 Nm3/hr/row (with an 8 bundle row) or 0.125 Nm3/hr/gasification device or below. An air flow rate of 0.125 Nm3/hr/gasification device produced about 2-3 pulses per minute. The pulsed aeration gasification device 34 may also operate at air flow rates lower that 0.125 Nm3/hr/gasification device. At reduced air flow rates consideration of the recirculation rate of liquid 42 and the fouling rate of the membranes must be considered.

Gasification Device Debris Removal

In addition to pulse efficiency, a gasification device's ability to handle debris is also considered in designing and selecting a gasification device for utilization with a membrane row 12 of a module 10. Debris handling may be defined as a gasification device's ability to pass debris without hindering the pulse rates coming from the gasification device.

Debris handling testing was performed on a concentric gasification device 34B, a 180 degree offset gasification device 34C, and a 100 degree offset gasification device 34D. The testing included placing debris of different materials and different sizes inside each gasification device. Each gasification device was then installed and gas stream 36 was supplied at 5 m$^3$/hr/row. The behavior of the debris was observed while the gasification devices operated (i.e., pulsed). The results of the testing are shown in Table 4 below. An "X" indicates the object could not pass through the corresponding gasification device. The "O" indicates the object had passed through the corresponding gasification device.

TABLE 4

|  | Concentric Bucket | 180° Offset Bucket | 100° Offset Bucket |
|---|---|---|---|
| 1 mm Bead | o | o | o |
| 5 mm Bead | o | o | o |
| 1" Diameter Sheet Plastic | o | o | o |
| 1" Diameter Leaf | o | o | o |
| ½"-1" Twigs | o | o | o |
| 3" Plastic Sheet | x | o | o |
| Fibrous, Hair | x | o | o |
| 3" Diameter Leaf | x | x | o |
| 1"-3" Diameter Foil Insulation | x | x | o |
| 3" Twig | x | x | x |
| ½" Diameter O-ring | x | x | x |

As indicated by the results of the test, the 100 degree offset gasification device 34D was able to pass the most types and sizes of debris. It was observed that the turbulence level of water returning to bucket 124 after a gaseous bubble 56 was released was noticeably higher than with the other gasification devices. This increased turbulence helps to disturb objects that have settled on the bottom of bucket 124, thereby increasing the chance of the object passing through the air tube with subsequent pulses. It should be noted that the offset gasification device with offset wall angle contributes to the turbulence effect.

Additional debris handling testing was performed utilizing a 2 inch leaf and a full size leaf (~4 inch×4 inch Maple leaf) because leaves are often a cause for gasification device clogging. The leaves were placed in the gasification devices in a clear water tank and supplied a gas stream 36 at an air flow rate of 4.3 Nm$^3$/hr. The results are displayed in Table 5.

TABLE 5

| | Debris Testing | |
|---|---|---|
| Nozzle Type | 2 Inch Leaf Eject Time/Pulses | 4 Inch Full size leaf Eject Time |
| Concentric | No removal | No removal |
| Offset 180 | 1:57/62 | 16 hrs. |
| Offset 100 | 1:56/61 | 35 min. |

As indicated by the results in Table 5, the 100 degree offset gasification device 34D performed better than the other gasification devices. The concentric gasification device was unable to pass either leaf. The 180 degree offset gasification device 34C was able to pass the 2 inch leaf in under two minutes, but the full size leaf took 16 hours. The 100 degree offset gasification device 34D was able to pass the 2 inch leaf in under two minutes and passed the full size leaf in thirty five minutes.

Based on the pulse efficiency and debris handling testing, the 100 degree offset gasification device 34D may be utilized in an exemplary embodiment of membrane row 12 and module 10.

Gasification Device Pumping Efficiency

In addition to pulse efficiency and debris removal, a gasification device's ability to circulate liquid 42 (i.e., pumping efficiency) through each individual bundle enclosures 40 is considered in designing and selecting a gasification device for utilization with a membrane row 12 of a module 10. Pumping efficiency may be defined as the liquid velocity achieved by a gasification device per unit of air flow. To evaluate the pumping efficiency of the intermittent gasification device 34A versus the pulsed gasification devices 34B, C, D, comparative testing was done on an intermittent gasification device and a pulsed gasification device.

For the testing a bundle enclosure was submerged in water and a gasification device of each aeration type was attached to the base of the bundle enclosure, first one then the other. A velocimeter, designed to measure submerged velocity profiles was mounted at the exit of the bundle enclosure. An air supply was then connected to each gasification device and a rotameter was used to measure the air flow rate supplied to the gasification devices during each test.

For the first phase of testing four target liquid velocities were set (i.e., 0.8 ft/s, 1.1 ft/s, 1.4 ft/s, and 1.6 ft/s) and then the air flow rate was increased for each of the gasification devices until each of the target flow rates were achieved. Table 6 below shows the results of the first phase of testing. As indicated by the results in Table 6, the pulsed aeration gasification device required about 75-80% of the air flow rate that the intermittent aeration gasification device required to achieve the same target liquid velocities.

TABLE 6

| Target Liquid Velocity (ft/s) | Required air flow for Intermittent Aeration Gasification Device (Nm³/hr/row) | Required Air Flow for Pulsed Aeration Gasification Device (Nm³/hr/row) |
| --- | --- | --- |
| 0.8 | 4.5 | 3.4 |
| 1.1 | 6.5 | 5.0 |
| 1.4 | 9.0 | 7.1 |
| 1.6 | 11.0 | 9.0 |

For the second phase of testing five target Δ liquid heights were set (i.e., 3.125 inches, 4.5 inches, 5.8125 inches, 6.25 inches, 6.625 inches) and then the air flow rate was increased for each of the gasification devices until each of the target Δ liquid heights were achieved. Table 7 below shows the results of the second phase of testing. As indicated by the results in Table 7, the pulsed aeration gasification device required between about 47% and 88% of the air flow rate that the intermittent aeration gasification device required to achieve the same target Δ liquid heights.

TABLE 7

| Δ h inches | Air Flow Required for Intermittent Aeration Gasification Device (Nm³/hr/row) | Air Flow Required for Pulsed Aeration Gasification Device (Nm³/hr/row) |
| --- | --- | --- |
| 3.125 | 3.5 | 2.2 |
| 4.5 | 5 | 2.9 |
| 5.8125 | 7 | 3.3 |
| 6.25 | 8 | 5.5 |
| 6.625 | 9 | 8 |

The pumping efficiency testing demonstrates that the pulsed aeration gasification devices may be operated at a reduced air flow rate and still achieve the same pumping efficiency as the intermittent aeration gasification devices. The ability to operate at reduced air flow rates can allow for cost saving in both the initial capital investment in equipment and installation as well as operating cost.

Aeration & Enclosure Assembly Interaction

Figure 29:
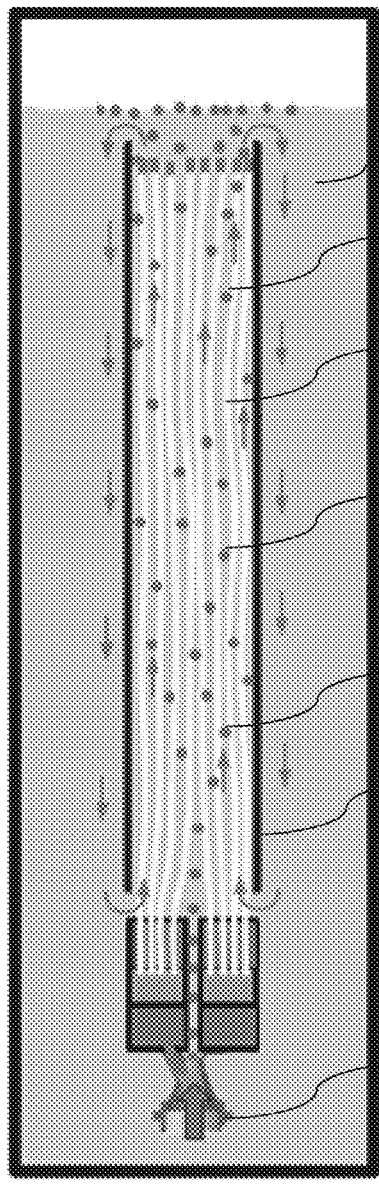
FIG. 29 is a side cross-sectional view of an exemplary embodiment of a membrane row received in a tank undergoing intermittent aeration.

As described herein with reference to FIGS. 1-3, module 10 may include one or more membrane rows 12 having one or more bundle enclosures 40 which may be a part of a row enclosure assembly 38. The bundle enclosures 40 may be configured to provide support for fiber bundles 18. In addition, the bundle enclosures 40 surrounding the individual fiber bundles 18 may be configured to retain gaseous bubbles (e.g., one or more small gaseous bubbles 58 and/or large gaseous bubbles 56) that are released into the corresponding fiber bundle 18 by the corresponding gasification device 34 through bundle body 20. For example, as shown in FIG. 29, with intermittent aeration small gaseous bubbles 58 released by a gasification device (e.g., 34A) may be confined within the corresponding bundle enclosure 40 as they flow along the corresponding fiber bundle 18 until they reach the surface of liquid 42. Confining small gaseous bubbles 58 within the individual bundle enclosures 40 may provide for more efficient and even aeration of each fiber bundle 18 because the bubbles may be dedicated to a specific fiber bundle. However, potentially there may still be channeling of small gaseous bubbles 58. For example, fouling of a portion of the membrane bundle or sludge accumulation within a portion of the bundle enclosure may cause the small gaseous bubbles to rise along a defined channel (e.g., path of least resistance) rather than dispersing and flowing up evenly across the entire cross-sectional area of the bundle enclosure. Additional discussion of channeling as well as other parameters for submerged membrane filter operation may be found in Yoon, Seong-Hoon. *Membrane Bioreactor Process: Principles and Applications*. Hoboken: CRC, 2015. (see e.g., pp. 133-134, 136-138)

Figure 30:
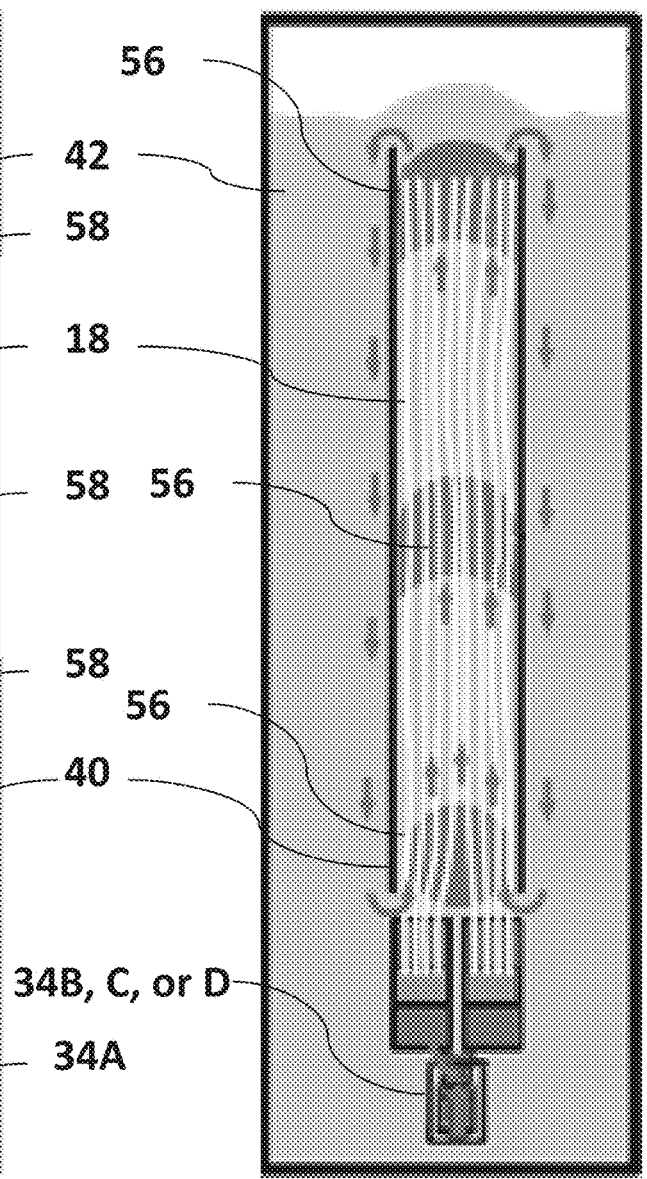
FIG. 30 is a side cross-sectional view of an exemplary embodiment of a membrane row received in a tank undergoing pulsed aeration.

As shown in FIG. 30, for pulsed aeration (i.e., large gaseous bubbles 56), bundle enclosure 40 may be configured to confine the large gaseous bubbles 56 within bundle enclosure 40 as they flow up along fiber bundle 18. Large gaseous bubbles 56 produced by the pulsed aeration via a pulsed aeration gasification device (e.g., 34B, 34C, or 34D) may be sufficiently large to fill substantially the entire cross-section of the individual bundle enclosure 40 with a single gaseous bubble 56 as shown in FIG. 30. In some embodiments, with such a configuration, the gaseous bubbles 56 may be configured to maintain contact with the fiber bundle 18 within the bundle enclosure along the entire length of the fiber bundle 18 The confinement of gaseous bubbles 56 within bundle enclosure 40 may provide for more effective lifting of the liquid above each gaseous bubble 56 and drawing of liquid up below each gaseous bubble 56. This type of two-phase flow may be referred to as slug flow. The drawing of liquid caused by the release and rise of each gaseous bubble 56 within the bundle enclosures may cause liquid 42 to be draw in through cage gap G, as shown in FIG. 6, thereby introducing fresh liquid 42 into the bundle enclosures.

Figure 31A:
FIG. 31A is a photograph of a gaseous bubble rising in a bundle enclosure assembly according to an exemplary embodiment.
Figure 31B:
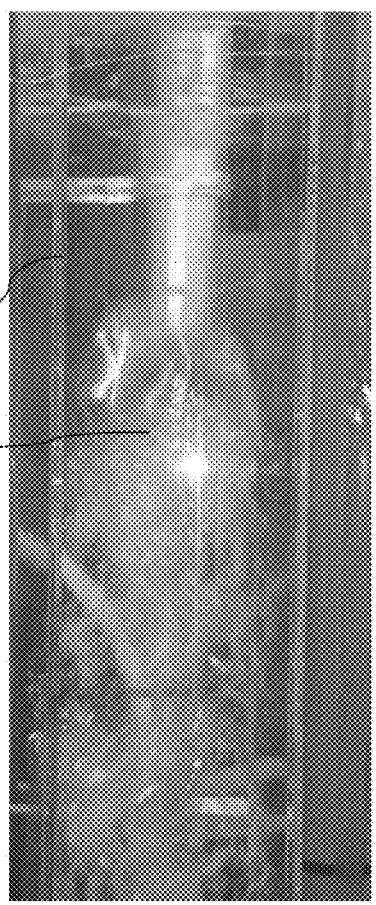
FIG. 31B is a photograph of a gaseous bubble rising in a bundle enclosure assembly according to an exemplary embodiment.

Gaseous bubbles 56 as they rise up within fiber bundle 18 and bundle enclosure 40 may form a "bullet shape." For example, as shown in FIGS. 31A and 31B, each gaseous bubble substantially fills the cross-sectional area of the corresponding bundle enclosure 40 as it rises and creates a "bullet shape" that both scours the surface of the membranes (not shown in the pictures) and pushes the liquid above the gaseous bubble 56.

The cross-sectional area of the bundle enclosures and the gaseous bubbles substantially filling the cross-sectional area may be, for example, about 8 in² to about 16 in², about 10 in² to about 14 in², about 11 in² to about 13 in², about 12 in² to about 12.5 in², or about 12 in² to about 12.25 in², or about 12.11 in².

The term "substantially" as used herein, for example, to describe the gaseous bubbles "substantially" filling the cross-sectional area, means within an acceptable error range for the particular value as determined by one of ordinary skill in the art. For example, "substantially" may mean greater than 99%, 98%, 97%, 96%, 95%, 90%, 85%, 80%, or 75%. In one example, the gaseous bubbles substantially filling the cross-sectional area may be equivalent to the gaseous bubble filling great than 99% of the cross-sectional area of the bundle enclosure. It is contemplated that the gaseous bubbles 56 may substantially fill the cross-sectional areas of the bundle enclosure, but there may be some seams (e.g., along the corners of the bundle enclosure) where there may be leakage of liquid by the gaseous bubble thereby limiting the gaseous bubbles from filling the entire cross-sectional area.

This form of pulsed aeration, where the gaseous bubble 56 may be introduced into the center of the fiber bundle 18, and may be retained within fiber bundle 18 and bundle enclosure 40 can produce unexpected synergistic benefits. These synergistic benefits may include, for example, higher rates of liquid pumping (i.e., feed recirculation through the bundle enclosure) than achieved by the small continuous bubbles that do not fill the enclosure or pulsed aeration with large bubbles that are not confined by an enclosure. Another synergistic benefit may be, for example, enhanced scouring of the hollow-fiber membranes 32. When the gaseous bubbles 56 substantially fill the entire cross-section of an individual bundle enclosure 40, all the hollow-fiber membranes 32 of the fiber bundle 18 may be scoured, thereby removing more debris from the surface. This may eliminate channeling within hollow-fiber membrane bundles 18, which can lead to clogging and decrease filtration performance.

Various embodiments of gasification devices may be utilized to produce pulsed aeration, as described herein. Gasification devices 34B, 34C, and 34D are just three exemplary embodiments. The pulsed aeration gasification devices 34B, 34C, and 34D as described herein combined with bundle enclosures 40 may enable the total flow of aeration air to be substantially reduced while still producing large gaseous bubbles 56 and slug flow that effectively cleans the surface of the membranes and maintains filtration performance. Large gaseous bubbles 56 and slug flow also provide sufficient liquid circulation, which provides improved membrane performance at lower operating cost.

Big Bubble/No Cage

Figure 32:
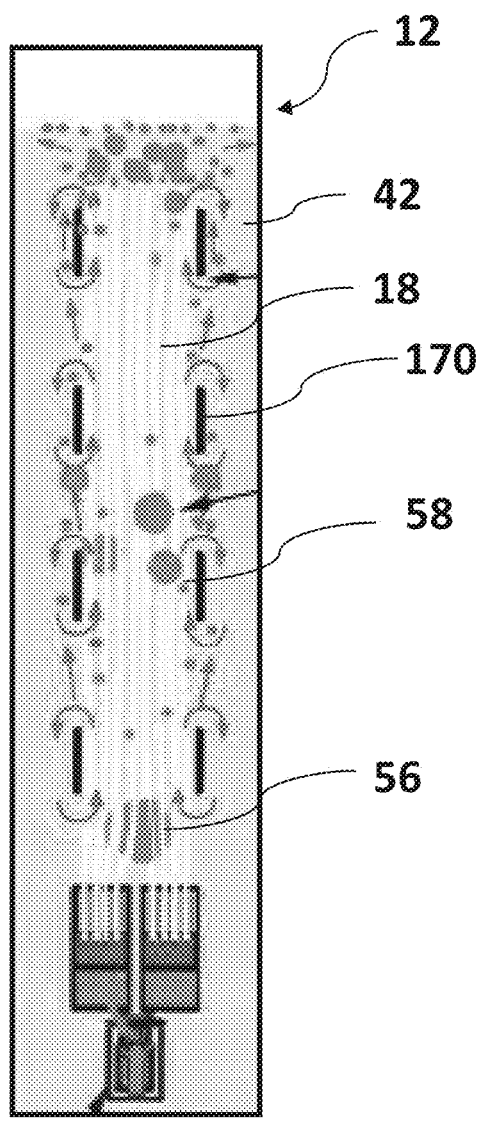
FIG. 32 is a side cross-sectional view of an exemplary embodiment of a membrane row with intermittent cages received in a tank.
Figure 33:
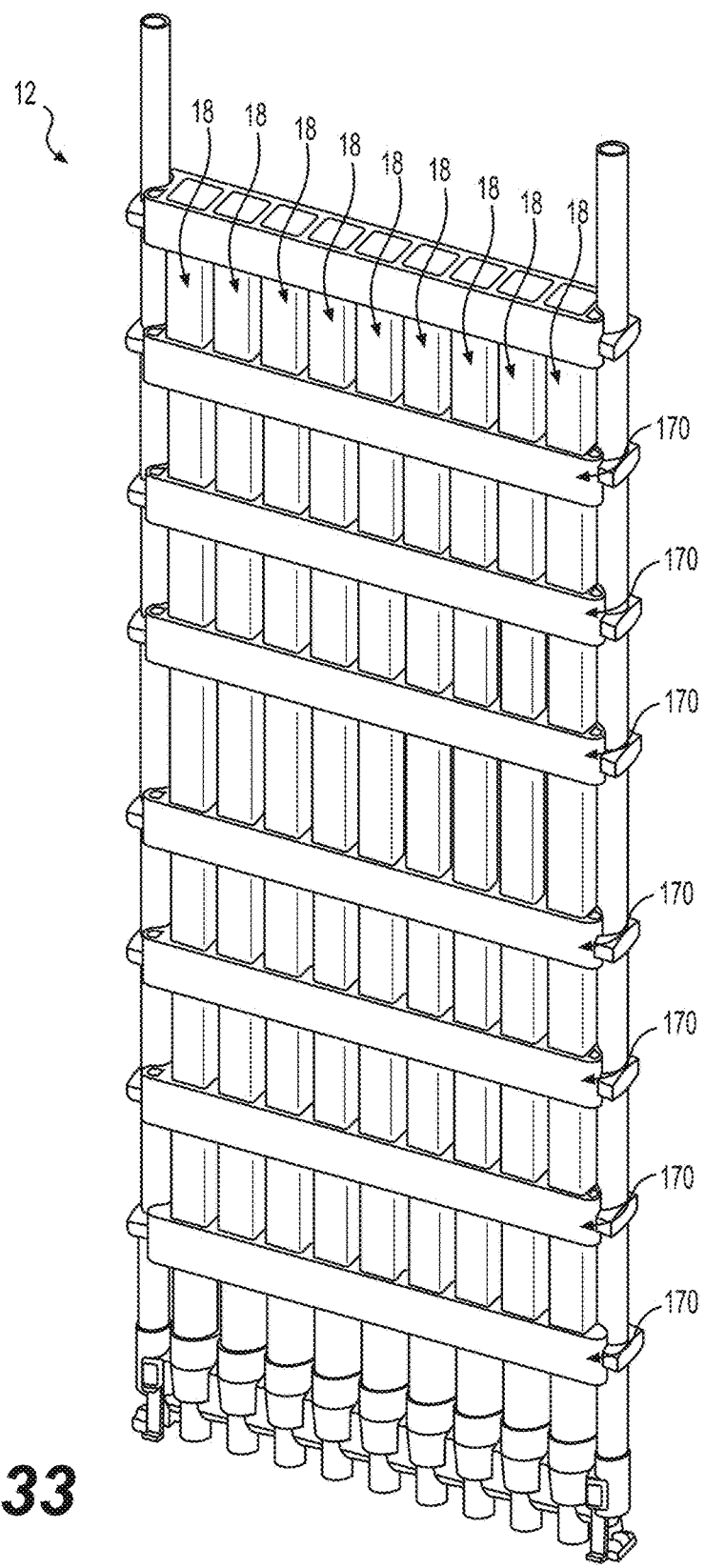
FIG. 33 is a perspective view of an exemplary embodiment of a membrane row with intermittent cages.

Although module 10 as shown in FIG. 1 includes row enclosure assemblies 38, in some embodiments module 10 may be configured without individual bundle enclosures 40 surrounding each fiber bundle 18. For example, in some embodiments, the fiber bundles 18 may be partially surrounded by intermittent cages that are spaced along the height of the bundle. For example, as shown in FIGS. 32 and 33, one or more cages 170 may be spaced along the height of membrane row 12 and may be configured to surround each fiber bundle 18 in order to support hollow-fiber membranes 32. As shown in FIG. 32, intermittent cages 170 may be combined with pulsed aeration and/or intermittent aeration producing large gaseous bubbles 56 and/or small gaseous bubbles 58.

Figure 34:
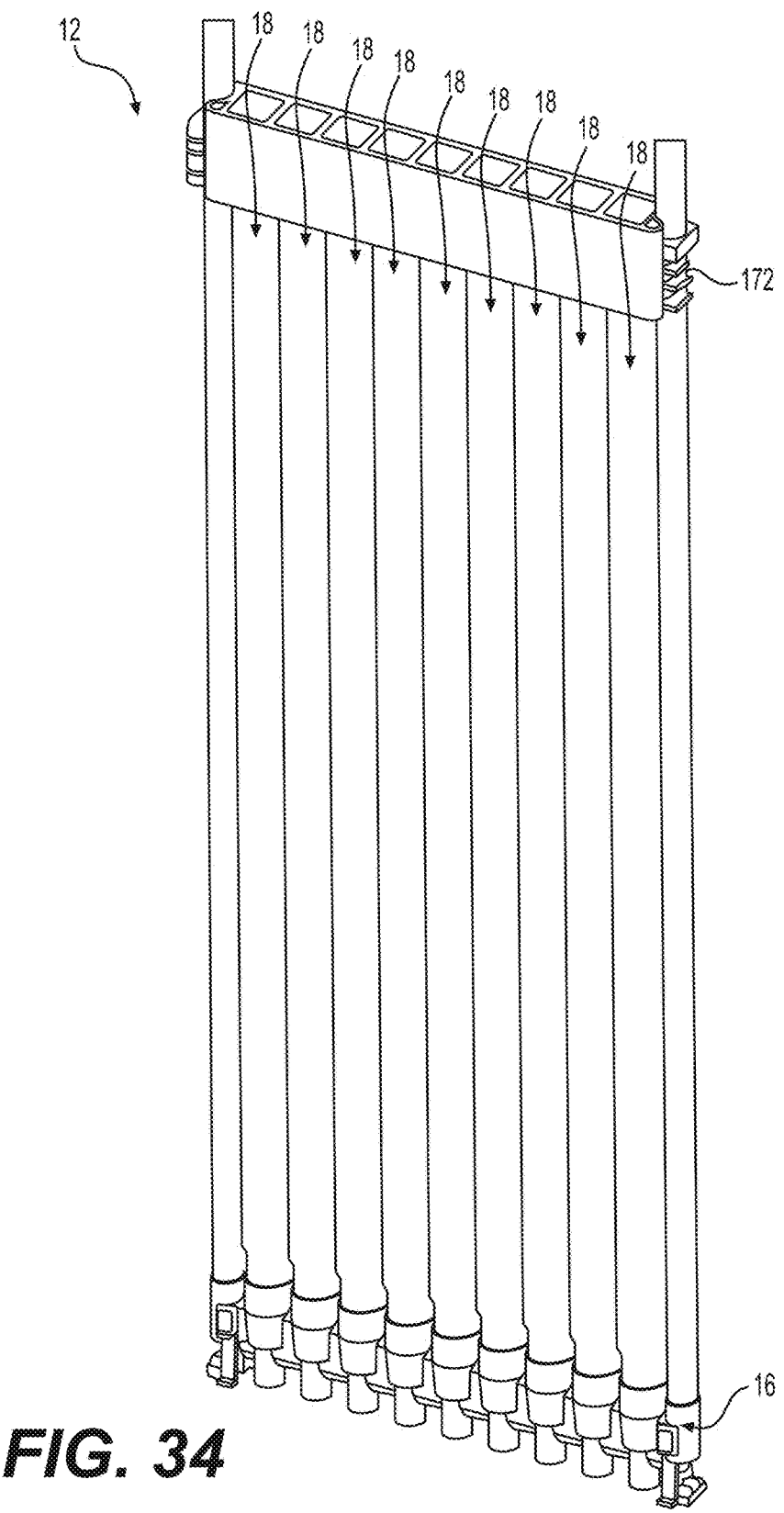
FIG. 34 is a perspective view of an exemplary embodiment of a membrane row with a second header.

In some embodiments, row enclosure assembly 38 may be configured to surround an entire membrane row 12 of fiber bundles 18 or an enclosure may be configured to surround and entire module 10. In some embodiments, no enclosure at all may be utilized and the hollow-fiber membranes 32 may be supported by an alternative structure. For example, in some embodiments as shown in FIG. 34 the upper end of hollow-fiber membranes 32 may be attached to another header 172. Header 172 may be configured to maintain the vertical orientation of hollow-fiber membranes 32. In some embodiments, the upper end of hollow-fiber membranes 32 may be attached to a floatation device configured to float at the surface of the liquid and maintain the hollow-fiber membranes 32 in a substantially vertical orientation. In other embodiments, the upper end of hollow-fiber membranes 32 may be supported with a suspension system that is incorporated into a structure (e.g. liquid tank supports).

In embodiments not utilizing a bundle enclosure or cage the gaseous bubble 56 released by a pulsed aeration gasification device may be sized such that the cross-sectional area of the gaseous bubbles corresponds to (e.g., is equal to) the cross-sectional area of the fiber bundle such that the gaseous bubble engulfs all of the hollow-fiber membranes 32 as it rises up. The cross-sectional area of the fiber bundle and the gaseous bubbles substantially filling the cross-sectional area of the fiber bundle may be, for example, about 8 in² to about 16 in², about 10 in² to about 14 in², about 11 in² to about 13 in², about 12 in² to about 12.5 in², or about 12 in² to about 12.25 in², or about 12.11 in².

Enclosure Assemblies

Module 10 may utilize a variety of different structures and designs for bundle enclosure 40 and row enclosure assembly 38. Several different embodiments of bundle enclosures 40 and row enclosure assemblies 38 are described herein in greater detail. An individual bundle enclosure 40 may be multi-shaped, for example, generally square, rectangular, multi-sided, circular, semi-circular, symmetric, non-symmetric, or the like. Bundle enclosure 40 may have rounded or smooth inner corner areas. An individual bundle enclosure 40 may be sized and shaped to contain a fiber bundle that will extend along at least a portion of its length.

In the exemplary embodiment shown in FIGS. 3 and 4, multiple shaped bundle enclosures 40, are provided. Exemplary bundle enclosures 40 may be sized and shaped to contain a fiber bundle 18 of hollow-fiber membranes 32 that extend along a longitudinal axis of the bundle enclosure 40.

Figure 35:
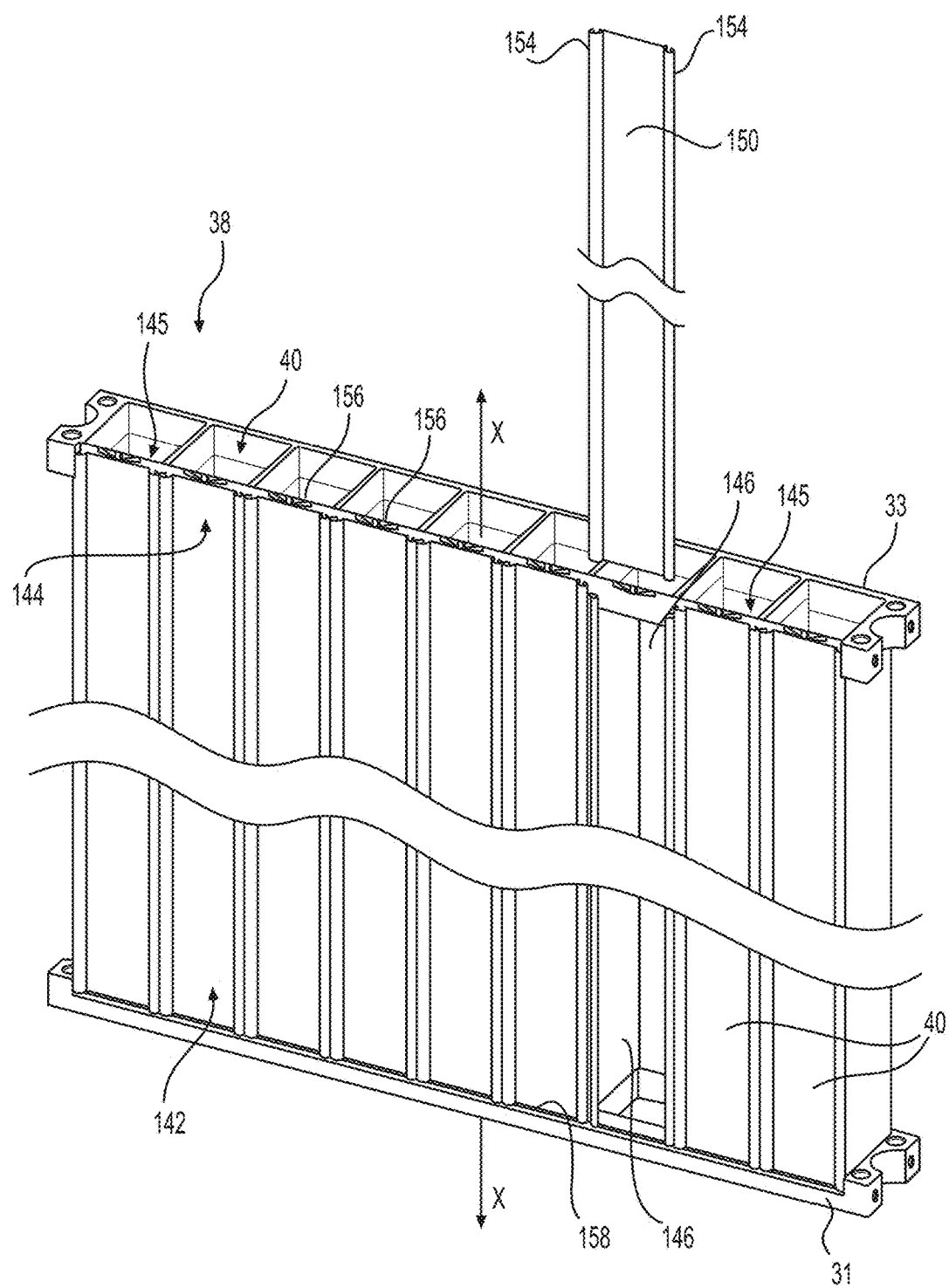
FIG. 35 is an exemplary embodiment of a row enclosure assembly.

The exemplary embodiment of row enclosure assembly 38, shown in FIGS. 35-40, may include a first end cap 31 at the lower end of row enclosure assembly 38 and a second end cap 33 at the upper end of row enclosure assembly 38. The bundle enclosures 40 may be coupled in an adjacent, side-by-side manner to the first end cap 31. For example, the lower ends of the bundle enclosures 40 and the first end cap 31 may be configured such that lower ends of the bundle enclosures 40 slide into grooves or recesses in the first end cap 31. Once all of the adjacent bundle enclosures 40 have been positioned with respect to the first end cap 31, the second end cap 33 may be placed over the upper ends of the bundle enclosures 40 to secure them in place, for example, as shown in FIG. 35. As shown in FIG. 35, row enclosure assembly 38 may be configured to be coupled at opposite ends of the first end cap 31 and the second end cap 33, for example via clamps, to permeate riser pipe 22 and aeration riser pipe 24 (not shown), thereby holding the row enclosure assembly 38 together.

The exemplary embodiment of bundle enclosures 40 shown in FIGS. 35-40 may include an elongated wall 146 extending between a first end 142 and a second end 144 of bundle enclosure 40. The elongated wall 146 includes opposing side edges 148. The exemplary bundle enclosure 40 also includes a removable hatch 150 extending between the first and second ends 142 and 144 of the bundle enclosure 40 and coupled to the opposing side edges 148 of the elongated wall 146, thereby forming a hollow enclosure 145 having an interior configured to provide flow communication between the first and second ends 142 and 144 of the bundle enclosure 40. According to some embodiments, the row enclosure assemblies 38 and respective bundle enclosures 40 are configured such that fluid flowing from the first end 142 of a first of the bundle enclosures 40 is prevented from flowing from the interior of the first bundle enclosure 40 into the interior of a second bundle enclosure 40 without first flowing from the second end 144 of the first bundle enclosure 40.

As shown in FIGS. 35-40, the exemplary removable hatch 150 includes opposing hatch edges 154. According to some embodiments, the opposing hatch edges 154 and the opposing side edges 148 of the elongated wall 146 are configured such that the removable hatch 150 is coupled to the elongated wall 146 and separated from the elongated wall 146 via sliding the removable hatch 150 relative to the elongated wall 146 in a direction substantially parallel to the longitudinal axis X of the bundle enclosure 40. For example, in the exemplary embodiment shown in FIGS. 35-40, the opposing hatch edges 154 and the opposing side edges 148 of the elongated wall 146 are configured to overlap and/or interlock with one another when engaged with one another.

For example, as shown in FIGS. 37-40, opposing side edges 148 of the exemplary elongated wall 146 each include a hook-shaped track (or other engagement configuration) that creates an elongated hook-shaped space into which the opposing hatch edges 154 can slide for interlocking engagement and coupling between the removable hatch 150 and the elongated wall 146. Other interlocking configurations of side edges 148 and hatch edges 154 are contemplated, such as, for example, a snap-lock and/or hinged lock. For example, one of the side edges 148 may be configured to be coupled to one of the hatch edges 154 via a snap-together coupling, with the other one of the side edges 148 being hingedly coupled to the other hatch edge 154. Such embodiments may be configured such that the removable hatch 150 is still slideable relative to the elongated wall 146 and/or the bundle enclosure 40. In the exemplary embodiment shown in FIGS. 37-40, the interlocking engagement area is positioned outboard relative to the side edges 148 of the elongated wall 146, which may serve to minimize interference with the hollow-fiber membranes 32 during use of the module 10. It is contemplated, however, that the side edges 148 and hatch edges 154 may be positioned and/or configured differently than shown.

According to some embodiments, a tab 156 may be associated with, or coupled to, an exterior surface of the second end cap 33 (e.g., on the side adjacent the removable hatch 150). The tab 156 is configured to prevent the removable hatch 150 from separating from the elongated wall 146, unless an end of the removable hatch 150 adjacent the second end cap 33 is deflected away from the exterior surface of the second end cap 33, for example, via a tool such as a screw driver, once the removable hatch 150 has been slid into place to close the bundle enclosure 40. According to some embodiments, the tabs 156 may include a slot 157 (e.g., for receiving the blade of a screwdriver or another tool) to facilitate lifting the removable hatch 150 over the tab 156. According to some embodiments, the first end cap 31 may include a hatch trap 158 configured to receive an end of the removable hatch 150 associated with the first end 142 of the bundle enclosure 40. The hatch trap 158 may take the form of a gutter-shaped flange running along the exterior side of the first end cap 31 that receives the end of the removable hatch 150. In such embodiments, the removable hatch 150 is retained on the elongated wall 146 by the opposing side edges 148 of the elongated wall 146 and between the tab 156 and the hatch trap 158.

Figure 37:
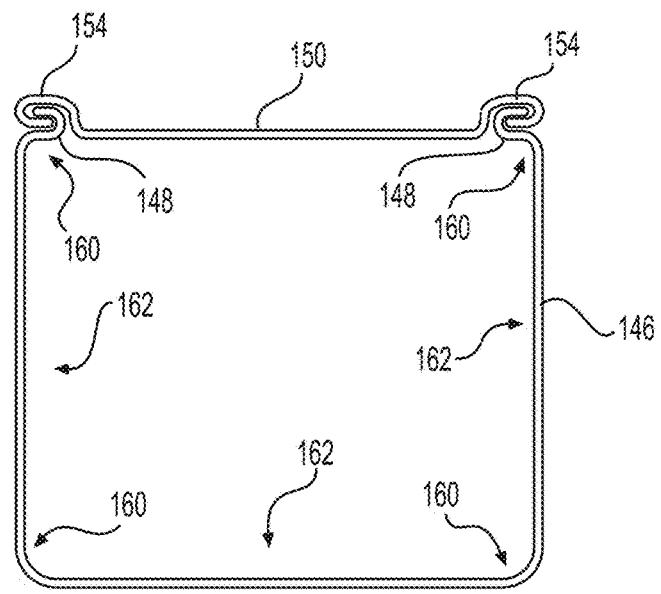
FIG. 37 is a cross-sectional view of an exemplary embodiment of a bundle enclosure.
Figure 38:
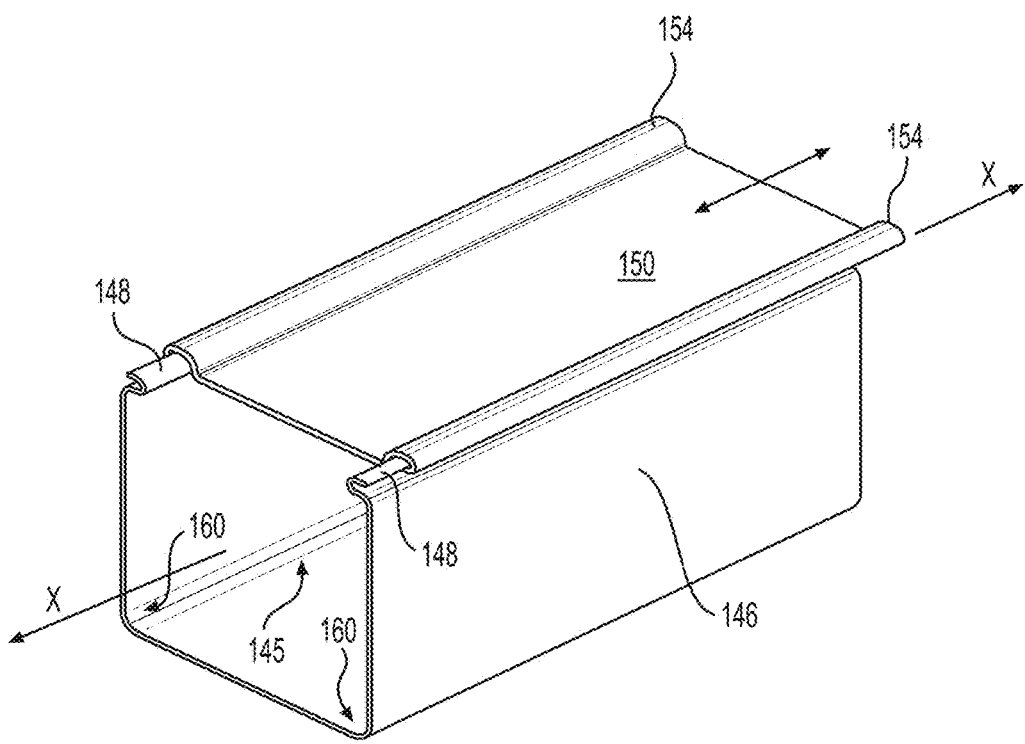
FIG. 38 is a partial perspective view of an exemplary embodiment of a bundle enclosure.
Figure 39:
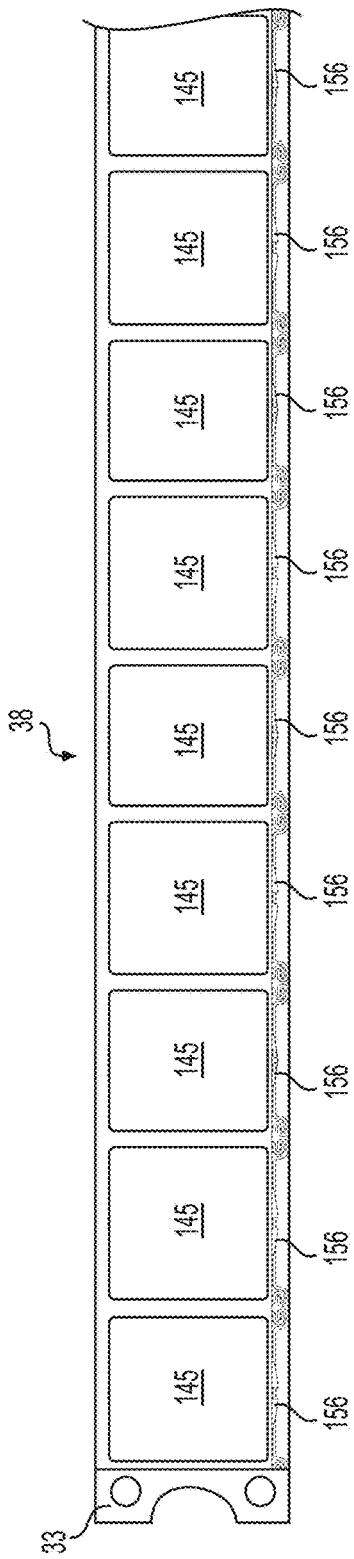
FIG. 39 is a top view of an exemplary embodiment of a row enclosure assembly.
Figure 40:
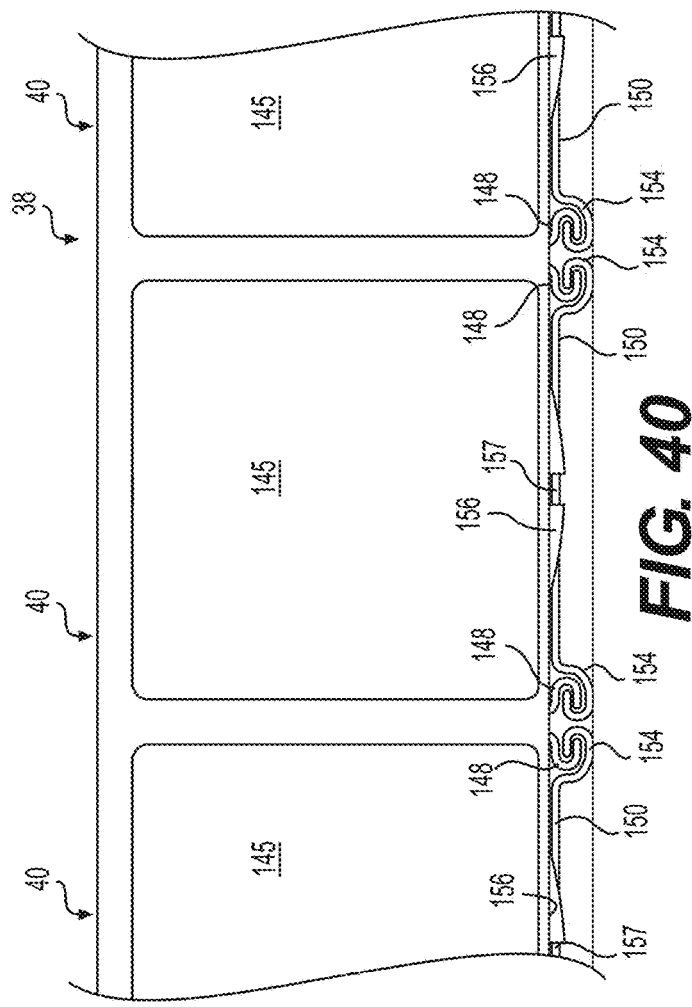
FIG. 40 is a detail view of the exemplary embodiment shown in FIG. 35.
Figure 41:
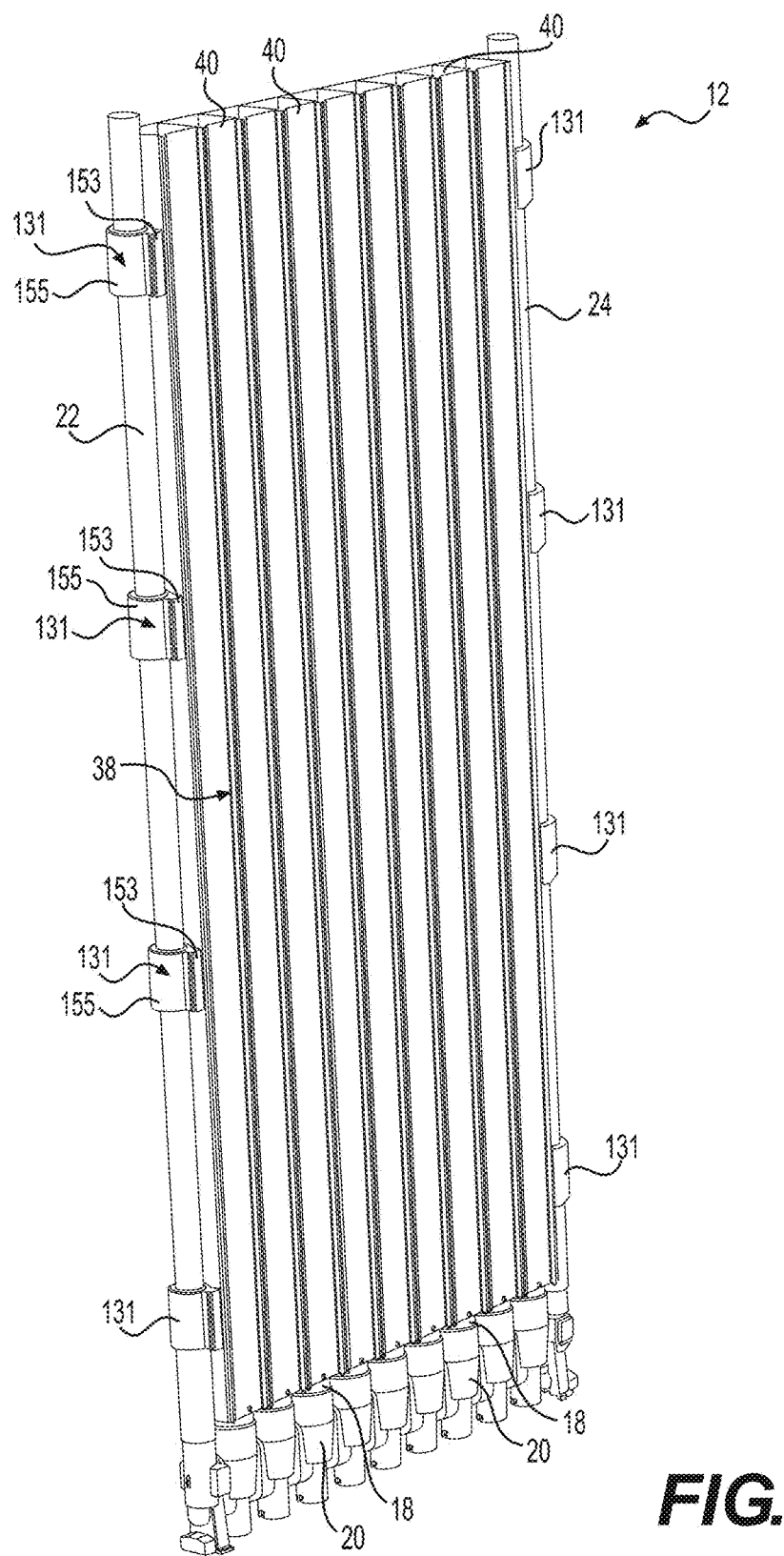
FIG. 41 is a perspective view of another exemplary embodiment of a row enclosure assembly.
Figure 42:
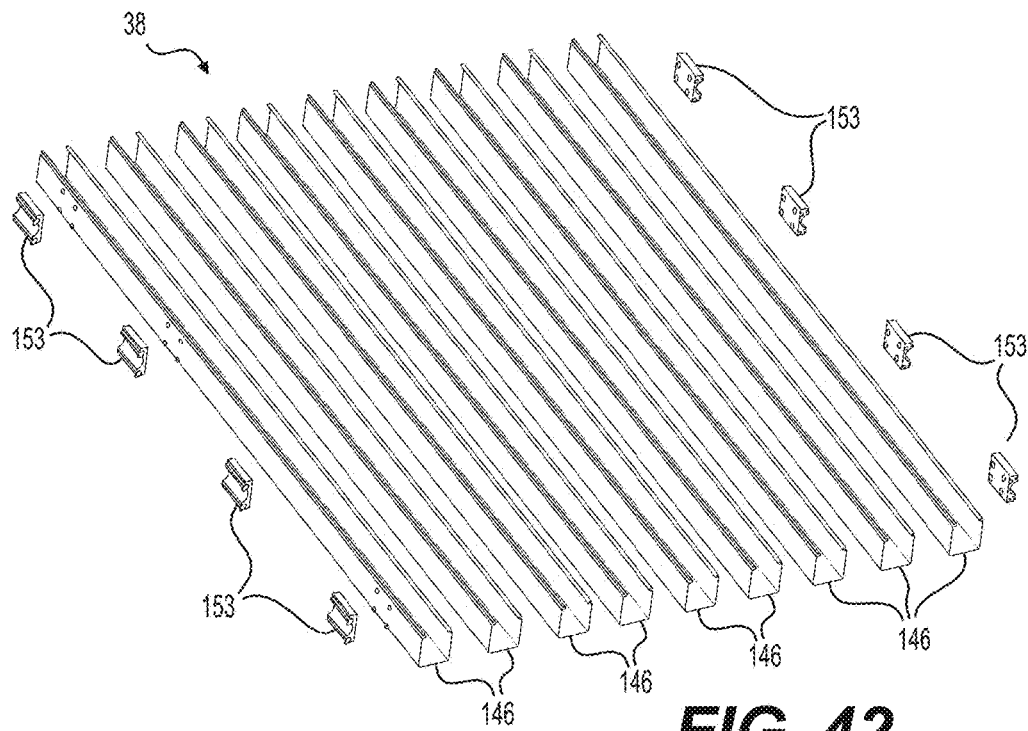
FIG. 42 is a perspective assembly view of portions of the exemplary row enclosure assembly of FIG. 41.
Figure 43:
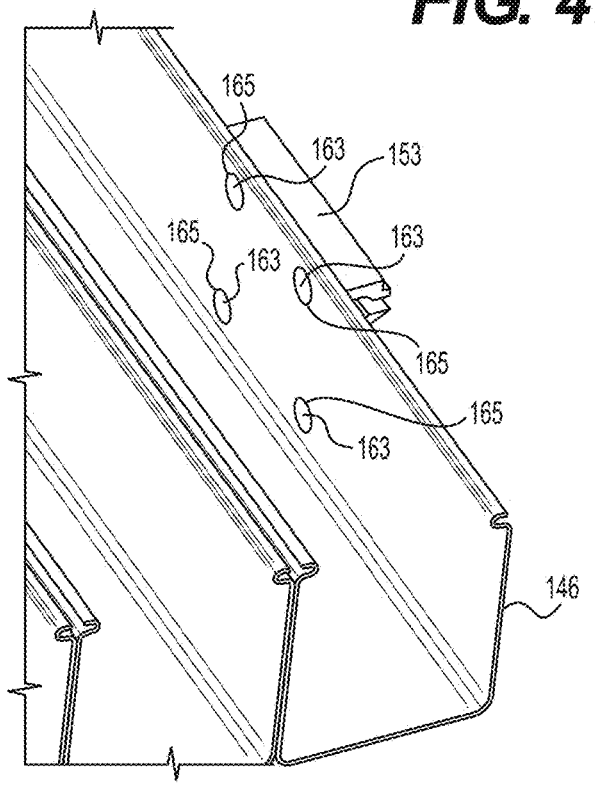
FIG. 43 is a detail perspective view of a portion of the exemplary embodiment shown in FIG. 41.
Figure 44:
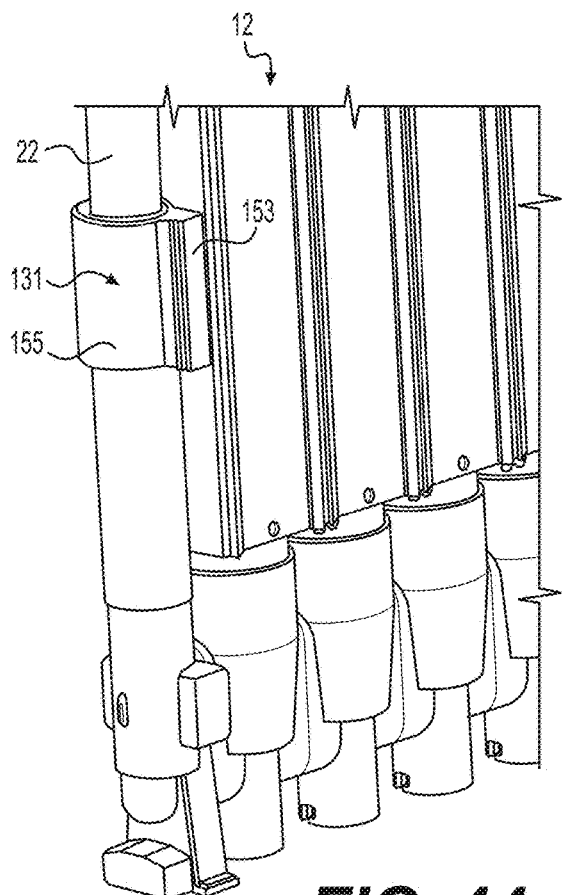
FIG. 44 is a detail perspective view of a portion of the exemplary row enclosure assembly of FIG. 27.
Figure 45:
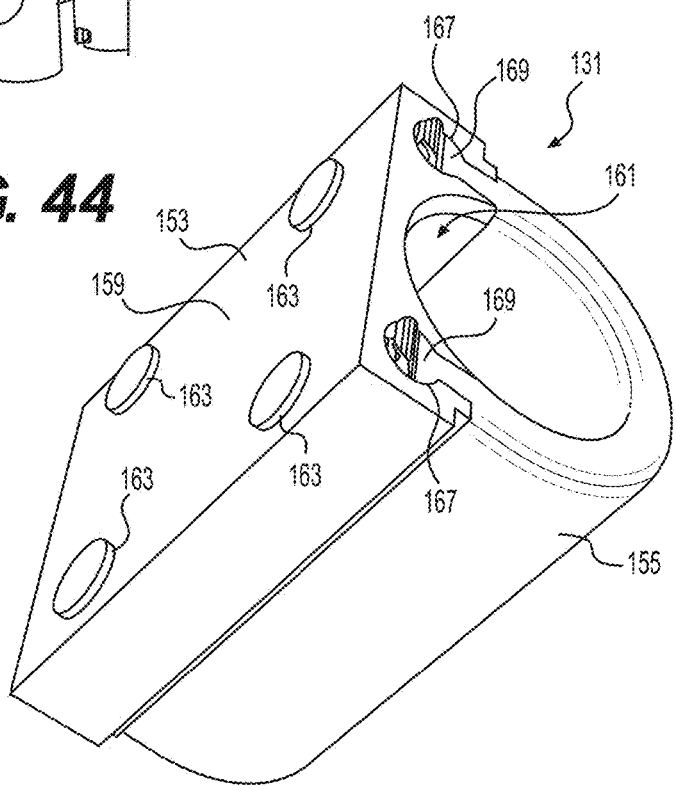
FIG. 45 is a detail view of an exemplary embodiment of a riser coupling assembly.
Figure 46:
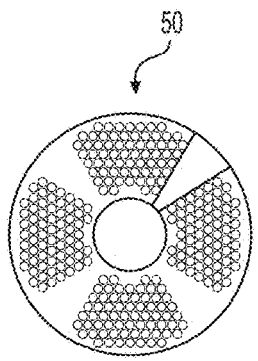
FIG. 46 is an exemplary embodiment of a fiber plate.
Figure 47:
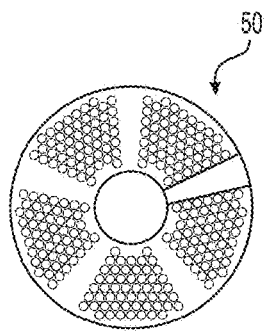
FIG. 47 is an exemplary embodiment of a fiber plate.
Figure 48:
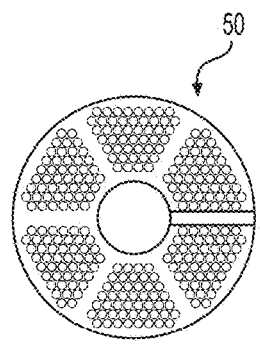
FIG. 48 is an exemplary embodiment of a fiber plate.
Figure 49:
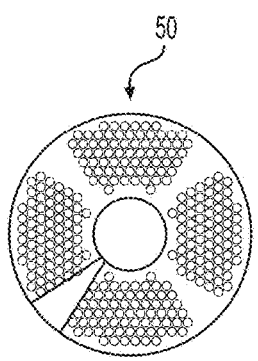
FIG. 49 is an exemplary embodiment of a fiber plate.
Figure 50:
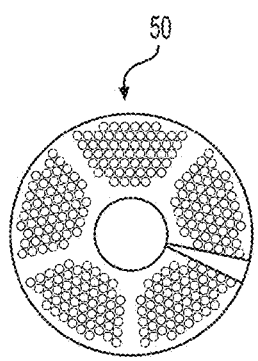
FIG. 50 is an exemplary embodiment of a fiber plate.
Figure 51:
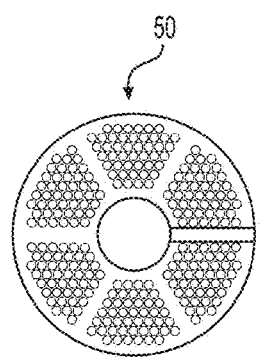
FIG. 51 is an exemplary embodiment of a fiber plate.
Figure 52:
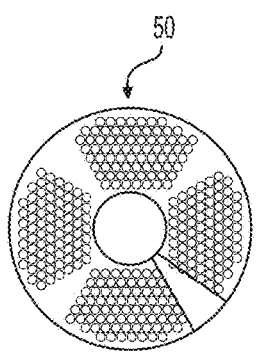
FIG. 52 is an exemplary embodiment of a fiber plate.
Figure 53:
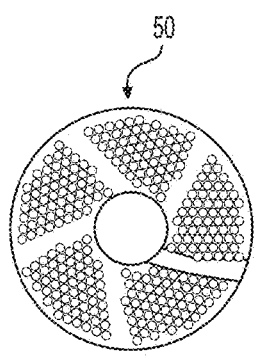
FIG. 53 is an exemplary embodiment of a fiber plate.
Figure 54:
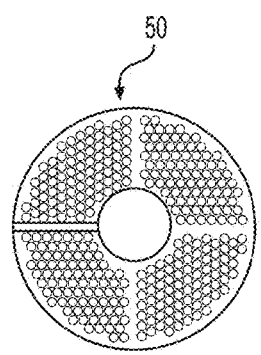
FIG. 54 is an exemplary embodiment of a fiber plate.

The exemplary bundle enclosure 40 has a cross-section perpendicular to the longitudinal axis X (see, e.g., FIG. 35). The cross-section of the bundle enclosure 40 may be polygonal-shaped, rectangular-shaped, square-shaped (see, e.g., FIG. 37), circular-shaped, oval-shaped, or any combination thereof. According to some embodiments, such as shown in FIG. 37, the cross-section of the bundle enclosure 40 includes rounded interior surfaces 160. According to some embodiments, an interior side 162 of the elongated wall 146 is devoid of seams transverse with respect to the longitudinal axis X of the bundle enclosure 40. This may reduce or prevent damage to the hollow-fiber membranes 32. According to some embodiments, the elongated wall 146 has a cross-section perpendicular to the longitudinal axis X, and the cross-section of the elongated wall 146 is at least one of concave with respect to the interior of the bundle enclosure 40, channel-shaped, U-shaped, and C-shaped. According to some embodiments, the elongated wall 146 is formed as a single piece. According to some embodiments, the removable hatch 150 is formed as a single piece. For example, the elongated wall 146 and/or the removable hatch 150 may be formed via extrusion or roll-forming, or any other similar process, such as vacuum thermoforming. The elongated wall 146 and/or the removable hatch 150 may be formed from aluminum, polymer, carbon fiber, combinations thereof, and/or other materials having similar characteristics.

As shown in FIG. 35, enclosure assembly 38 may include a plurality (e.g., nine) of bundle enclosures 40. In some embodiments, enclosure assembly 38 may include more or less than nine (e.g., 5, 6, 7, 8, 10, 11, 12) bundle enclosures. As shown, the removable hatches 150 of the respective bundle enclosures 40 are accessible from a common side of the row enclosure assembly 38. This may facilitate ease of servicing. According to some embodiments, each bundle enclosure 40 is independent of the other bundle enclosures 40 of a given row enclosure assembly 38. For example, the elongated wall 146 and removable hatch 150 of a given bundle enclosure 40 may be removed from the row enclosure assembly 38 without affecting any of the other bundle enclosures 40 of the row enclosure assembly 38.

According to another exemplary embodiment, the row enclosure assembly 38 may not include one or more of the first and second ends caps 31 and 33. For example, as shown in FIGS. 41-45, the row enclosure assemblies 38 may be coupled together in an adjacent, side-by-side manner via a coupling mechanism or process, such as, for example, fasteners, adhesives, bonding, and/or welding, or any other coupling mechanisms or process known in the art. In some such embodiments, as explained in more detail herein, the permeate riser pipe 22 and aeration riser pipe 24 may be coupled directly to opposite ends of the row enclosure assembly 38, for example, via riser coupling assemblies 131 coupled to the outermost bundle enclosure 40, thereby holding the row enclosure assembly 38 together.

Figure 36:
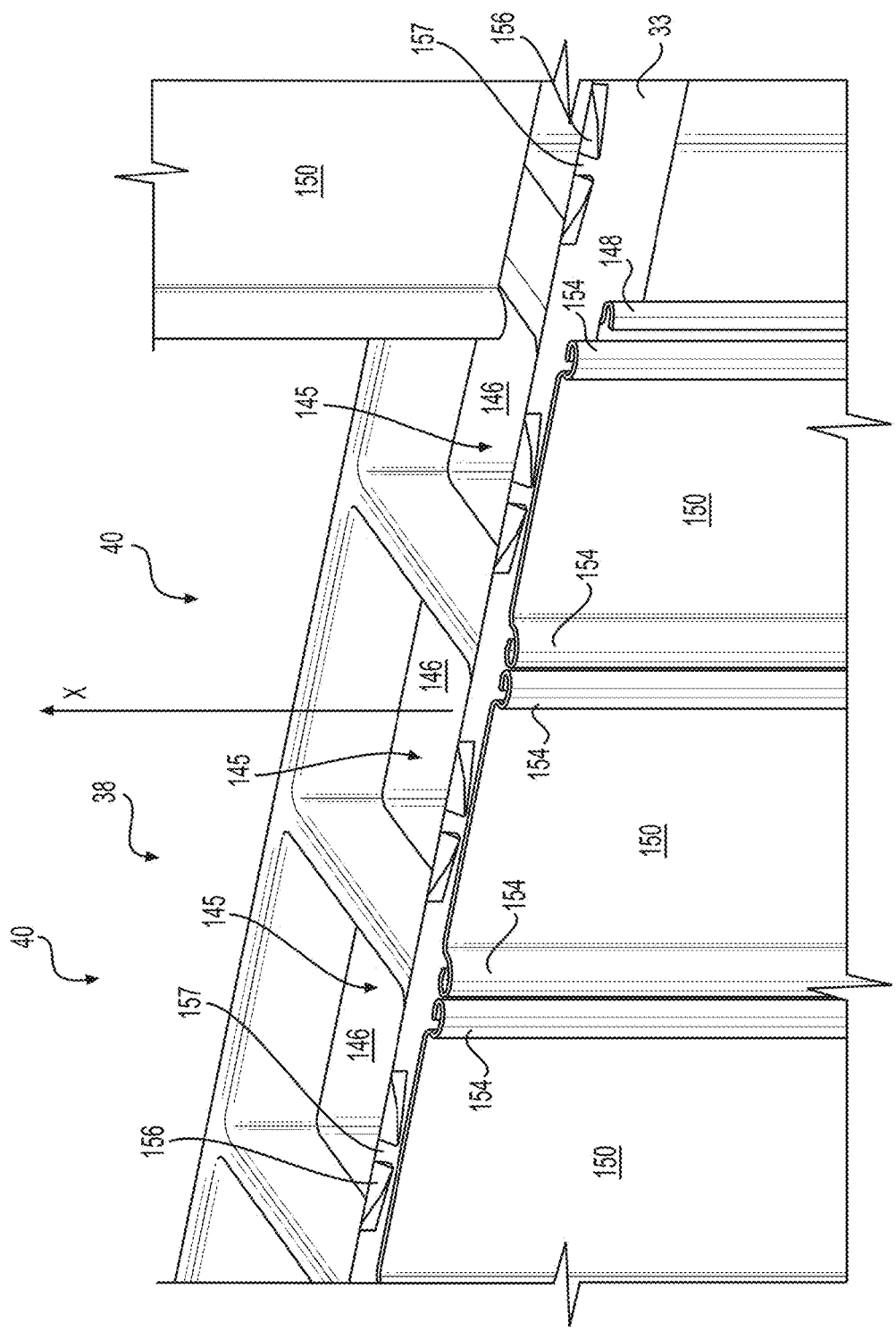
FIG. 36 is a detail view of the exemplary embodiment shown in FIG. 35.

For example, the sides of the elongated walls 146 of the adjacent bundle enclosures 40 may be coupled to one another as shown. According to some embodiments, the bundle enclosures 40 may include respective elongated walls 146 and/or removable hatches 150 similar to, or substantially the same as, the elongated walls and removable hatches of enclosure assemblies designed to be coupled to end caps, for example, as shown in FIGS. 35 and 36. For the embodiments that do utilize end caps, the removable hatch 150 may include holes at one or more of its longitudinal ends configured to receive a fastener (e.g., a pin-like fastener) configured to secure the longitudinal position of the removable hatch 150 with respect to the corresponding elongated wall 146. Other ways of securing the longitudinal position of the removable hatch 150 with respect to the corresponding elongated wall 146 are contemplated.

As shown in FIGS. 41-45, the exemplary riser coupling assemblies 131 include a base member 153 configured to be coupled to the elongated wall 146 of the outermost bundle enclosures 40 of the row enclosure assembly 38, and a sleeve member 155 configured to extend around either of the riser pipes 22 and 24. In the exemplary embodiment shown, the base member 153 includes a substantially planar engagement surface 159 configured to abut the elongated wall 146, and a semi-cylindrical-shaped recess 161 configured to receive an outer surface of the riser pipe 22 or 24. The engagement surface 159 of the exemplary base member 153 may include a plurality of locators 163 configured to fit into corresponding holes 165 in the elongated wall 146 of the bundle enclosure 40. The locators 163 may serve to more securely couple and locate the base members 153 with respect to the bundle enclosure 40. The base members 153 may be coupled to the elongated wall 146 via known coupling mechanisms, such as, for example, fasteners, adhesives, bonding, and/or welding, or any other coupling mechanisms known in the art.

Exemplary base members 153 also include a pair of channels 167 on opposite sides of the recess 161 configured to receive opposing ends 169 of the sleeve member 155 for coupling the sleeve member 155 and base member 153 to one another via, for example, a longitudinal sliding action with respect to one another. In addition, according to some embodiments, the ends 169 of the sleeve member 155 may include features that prevent, or reduce the likelihood of unintentional sliding of the sleeve member 155, relative to the base member 153 as a result of, for example vibration, after assembly of base member 153 and sleeve member 155.

Embodiments that do not include one or more of the end caps may have possible advantages. For example, for some embodiments including an end cap associated with the header, the fiber membranes of the bundles may need to be inserted through the apertures in the end cap during assembly, which may increase time associated with assembly of the filtration module. In addition, the wall thickness associated with the end cap may reduce the cross-section for fluid flow through the filtration module. Further, the end caps may add to the difficulty of assembly of the filtration module due, for example, to the necessity of lining up the end caps with the enclosure assemblies. The end caps may also increase the cost of the filtration module.

Fiber Plates

FIGS. 46-54 show a number of exemplary embodiments of fiber plates 50 having various fiber hole arrangements. When assembled, the fiber plate 50 may be spaced at least slightly from the ends of the hollow-fiber membranes 32 (i.e., within the length of the fiber membrane (see FIG. 9). As shown in FIGS. 46-50, the hollow-fiber membrane 32 hole pattern of fiber plates 50 can vary. The hollow-fiber membranes 32 of a given fiber bundle 18 may be divided into separate sections and may be generally positioned in spoke-like relationships, wherein the "spokes" represent channels through the fiber bundle 18 that do not include any hollow-fiber membranes 32. These channels (e.g., sludge channels) provide openings through which fluid and/or any debris may travel along the bundle 18 of the hollow-fiber membranes 32. The number of hollow-fiber membranes 32 and their spacing may be arranged to reduce clogging potential and/or increase recirculation rates of the fluid in order to achieve higher sustainable permeate fluxes. The number of hollow-fiber membranes 32 within a bundle 18 and/or the configuration of the channels may be selected specific to the application in which the filtration module 10 is operating.

The bundle configuration may affect overall performance, as it interfaces with both the aeration delivery and bundle enclosure assembly. The number of fibers and their spacing may be optimized to reduce clogging and increase recirculation rates in order to achieve higher sustainable fluxes. Mixed liquor suspended solids (MLSS) concentration (typically between 8 and 15 g/L) and sludge filterability, often measured with time to filter (TTF), impact the optimal fiber packing density. TTF can be a measure of sludge quality and is obtained using a TTF test, which according to the TTF Standards Method 2710H measures the time required to filter a sludge sample through a 1.2 micron filter disc under vacuum pressure. Higher values indicate greater resistance to filtration due to physical and chemical properties of sludge flocs, including extracellular polymeric substances and other constituents in the mixed liquor. This TTF average value is for a mixed liquor concentration of 12 g/L in the pilot membrane tank, averaged over a year. The higher the MLSS concentration and TTF and the lower the sludge filterability, the lower the packing density. The gaps between fiber groups influence the migration of fresh sludge into the bundle. The aeration system also utilizes these pathways when the large bubble pulses to expel solids that have built up during filtration.

Method of Operation/Testing

Figure 55:
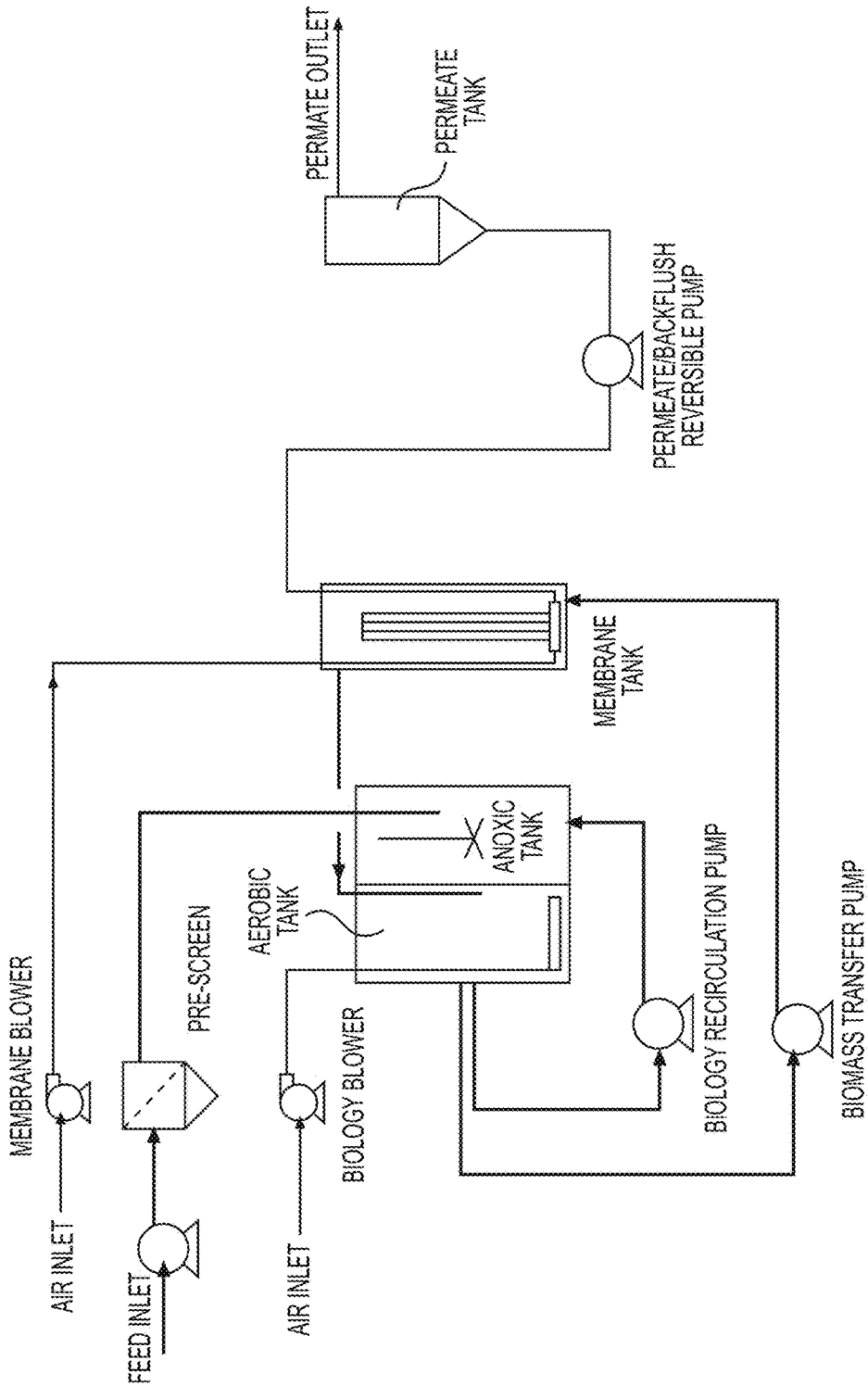
FIG. 55 is a flow schematic of a pilot system utilized for testing exemplary embodiments of a membrane row.

As described herein, module 10 may be installed within a membrane filtration system to treat liquid 42 contained in tank 44. To demonstrate the performance of various gasification devices (e.g., intermittent aeration and pulse aeration) utilized with module 10 in conjunction with bundle enclosure assemblies 38 and intermittent cages, as described herein, extensive pilot testing was performed on a variety of gasification device embodiments under a variety of performance conditions. The testing was generally performed on an individual membrane row. Primarily domestic wastewater was used for the liquid during testing. The pilot system included anoxic and aerobic tanks for nitrification/denitrification and aerobic degradation of organics. Mixed liquor was recirculated between the aerobic tank and a membrane tank housing the submerged membrane row. Permeate was withdrawn from the membrane row under vacuum through a reversible pump to a permeate/backflush tank. The pilot system utilized an aeration system during operation to regulate sludge accumulation on the membrane row and maintain permeability. Regular backflushing and chlorine maintenance cleaning was also conducted to regulate sludge accumulation and pore fouling of membranes. Feed water was prescreened with a 2 mm rotating drum brush screen prior to inlet to pilot biological tanks. A simplified process flow diagram of the pilot system utilized is illustrated in FIG. 55.

Phase 1 Testing

Table 8 is a list summarizing some of the general parameters used during the pilot testing.

TABLE 8

| | |
|---|---|
| Food/Mass Ratio (kg COD · day/kg MLSS) | 0.2 |
| Solids Retention Time (days) | 15 |
| Membrane Tank MLSS (mg/L) | 12 |
| Average Time to Filter 100 mL of Sludge (sec) | 197 |
| Average Pilot Annual Temperature (° C.) | 16 |
| Permeate Flux (LMH) | Variable |
| Air Scour Flow Rate (Nm$^3$/h) | Variable |
| Backflush Frequency (min) | 10 |

Phase 1 testing included testing four different membrane row configurations: (1) bundle enclosure assembly 38 with gasification device 34A (intermittent small bubble aeration); (2) bundle enclosure assembly 38 with gasification device 34B (pulsed aeration); (3) intermittent cages 170 with gasification device 34A (intermittent small bubble aeration); and (4) intermittent cages 170 with gasification device 34B (pulsed aeration).

For Phase 1 testing a membrane row, referred to herein as membrane row A, was used. The characteristics of membrane row A are shown in Table 9 below.

TABLE 9

| | Row A |
|---|---|
| Membrane Chemistry | PVDF |
| Packing Density (Number of Fibers per Bundle) | 280 |
| Fiber Length (m) | 1.83 |
| Number of Sludge Paths | 5 |
| Cage Type | Bundle Enclosure or Intermittent Cage |

Membrane row A was used for all of the Phase 1 testing. A chlorine and acid recovery clean of membrane row A was performed in June 2014 in order to restore membrane permeability, which had declined naturally since the row's installation in December 2013. As a result of this cleaning as well as of differing membrane life throughout the duration of testing, absolute values of TMP and membrane permeability can vary. Therefore, one measure that may be used to evaluate pilot performance is the membrane fouling rate per 10-minute production cycle. During permeation, transmembrane pressure (TMP) increases as membrane pore fouling and cake layer formation on the membrane surface occur. This rate of TMP rise per cycle is the fouling rate. Under normal operation, TMP is restored to a low level after each backflush. Permeability decline rate is proportional to the fouling rate. Fouling rates may be compared between data sets with varying membrane age.

Figure 56:
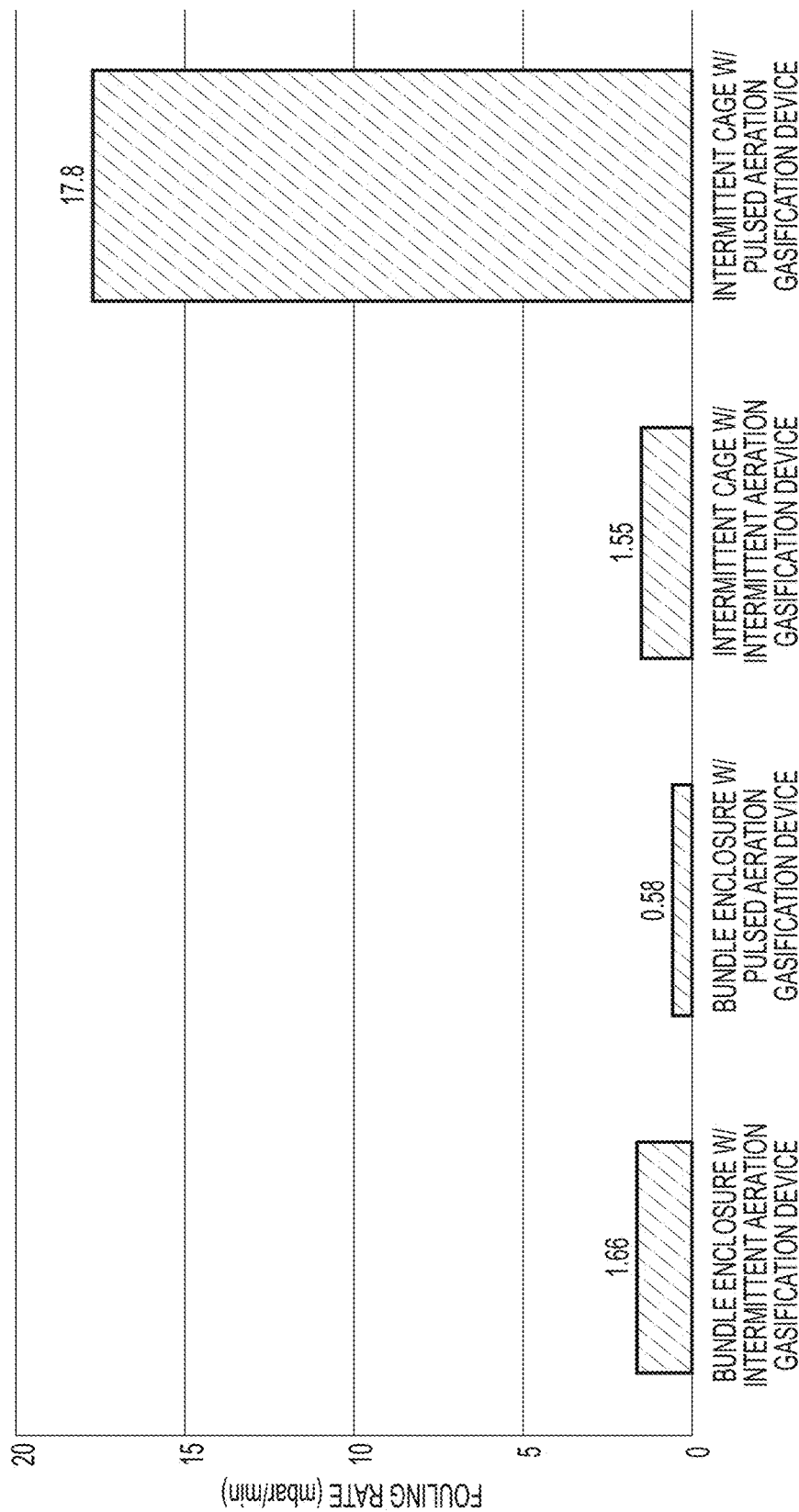
FIG. 56 is a chart of fouling rates for different configurations of membrane rows.

During Phase 1 testing, the four different membrane row configurations were tested and during testing were operated at a flux of 31 LMH with an air scour flow rate of 5 Nm³/h, with all other process parameters held uniform. The chart shown in FIG. 56 summarizes the average fouling rate results for the four different membrane row configurations. The Phase 1 testing results demonstrate that the combination of a bundle enclosure with pulsed aeration minimizes the fouling rate better than any of the other configurations. Pulsed aeration without the use of a bundle enclosure (i.e., intermittent cage) to confine the large air bubbles and to concentrate air scour effectiveness failed to achieve the same stability. With intermittent aeration (i.e., small bubble), intermittent cages were slightly more successful than the bundle enclosures, but neither configuration was able to match the low fouling rate (i.e., 0.58 mbar/min) of the bundle enclosure with the pulsed aeration.

The individual testing data for the four membrane row configurations provided herein in the form of performance scatter plot graphs. In the performance graphs referenced as follows permeate gross flux, TMP, and permeability are presented. Some selected graphs show magnified performance on a shorter time scale, demonstrating the TMP rise during each 10-minute production cycle as sludge dewatering occurs and a cake layer builds on the membrane surface, followed by a backflush. Temperature corrected permeability (normalized to 20° C.) accounts for deviations in temperature during this time, between 16-26° C.

Configuration 1—Bundle Enclosure w/ Intermittent Aeration Gasification Devices

Figure 57:
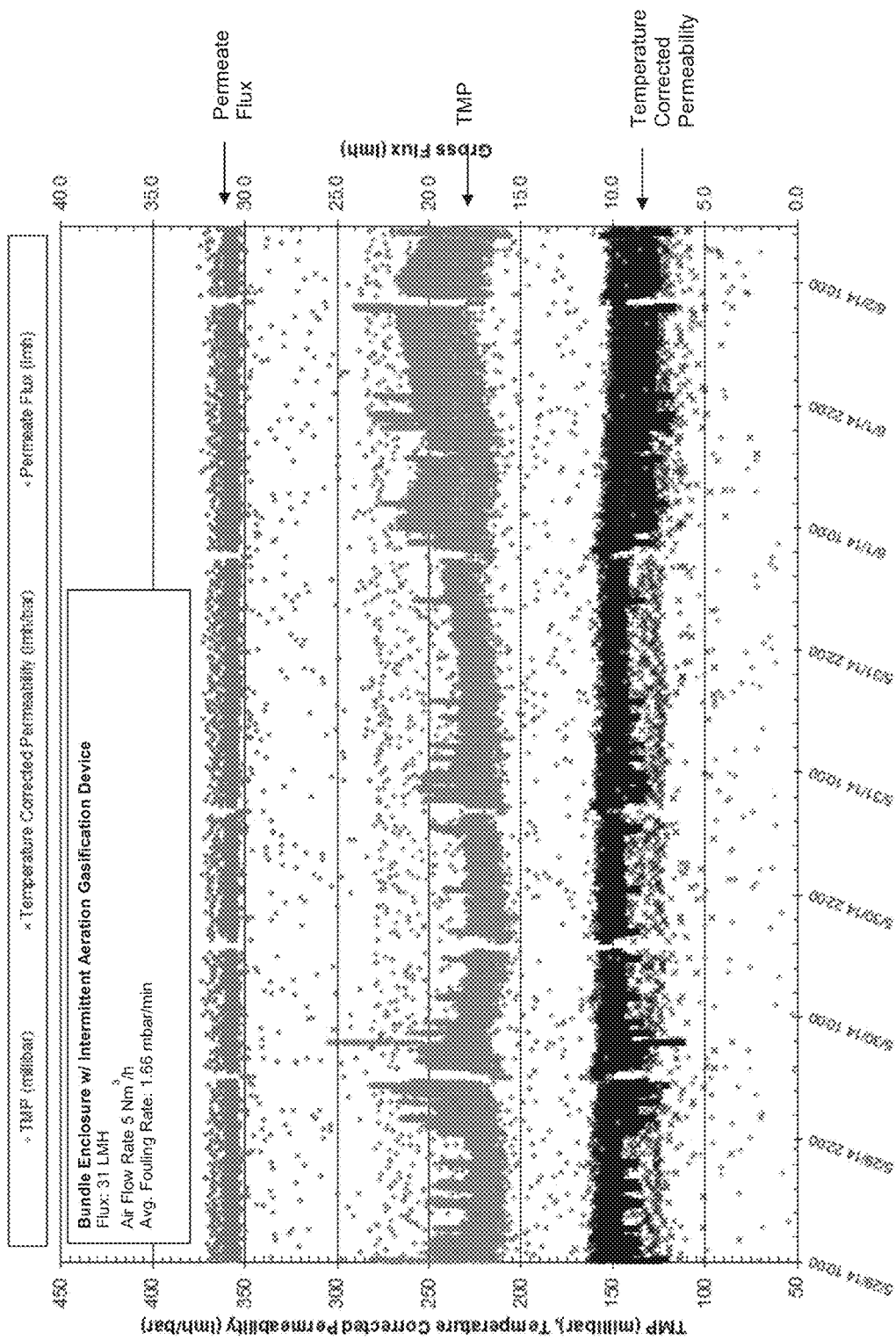
FIG. 57 is a scatter plot of test results for a first configuration of a membrane row according to an exemplary embodiment.
Figure 58:
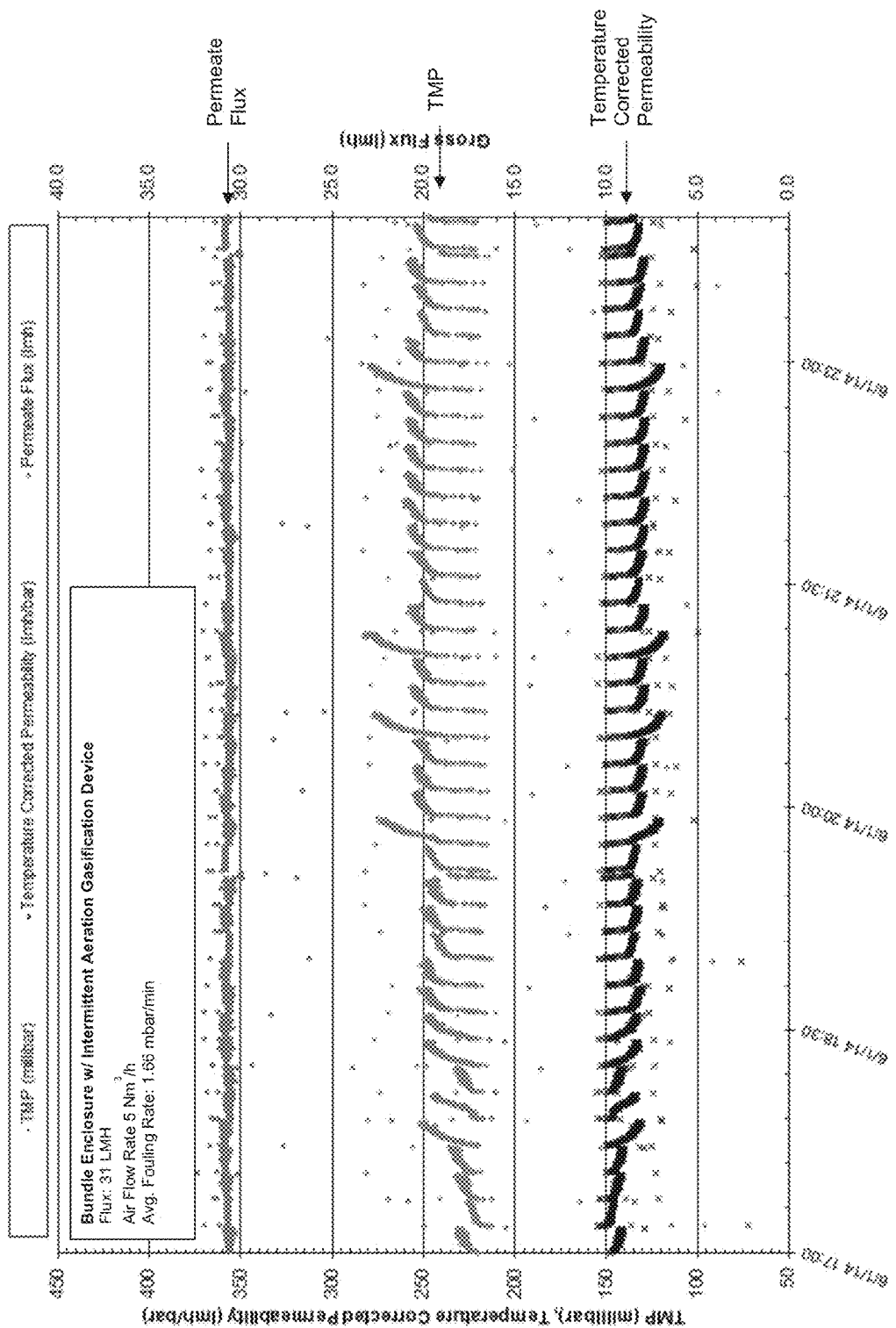
FIG. 58 is a magnification of a portion of the scatter plot of FIG. 57.

The first membrane row configuration tested includes a bundle enclosure with intermittent aeration gasification devices (e.g., 34A). FIG. 57 demonstrates performance of configuration 1 over the course of several days of testing. Variable TMP results were observed, with some spikes and some periods of a wider TMP band. Permeability ranged from 120-160 LMH/bar. The average fouling rate during these four days was 1.66 mbar/min with some values up to 8.5 mbar/min. In FIG. 58, magnified performance data show that individual production cycles may have significantly different fouling rates.

Configuration 2—Bundle Enclosure w/ Pulsed Aeration Gasification Devices

Figure 59:
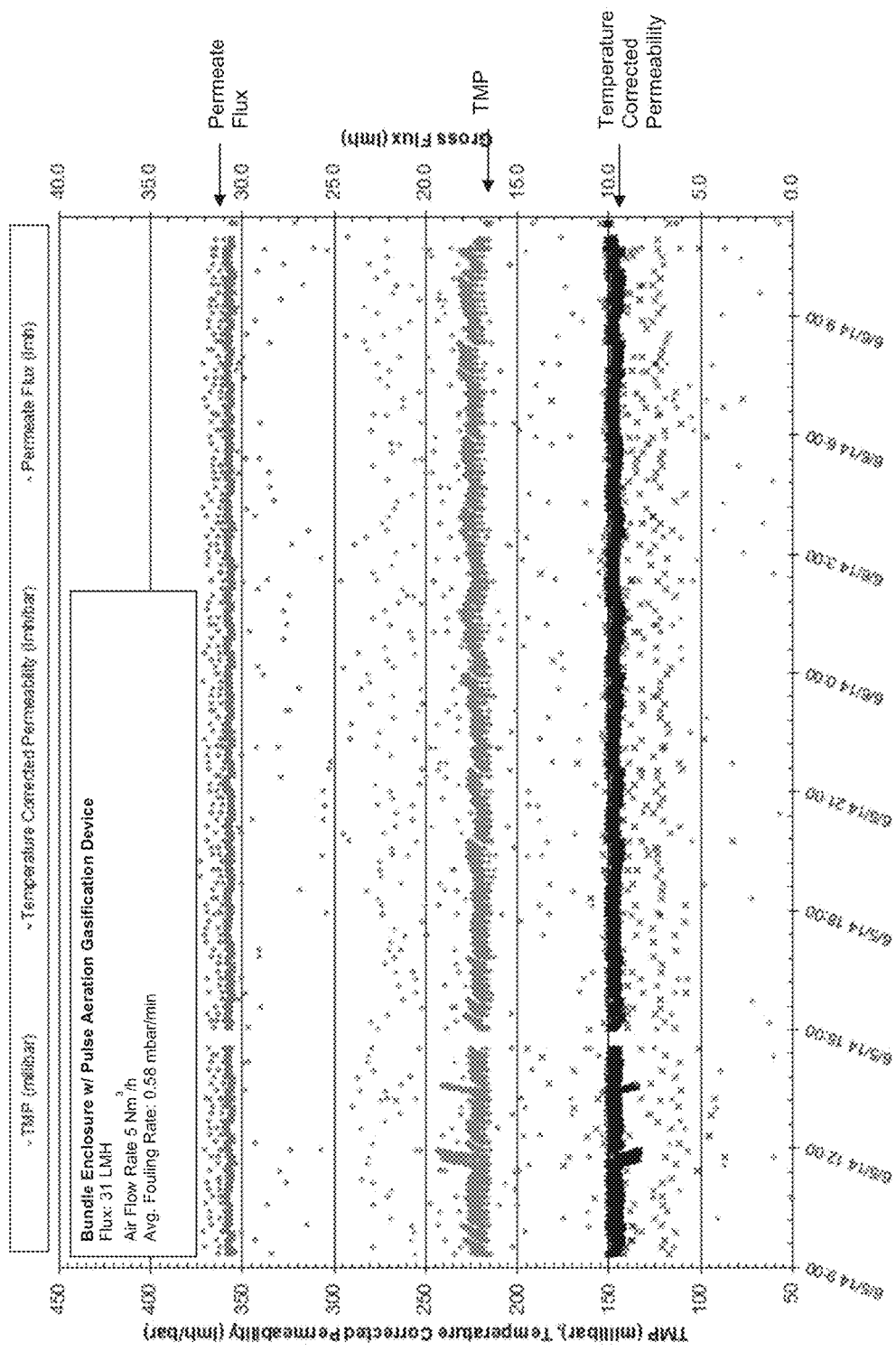
FIG. 59 is a scatter plot of test results for a second configuration of a membrane row according to an exemplary embodiment.
Figure 60:
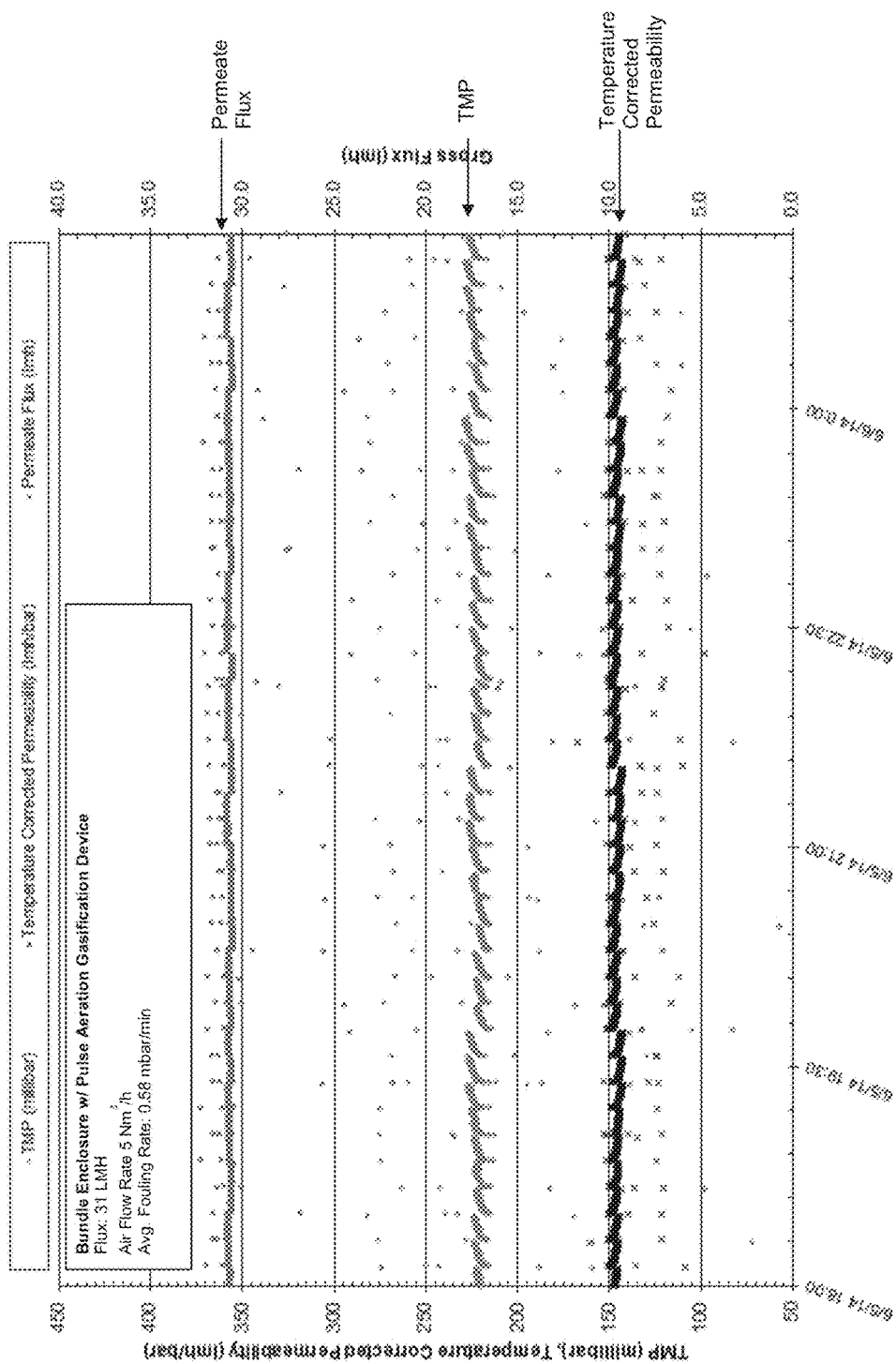
FIG. 60 is a magnification of a portion of the scatter plot of FIG. 59.

The next membrane row configuration tested included a bundle enclosure with a pulsed aeration gasification device (e.g., 34B). FIG. 59 demonstrates performance of configuration 2 over the course of several days of testing. Membrane row configuration 2 had very stable TMP during operation, resulting in a narrower range of permeability between 140-150 LMH/bar. This testing was conducted in days following performance in FIGS. 57-58 which led to the minor decline in the permeability absolute value. The average fouling rate for membrane row configuration 2 was 0.58 mbar/min, or nearly one third of the fouling rate for membrane row configuration 1. In both configurations, the bundle enclosure isolates air within each bundle's cage. In FIG. 60, magnified performance data show that individual production cycles maintained very stable fouling rates over the 10 minute production cycles.

The previous data for configurations with bundle enclosures were collected after 6 months of membrane row operation during which permeability had declined naturally. The data with intermittent cages referenced as follows were collected after a recovery clean of the membrane row, which increased membrane permeability. Comparison of the fouling rate between data sets provides a more direct comparison between configuration than TMP and permeability absolute values since these are affected by this recovery clean process.

Figure 61:
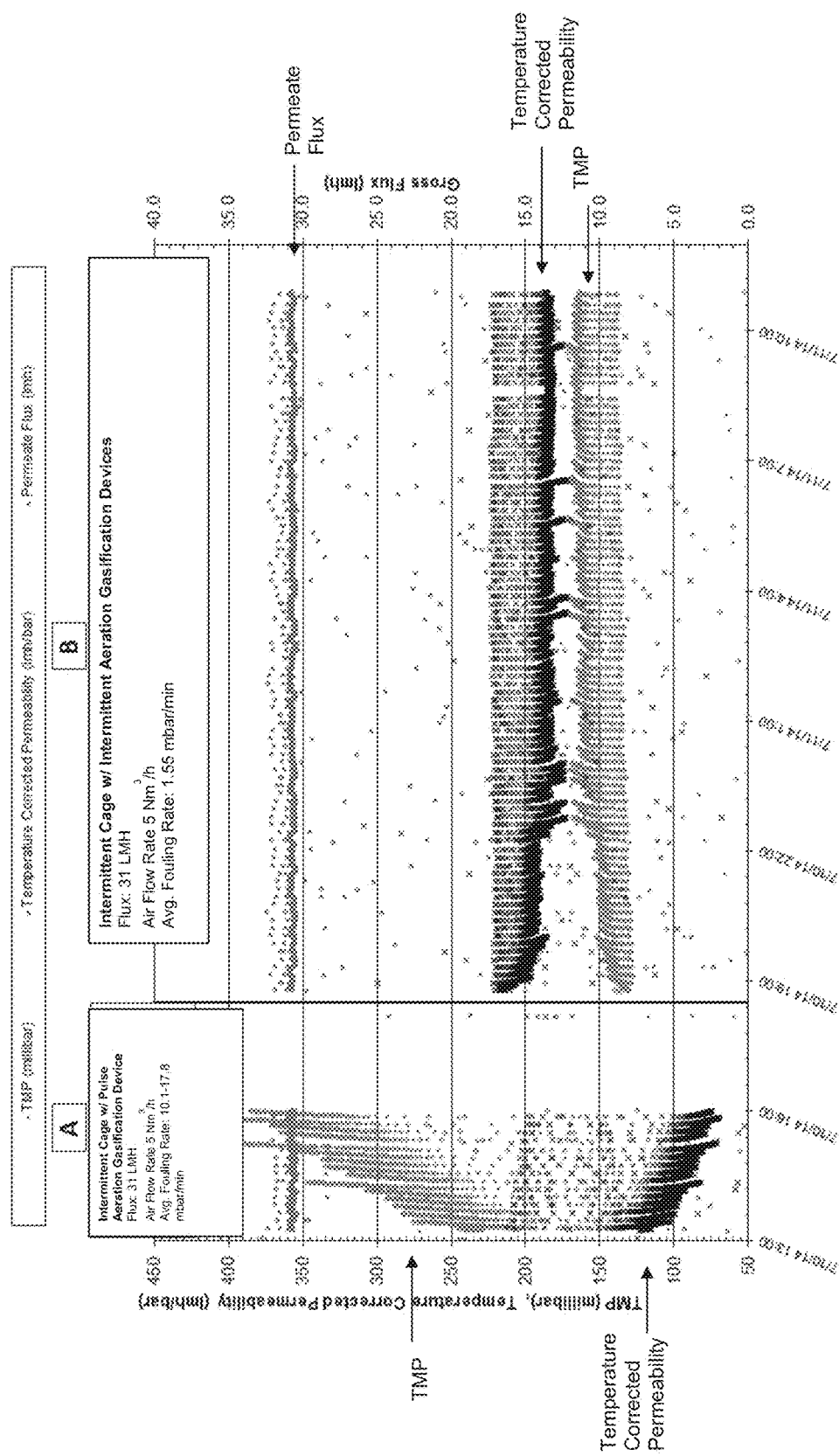
FIG. 61 is a scatter plot of test results for a third and fourth configuration of a membrane row according to exemplary embodiments.

Configurations 3 and 4—Intermittent Cage w/ Pulsed and Intermittent Aeration Gasification Devices The next membrane row configurations tested included intermittent cages with a pulsed aeration gasification device and then an intermittent aeration gasification device. As described herein, the intermittent cages allow air exiting from each bundle body to move freely around the membrane row and potentially scour fibers from various bundles. FIG. 61 demonstrates performance of configurations 3 and 4, first with the pulse aeration gasification devices (i.e., portion A) and then with the intermittent aeration gasification devices (i.e., portion B).

Figure 62:
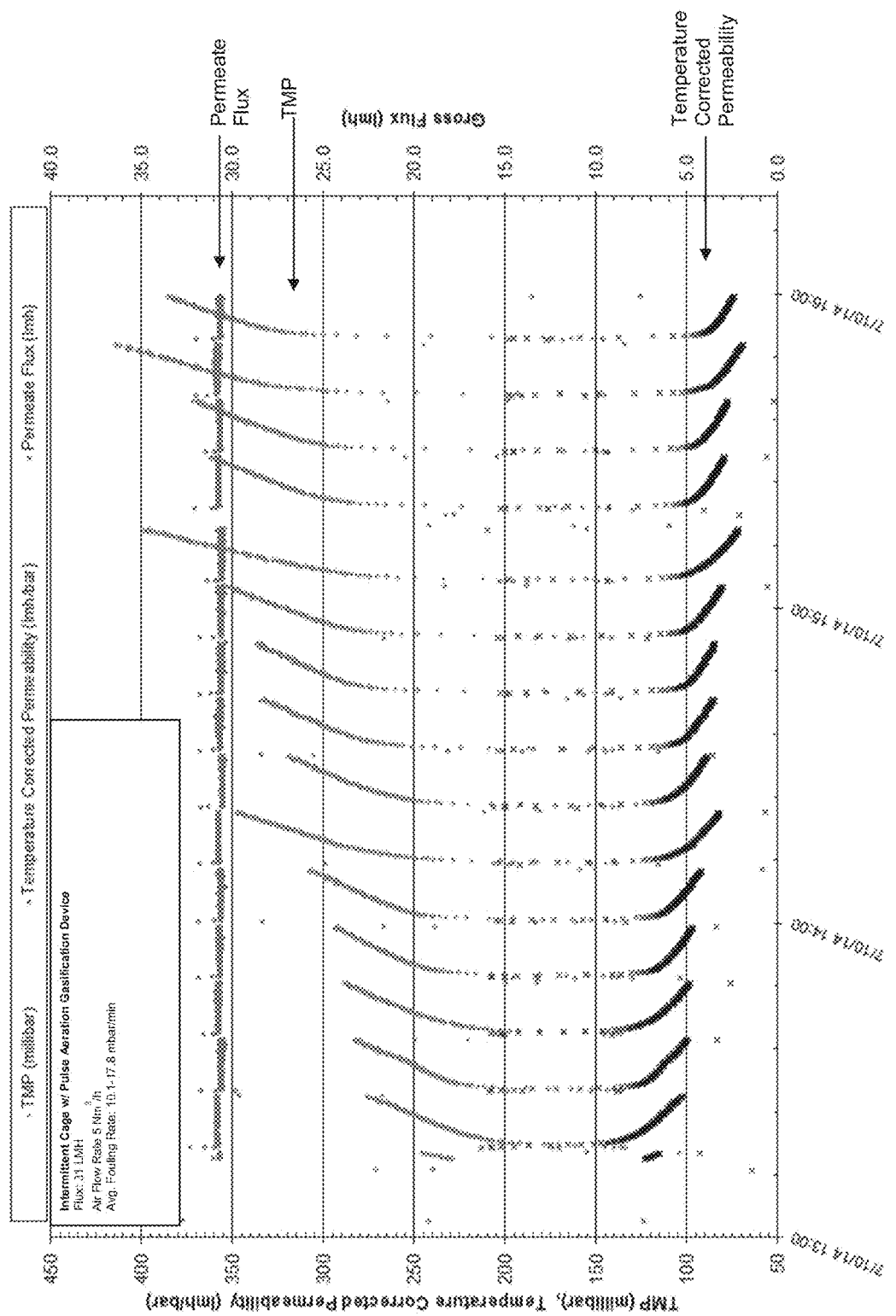
FIG. 62 is a magnification of a portion of the scatter plot of FIG. 61 corresponding to membrane row configuration 4.

Portion A of FIG. 61 demonstrates that, with intermittent cages, pulse aeration gasification devices are unable to achieve the same performance as pulse aeration gasification devices with bundle enclosures. As shown in portion A of FIG. 61, the TMP rose rapidly during the three hours of operation, and permeability declined from 150 to 75 LMH/bar. The fouling rate increased from 10.1 to 17.8 mbar/min before testing was ended due to the instability and very significant sludge accumulation observed during this time. For configuration 3 testing, the large gaseous bubbles created by the pulsed aeration gasification devices were free to migrate away from the membrane row since they were not confined by the bundle enclosures. As a result of this loss in air scour confinement, performance declined rapidly. In FIG. 62, magnified performance of configuration 3 shows the instability of the fouling rate and the dramatic increase during each production cycle.

Figure 63:
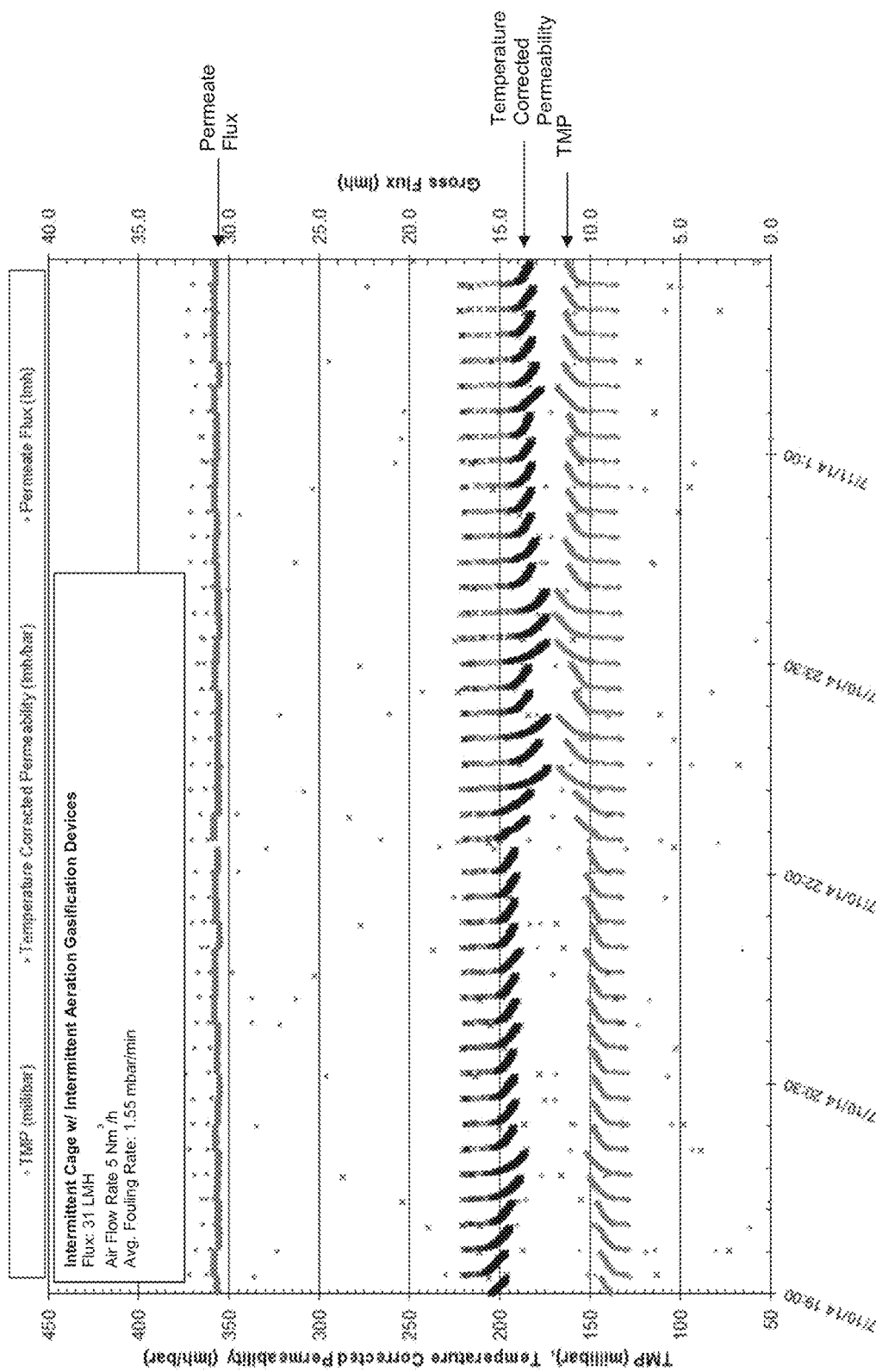
FIG. 63 is a magnification of a portion of the scatter plot of FIG. 61 corresponding to membrane row configuration 3.

Portion B of FIG. 61 demonstrates that, when intermittent cages are used, intermittent aeration gasification devices are more effective than pulse nozzles and may maintain more stable TMP. For portion B, permeability ranged from 175-225 LMH/bar and the fouling rate averaged 1.55 mbar/min. In FIG. 63, magnified performance of configuration 4 shows the variability in individual production cycles.

Phase 1 testing showed that, among the four membrane row configurations tested, the membrane row with the bundle enclosure and pulsed aeration gasification devices was most successful at minimizing TMP rise per cycle, or fouling rate. At a permeate flux of 31 LMH and an aeration air flow rate of 5 $Nm^3/h$, fouling rates with intermittent gasification devices with bundle enclosures and intermittent cages were 1.66 mbar/min and 1.55 mbar/min, respectively. However, when pulse aeration gasification devices were used with bundle enclosures, the average fouling rate was 0.58 mbar/min.

Phase 2—Testing

Phase 2 testing was conducted in parallel to phase 1 testing utilizing a second pilot system. For Phase 2 testing a membrane row B with a lower fiber packing density was operated using bundle enclosures and two different gasification device types. The characteristics of membrane row B are shown in Table 10 below.

TABLE 10

|  | Row B |
| --- | --- |
| Membrane Chemistry | PVDF |
| Packing Density (Number of Fibers per Bundle) | 228 |
| Fiber Length (m) | 1.83 |
| Number of Sludge Paths | 6 |
| Cage Type | Bundle Enclosure |

Figure 64:
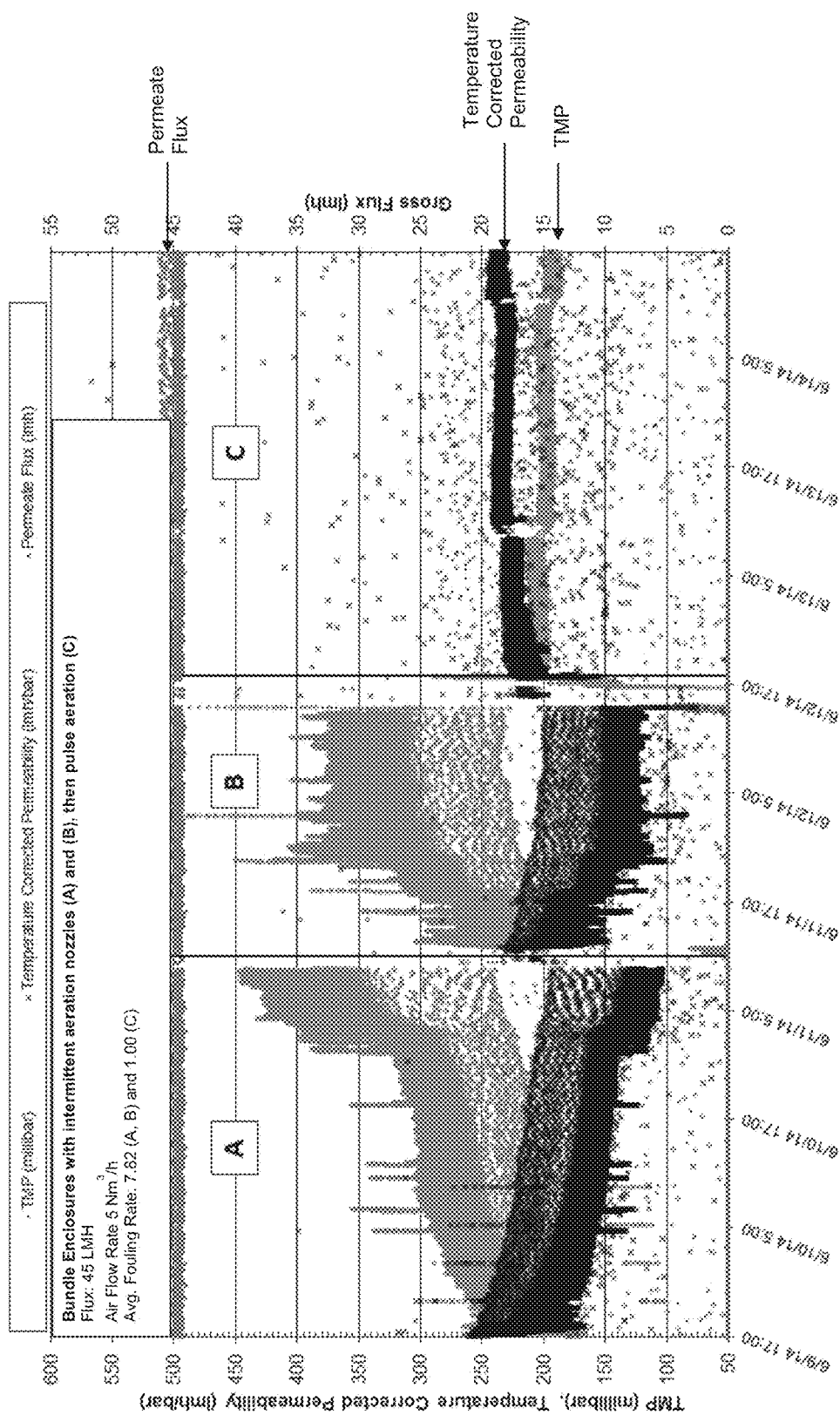
FIG. 64 is a scatter plot of test results for two different membrane row configurations.

For Phase 2 testing the membrane row was operated at a higher permeate flux of 45 LMH, which provided a sharper comparison between the two nozzle types (i.e., an intermittent aeration and a pulsed aeration gasification device). As shown in portion A of FIG. 64, at a permeate flux of 45 LMH and an aeration air flow rate 5 $Nm^3/h$, intermittent aeration gasification devices were unable to maintain a low fouling rate and permeability declined rapidly. After thoroughly cleaning the membrane row to remove all sludge accumulation, the same parameters were resumed, again with intermittent aeration gasification devices. Again, permeability declined rapidly as shown in portion B of FIG. 64. The average fouling rate with intermittent aeration gasification devices under these operating conditions was 7.82 mbar/min, with some individual production cycles featuring a fouling rate up to 39.8 mbar/min. In portion C of FIG. 64, after a thorough cleaning and the installation of pulse aeration gasification devices, performance immediately stabilized and the average fouling rate decreased to 1.00 mbar/min. This performance demonstrates the same behavior as testing with membrane row A in Phase 1, that bundle enclosures with pulsed aeration gasification devices may achieve lower fouling rates than with intermittent aeration gasification devices whether operating at permeate flux of 31 LMH or 45 LMH.

Phase 3—Testing

The goal of Phase 3 testing was to generate fouling rate data at various fluxes in order to determine the operational capability of membrane rows utilizing a bundle enclosure and pulsed aeration gasification devices. Phase 3 testing included performing a critical flux test with membrane row A having a bundle enclosure and intermittent aeration gasification devices and then pulsed aeration gasification devices. For each configuration the permeate flux was incrementally increased while monitoring the TMP rise in order to determine at what flux performance no longer becomes sustainable. This occurs when, at a particular flux, the TMP rise due to the combined impacts of membrane resistance, pore fouling, and cake layer buildup reaches a critical value where the system can no longer perform on a long term basis.

Figure 65:
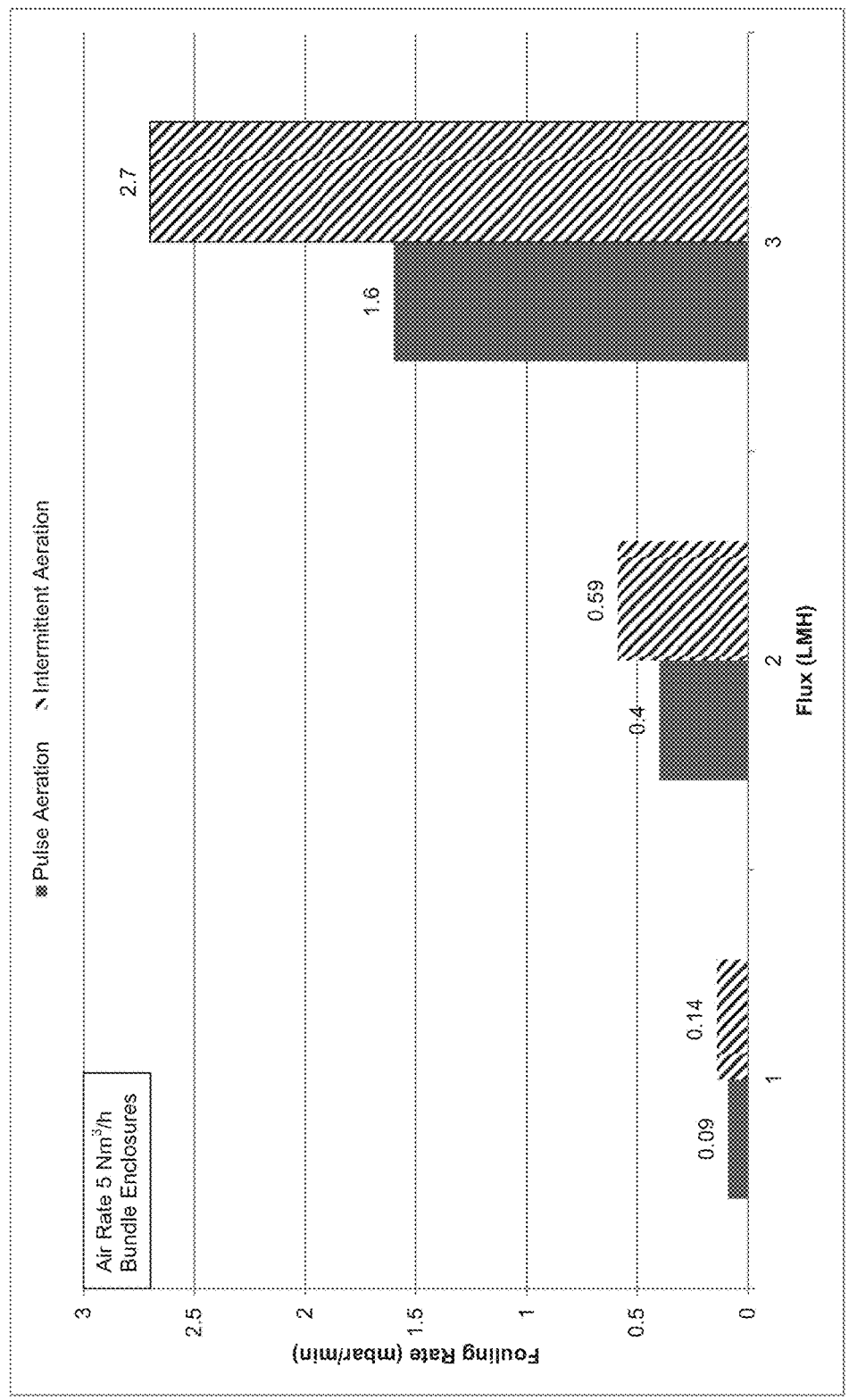
FIG. 65 is a chart of fouling rates for two different membrane row configurations at three different permeate flux rates.
Figure 66:
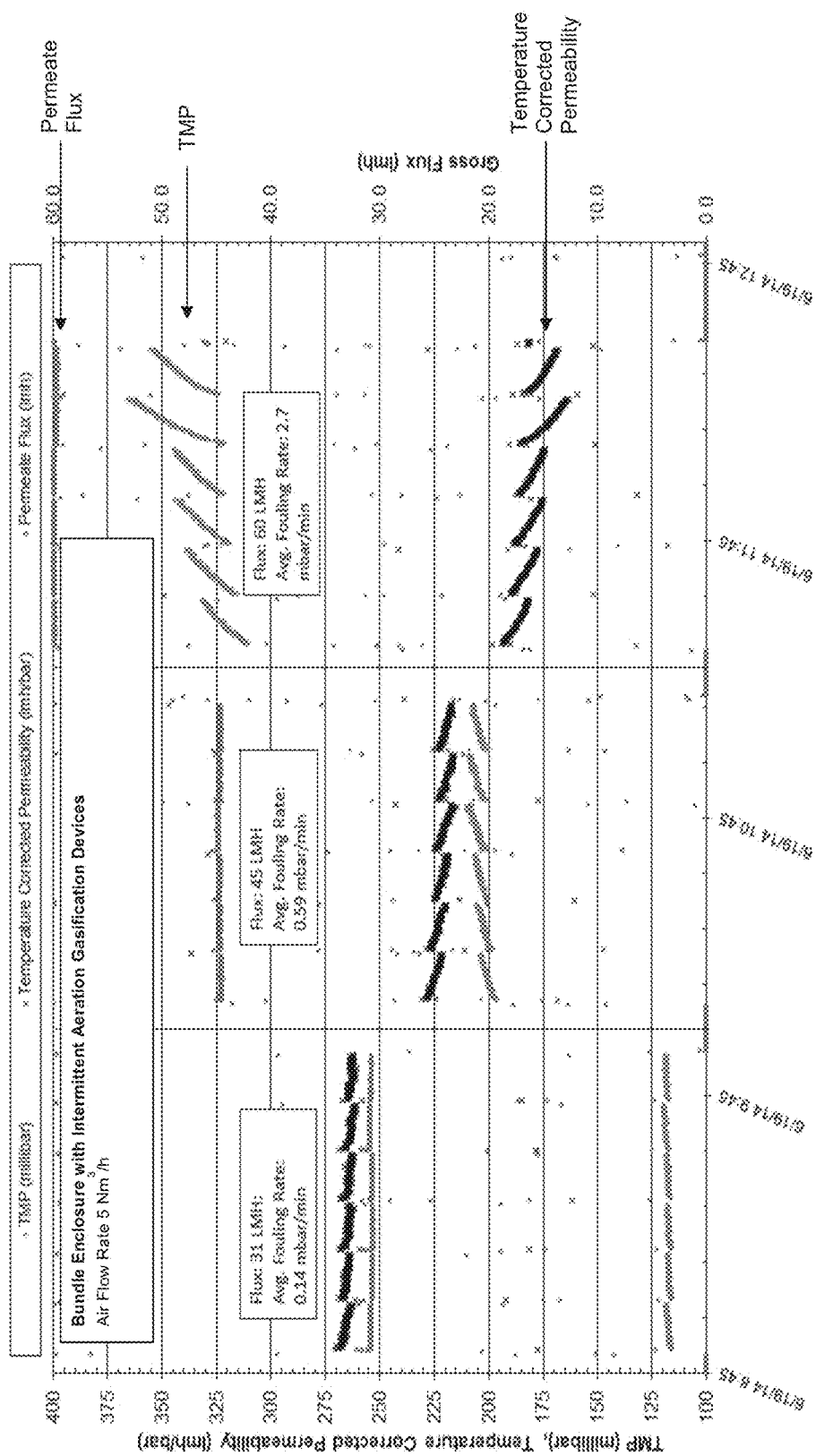
FIG. 66 is a scatter plot of test results for a membrane row operated at three different permeate flux rates.
Figure 67:
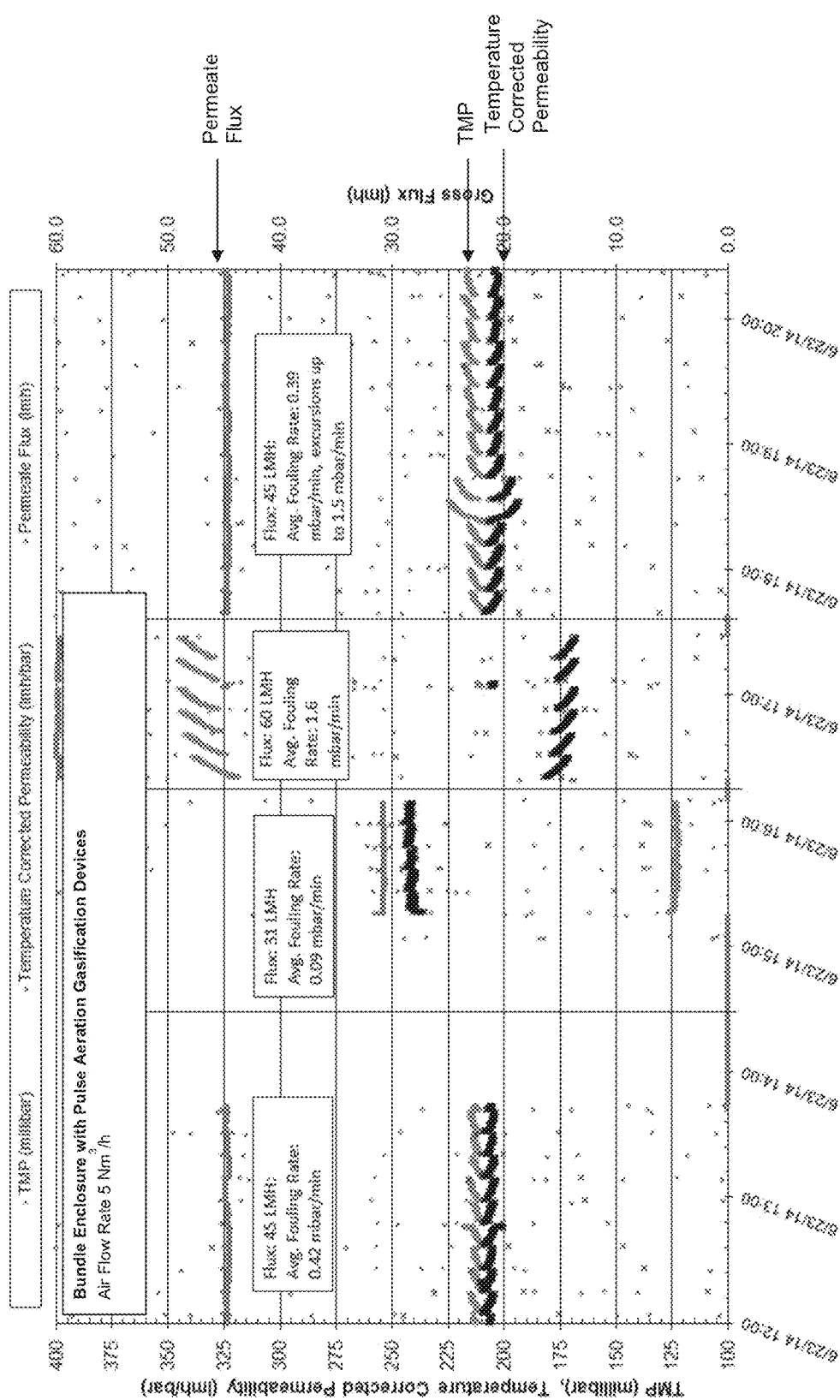
FIG. 67 is a scatter plot of test results for a membrane row operated at three different permeate flux rates.

With each set of gasification devices installed, the membrane rows were operated at the same 5 $Nm^3/h$ air flow rate and increasing permeate fluxes of 31, 45, and 60 LMH for one hour each. TMP fouling rates are presented in FIG. 65. Graphs of performance are presented in FIG. 66 and FIG. 67. Comparison of the fouling rates shows that pulse aeration gasification devices maintained at least 30% lower fouling rates than intermittent aeration gasification devices at these three fluxes during the 1-hour test. As a result, pulse aeration gasification devices should be able to achieve a higher "critical flux" before performance becomes unstable. The determination of this exact flux is not accomplished by this test and would require testing durations greater than an hour.

Critical flux tests were conducted immediately following the recovery clean of the membrane row, and as a result these critical flux fouling rates are lower than during previous testing. This is due to the membrane's permeability recovery during the recovery clean. Nevertheless, the comparison of fouling rates between gasification types either before or after the cleaning does provide clear conclusions regarding system performance.

Phase 4—Testing

Figure 68:
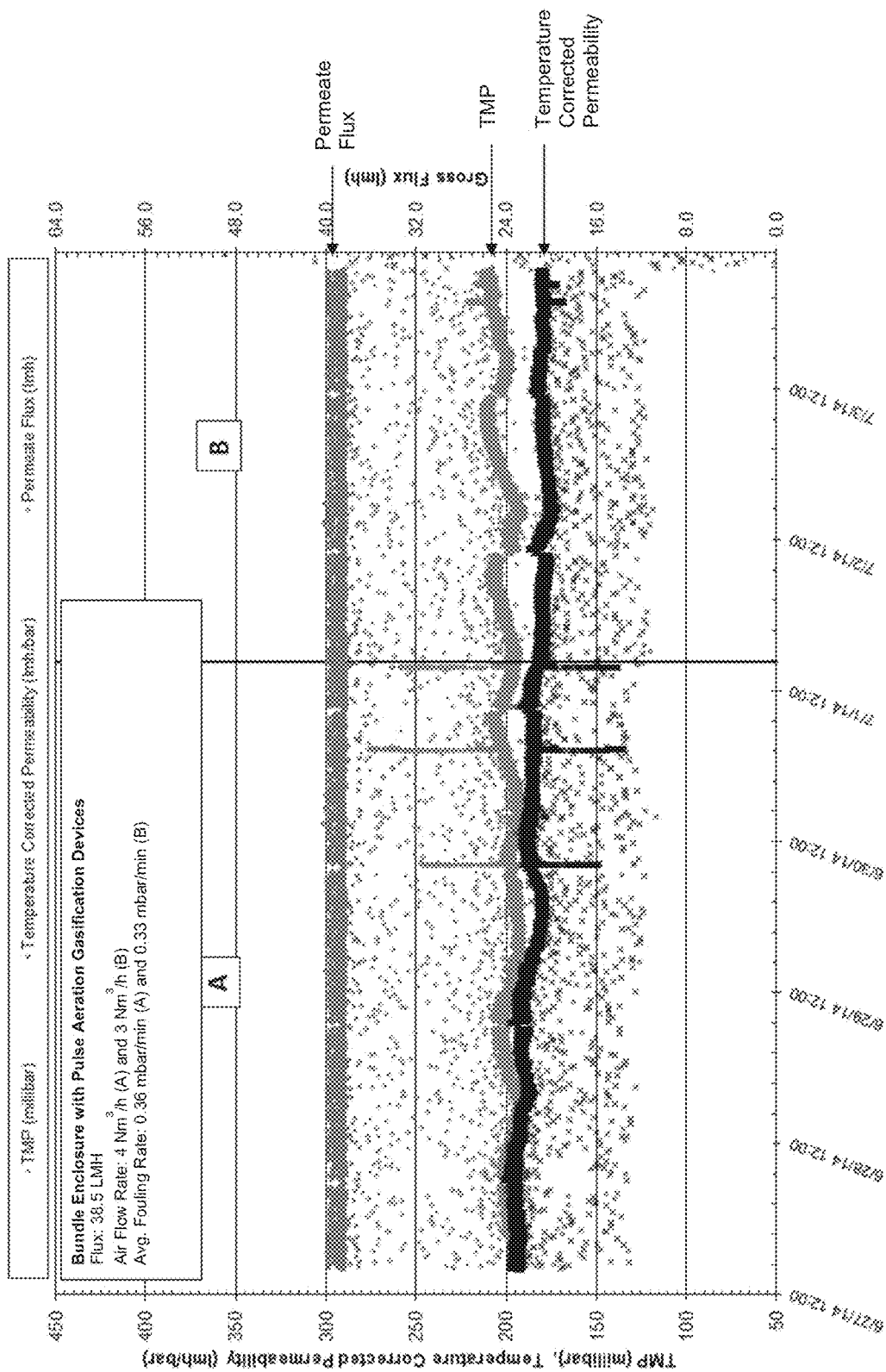
FIG. 68 is a scatter plot of test results for a membrane row operated at two different aeration air flow rates.

The goal of Phase 4 testing was to evaluate the performance of membrane rows having a bundle enclosure and pulsed aeration gasification devices (i.e., configuration 2) at different fluxes and aeration air flow rates. For Phase 4 testing the aeration air flow rate was decreased first. FIG. 68 shows membrane row performance with bundle enclosure and pulse aeration gasification devices, at a flux of 38.5 LMH with decreasing air flow rates of first 4 $Nm^3/h$ (portion A), then 3 $Nm^3/h$ (portion B). The average fouling rate during the period with 4 $Nm^3/h$ air was 0.36 mbar/min with excursions up to 9.18 mbar/min, which were related to blockages of the aeration system. The average fouling rate during the period with 3 $Nm^3/h$ was 0.33 mbar/min. This testing demonstrates that with pulse aeration gasification devices and bundle enclosures, air flow rates as low as 3 $Nm^3/h$ may be sustained with stable performance.

Figure 69:
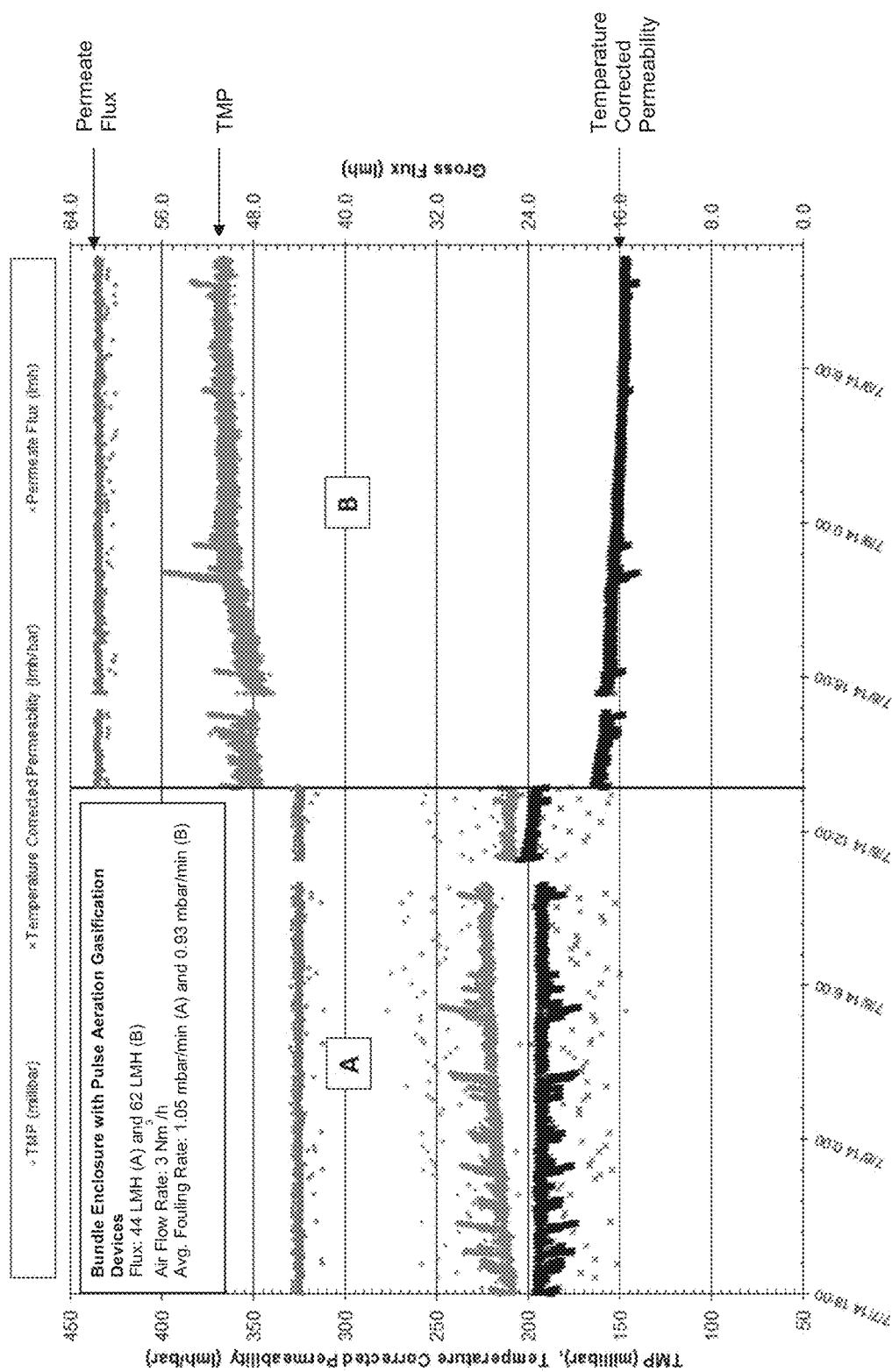
FIG. 69 is a scatter plot of test results for a membrane row operated at two different permeate flux rates.

Permeate fluxes were then increased to 44 LMH and 62 LMH, remaining at an air flow rate of 3 $Nm^3/h$, shown in FIG. 69. As shown in FIG. 69, the fouling rate at 44 LMH (portion A) averaged 1.05 mbar/min, with excursions up to 4.93 mbar/min. The fouling rate at 62 LMH (portion B) averaged 0.93 mbar/min with excursions up to 2.59 mbar/min. The excursions in TMP are related to periodic blockages of the aeration system the causes of which have been addressed by modifications to the pulsed aeration gasification devices, as described herein.

A flux of 62 LMH sustained during this testing for 21 hours is a duration greater than would be anticipated during normal operation of module 10. This flux is representative of a peak in fluxes that would occur for a few hours during a 24-hour period. Also of note is that this fouling rate at 62 LMH and 3 Nm³/h air is lower than achieved during critical flux testing (i.e., phase 3 testing) with pulse nozzles and stacked cages at 60 LMH and 5 Nm³/h air-0.93 mbar/min compared to 1.6 mbar/min. This improved performance is likely due to optimization of pulse aeration gasification devices which was ongoing during the time between testing dates.

The fouling rates resulting from this optimization testing are summarized in Table 11.

TABLE 11

| Flux (LMH) | Air Flow Rate (Nm³/h) | Fouling Rate (mbar/min) |
|---|---|---|
| 38.5 | 4 | 0.36 |
|  | 3 | 0.33 |
| 44 | 3 | 1.05 |
| 62 | 3 | 0.93 |

Figure 70:
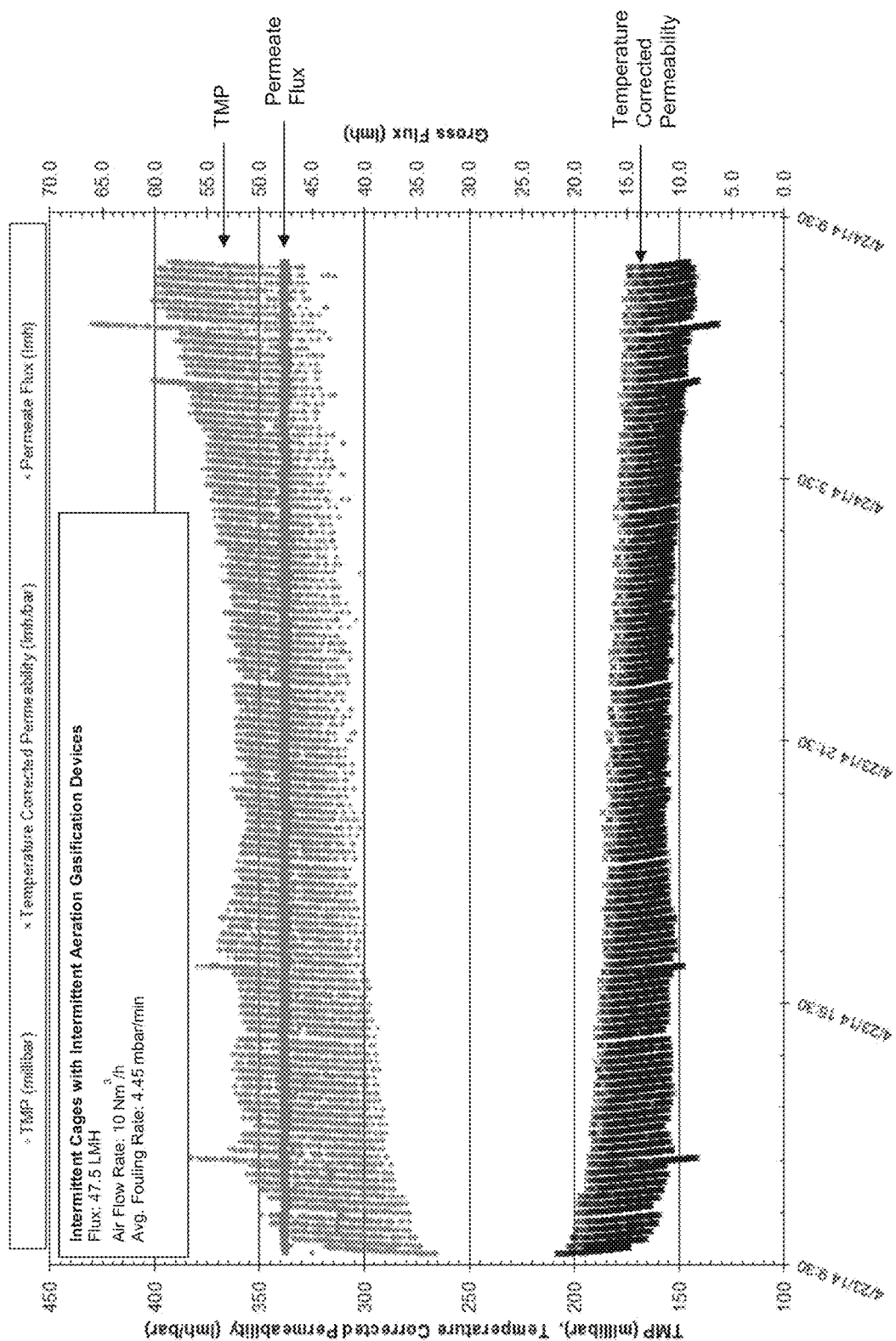
FIG. 70 is a scatter plot of test results for a membrane row.

For comparison, data gathered in May 2014, at a flux of 47.5 LMH with intermittent enclosures and pulsed gasification devices, is shown in FIG. 70 for a duration of approximately 24 hours. At that time, an aeration flow rate of 10 Nm³/h was used for the peak flux. The average fouling rate was 4.45 mbar/min. When the pulse aeration gasification device performance with bundle enclosures in FIG. 69 is compared to this, it is evident that pulse aeration gasification devices are able to increase fluxes, decrease air flow rates, and still maintain lower fouling rates. In this example, when compared to the May 2014 data with intermittent gasification devices, the pulse gasification devices were able to achieve a 31% greater flux with 70% less air, and maintain a 79% lower fouling rate.

Phase 5—Testing

Figure 71:
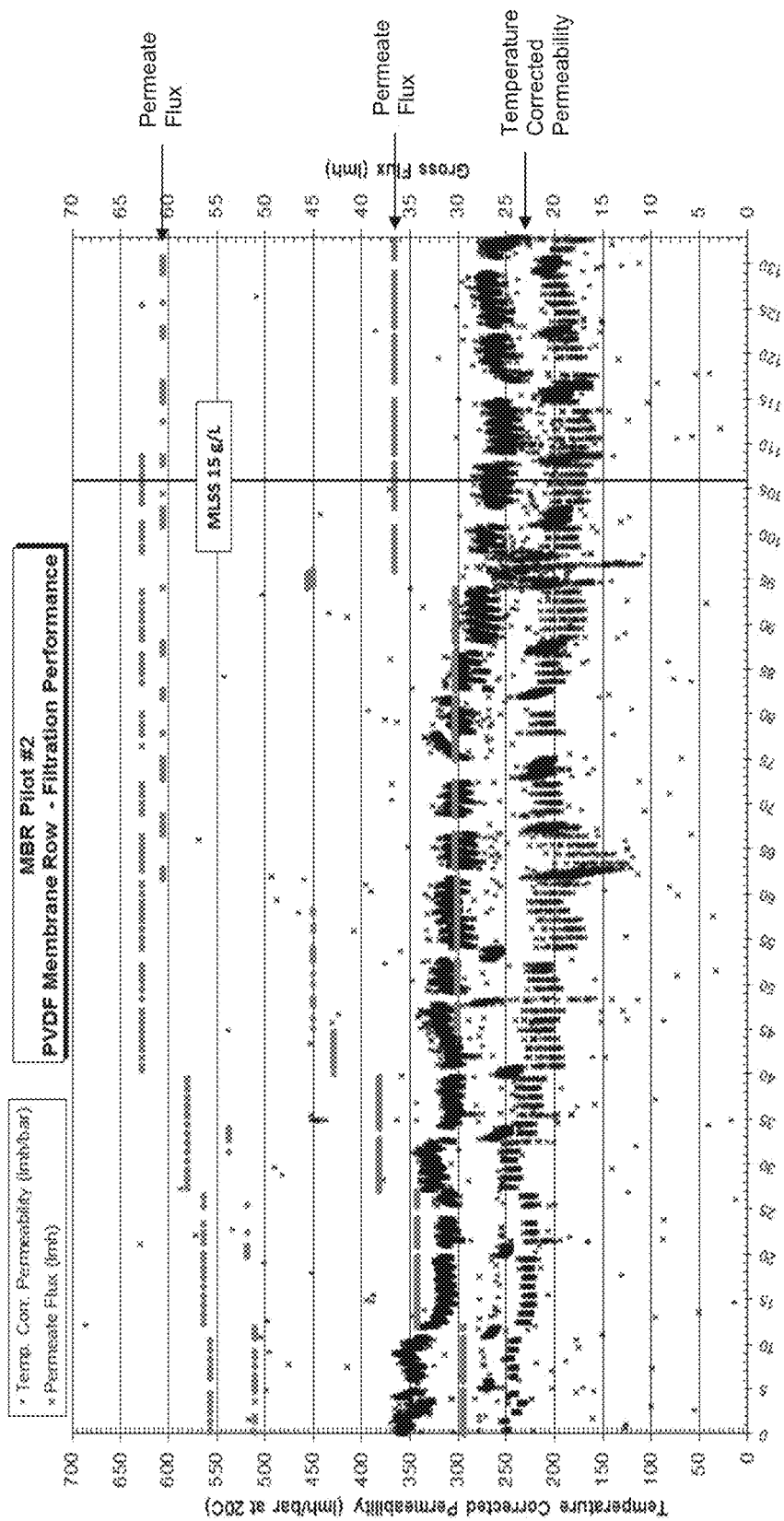
FIG. 71 is a scatter plot of test results for a membrane row according to an exemplary embodiment operated for more than 120 days.

Phase 5 testing included evaluating the long term stability of a membrane row operation utilizing bundle enclosures and pulse aeration gasification devices. To demonstrate long term stability a membrane row utilizing bundle enclosures and pulse aeration gasification devices was operated for greater than 120 days. FIG. 71 demonstrates the results of the long term stability test. As shown in FIG. 71, the average daily permeate flux varied between 30 LMH and 37.5 LMH while the daily peak flux varied between 52 LMH and 62 LMH. The MLSS concentration for the first 106 average was about 12 g/L and then it was increased to 15 g/L without an noticeable change in the permeability despite the increase in concentration. Over the course of the testing the permeability varied, but remained stable for the duration of the testing demonstrating the long term stability.

Phase 6—Testing

Figure 72:
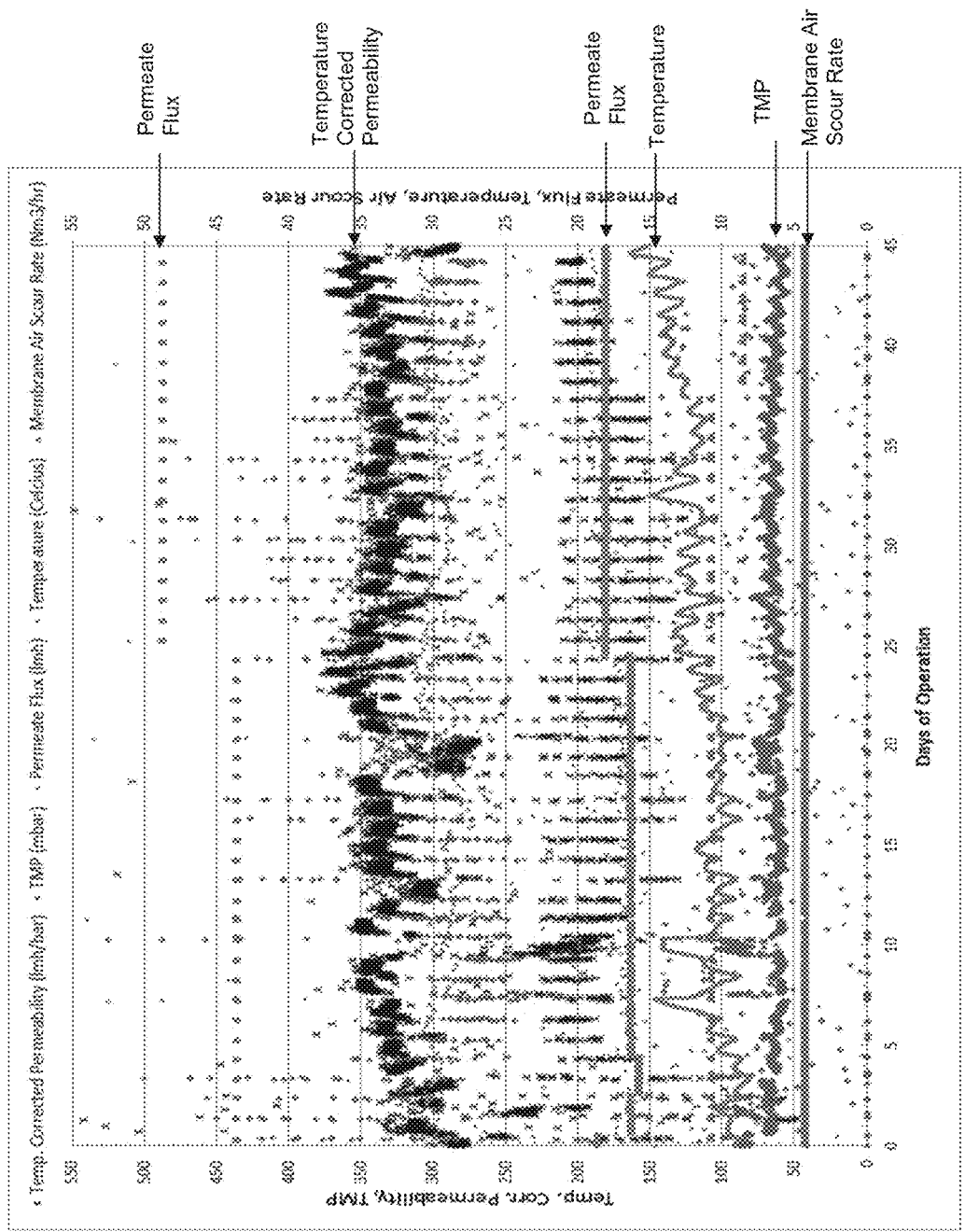
FIGS. 72 and 73 are scatter plots of test results for a membrane row according to an exemplary embodiment operated for 45 days.
Figure 73:
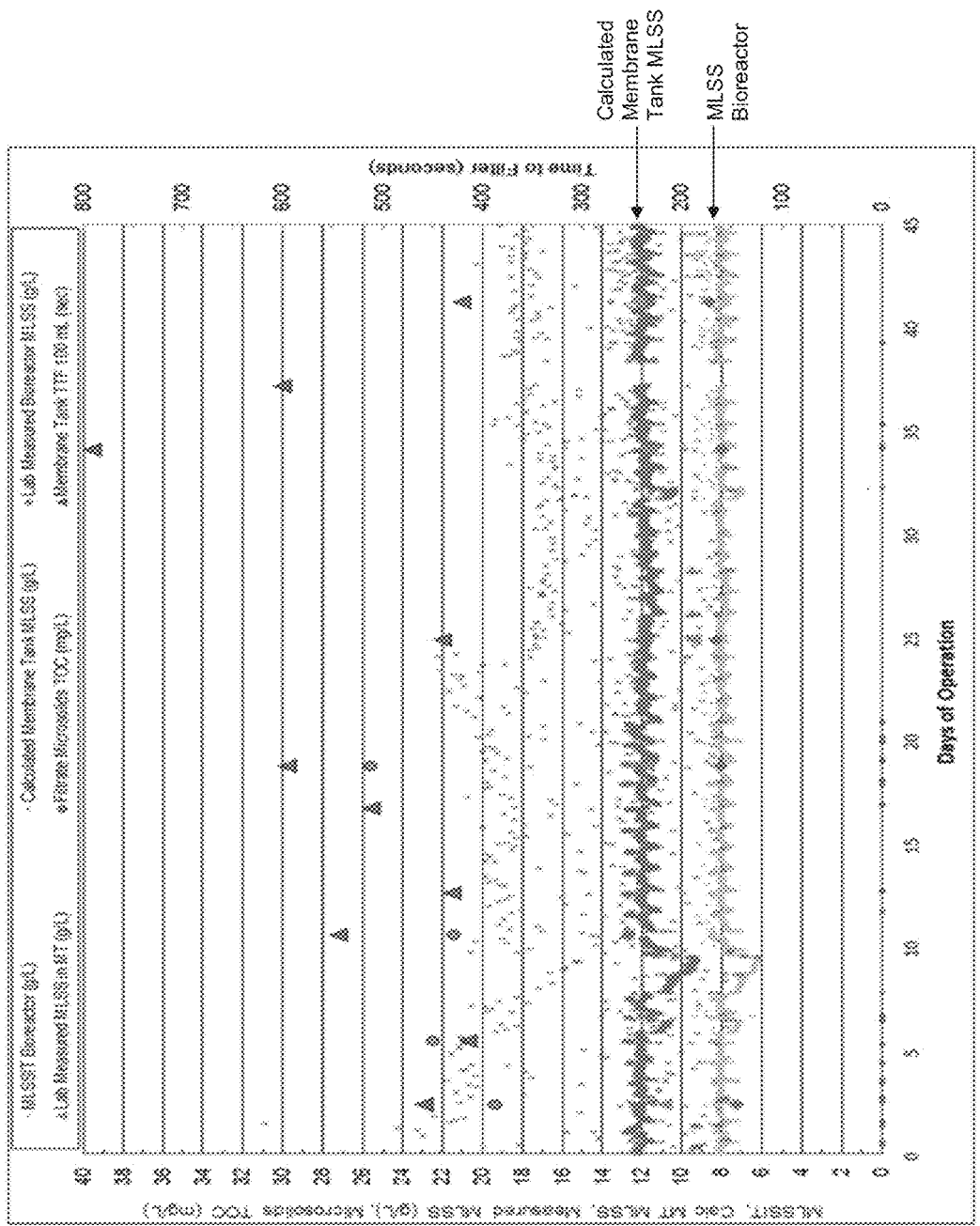

Phase 6 testing included evaluating the ability of a membrane row utilizing bundle enclosures and pulse aeration gasification devices to operate outside the normal MLSS and TTF range. The typical range for MLSS is 8 g/L to 15 g/L and the typical range for TTF is less than 200 seconds. FIGS. 72-73 demonstrate the performance of a membrane row utilizing bundle enclosures and pulse aeration over the course of 45 days. FIG. 72 shows the permeate flux and membrane air aeration flow rate results. As indicated in FIG. 72, the fouling rate, TMP, and permeability remained substantially stable over the entire test period. The permeate flux would switch from an average daily permeate flux of about 16 LMH-18 LMH to a peak daily permeate flux of between 42 LMH-48 LMH. As indicated by FIG. 73, the membrane tank MLSS was typically in the range of about 12 g/L. In addition, the membrane tank TTF was at times in the range of 400 to 600 seconds, which far exceeds the typical TTF of less than 200 seconds. Despite the membrane tank and the membrane row experiencing sludge at MLSS and TTF levels exceeding the typical operating range the membrane row continued to maintain stable operation. Such performance may allow for continued stable operation even during bioreactor upsets.

Phase 7—Testing

The goal of Phase 7 testing was to generate additional fouling rate data at various fluxes and various aeration air flow rates in order to determine the operational capability of membrane rows utilizing a bundle enclosure and pulsed aeration gasification devices. Phase 7 testing was performed utilizing an 8 fiber bundle membrane row and a pulsed aeration gasification device 34D. The membrane row tested had 40 m² of membrane area and a hollow fiber membrane length of 1.83 meters. Some of the pertinent process conditions for the Phase 7 testing are shown in Table 12 below.

TABLE 12

| Process Condition | Value(s) |
|---|---|
| Permeate Flux | 30, 45, 60 lmh (gross) |
| Aeration Air Flow Rates | 3.5, 4.3, 8.6 Nm³/hr |
| Membrane Tank MLSS | 12.2 g/L |
| Membrane Tank TTF | 120 seconds |
| Process Time | 600 seconds |
| Backflush Time | 30 seconds |
| Backflush Flux | Same as permeate flux |
| Average Temperature | 16.5° C. |

Phase 7 testing include operating the membrane row at the three Different permeate fluxes (30, 45, 60 lmh—gross) at aeration air flow rates of 3.5, 4.3, 8.6 Nm³/hr. Based on 40 m² of membrane area, the air flow rates would be 0.088, 0.108, 0.215 Nm3/hr per m². Each combination was operated for a minimum of 1 hour. Fouling rates for the testing were calculated as the difference in TMP at the start and end of the process cycle. The averages of the fouling rates for each process combination are displayed in Table 13 below.

TABLE 13

| Gross Flux Rates | 3.5 Nm³/hr/row (0.088 Nm3/hr per m²) | 4.3 Nm³/hr/row (0.108 Nm3/ hr per m²) | 8.6 Nm³/hr/row (0.215 Nm3/ hr per m²) |
|---|---|---|---|
| 30 lmh | 0.22 | 0.11 | 0.09 |
| 45 lmh | 1.1 | 0.88 | 0.36 |
| 60 lmh | 5.3 | 3.43 | 0.94 |

Figure 74:
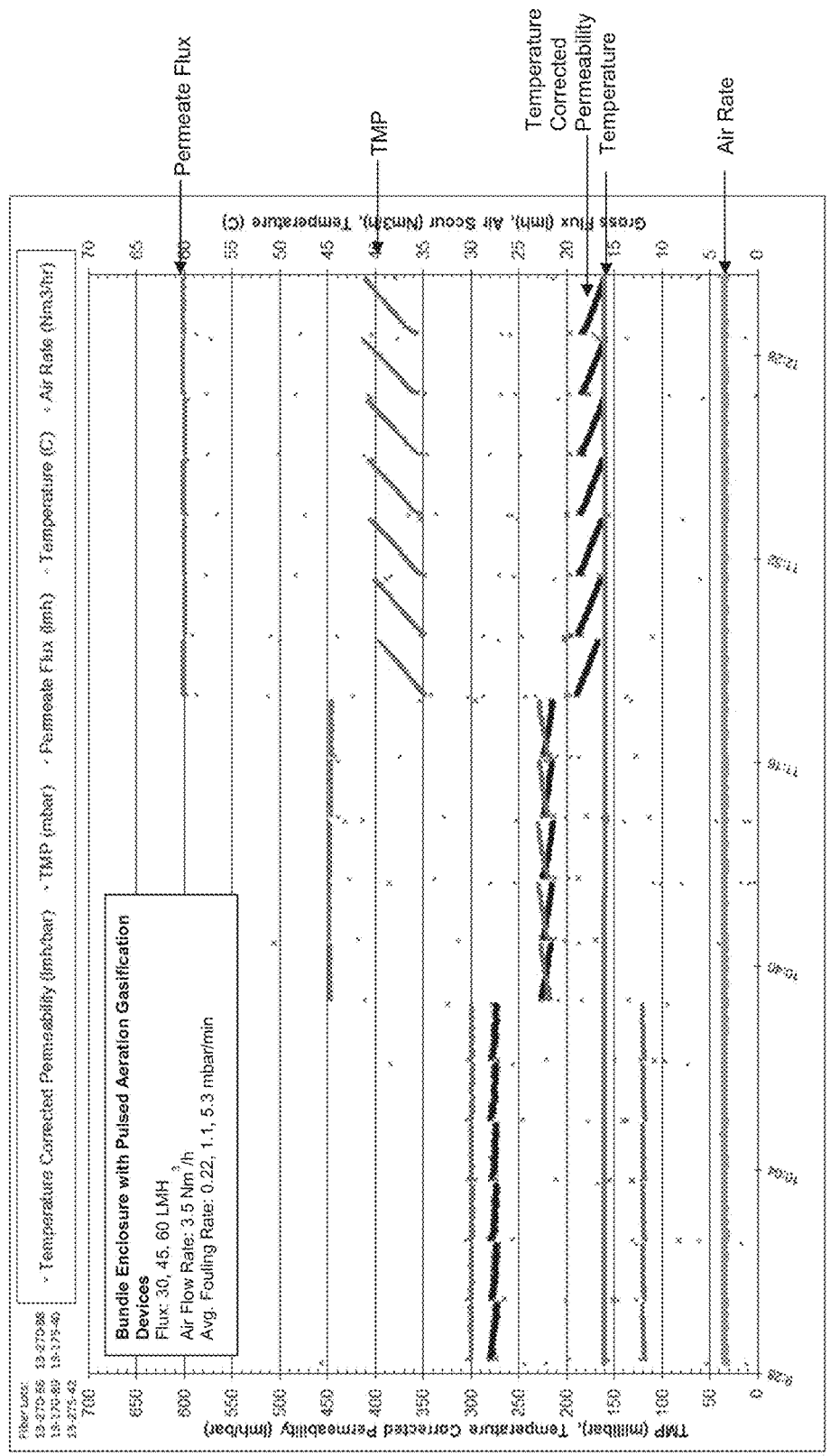
FIG. 74 is a scatter plot of test results for a membrane row operated at three different aeration air flow rates.
Figure 75:
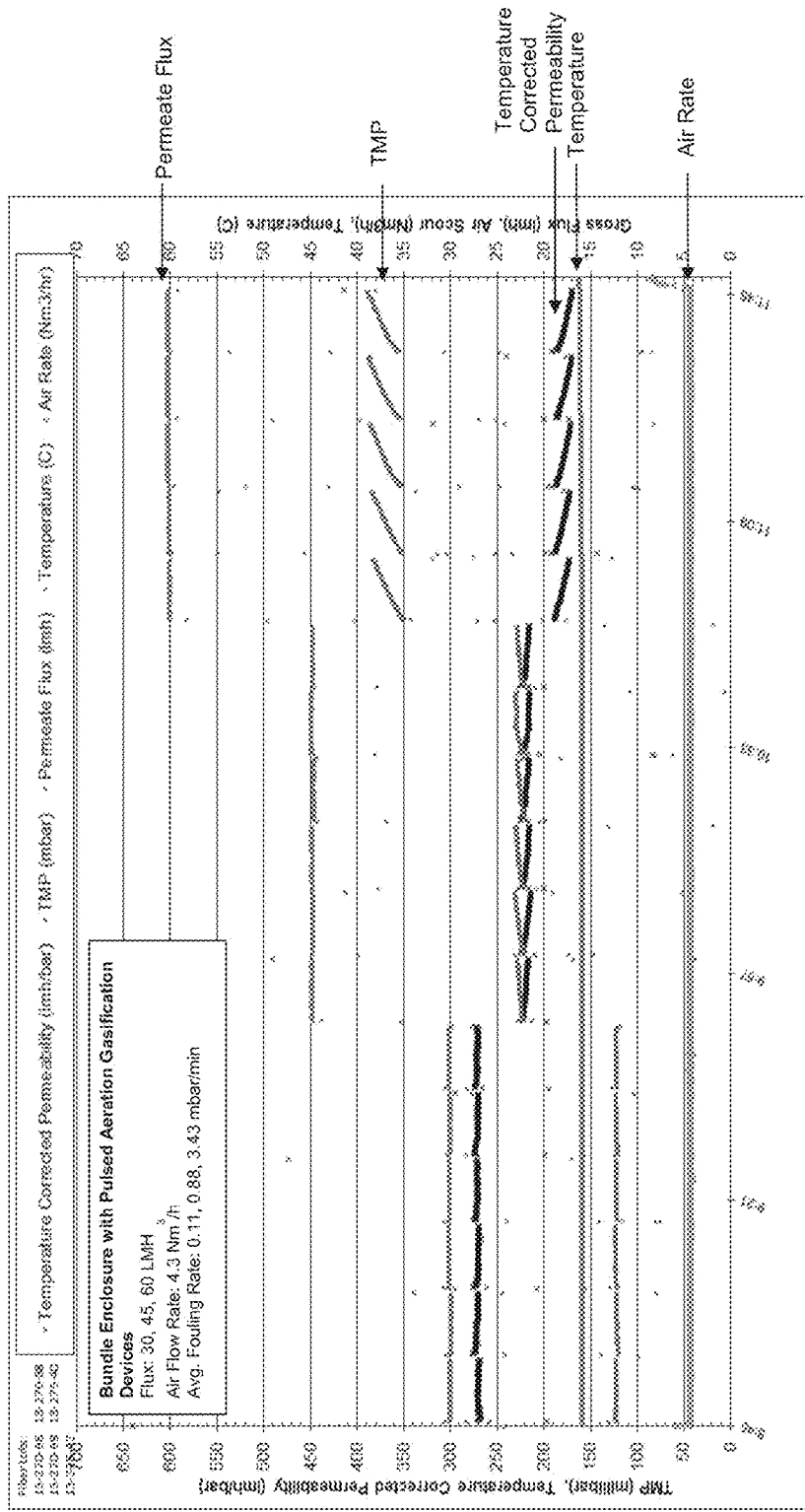
FIG. 75 is a scatter plot of test results for a membrane row operated at three different aeration air flow rates.
Figure 76:
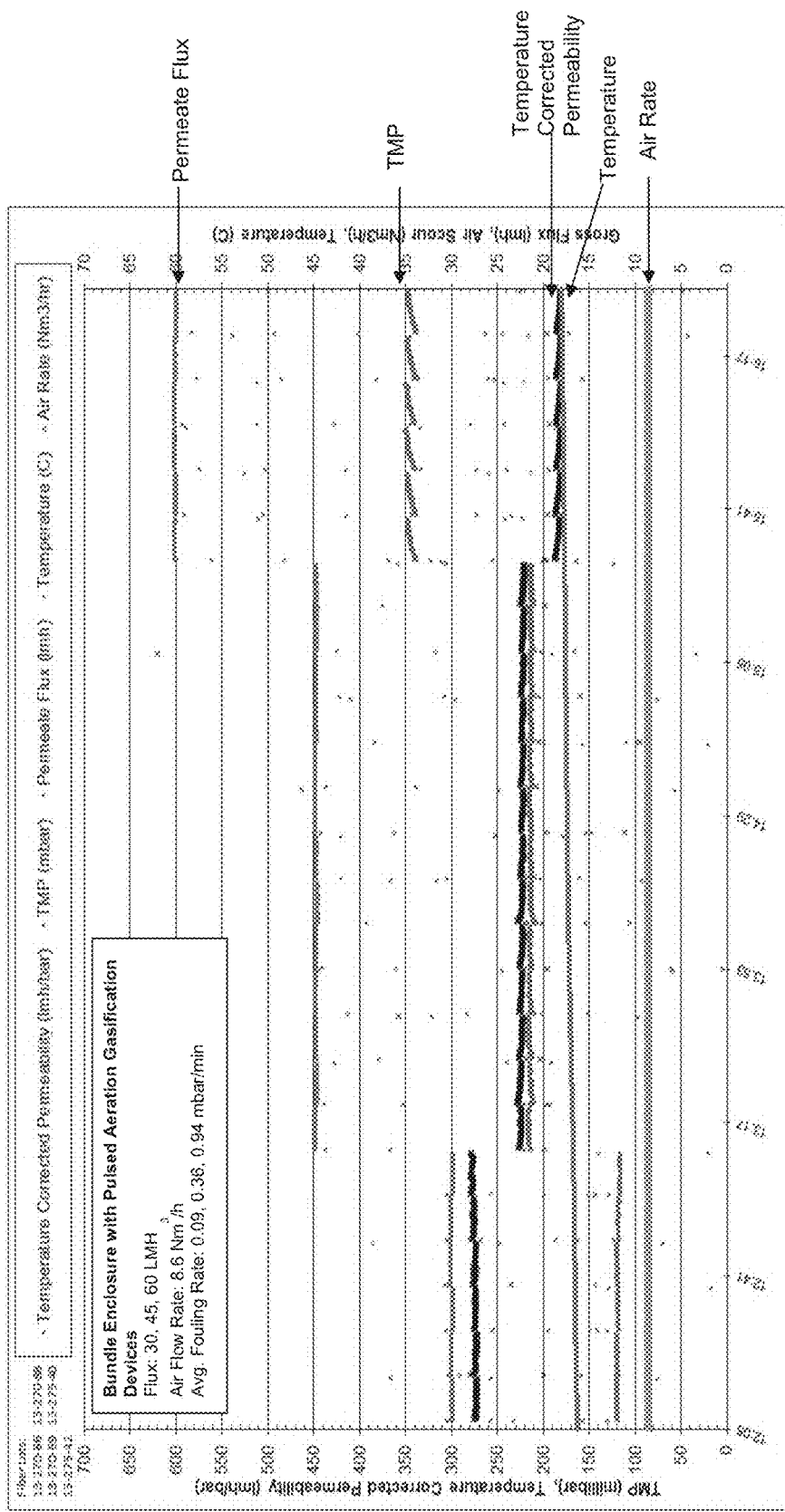
FIG. 76 is a scatter plot of test results for a membrane row operated at three different aeration air flow rates.

Graphs of the Phase 7 testing data for the different process combinations are presented in FIGS. 74-76.

Desludging of Membrane Module

In addition to controlling the fouling rates of the modules, the combination of bundle enclosures and aeration may also provide additional advantages. For example, in situations where module 10 may have one or more fiber bundles 18 that may be sludged, the combination of utilizing bundle enclosures with aeration may desludge or reverse the sludging by breaking up the sludge caked onto the fiber bundle and discharging it up through the top of the bundle enclosure 40. Desludging may occur automatically depending on the operational conditions of the system or a specific desludging cycle (e.g., relaxation cycle) may be ran. For example, sludging may be detected by monitoring the fouling rate of a module during each production cycle and comparing that to the fouling rate of earlier fouling rates (e.g., previous 2, 4, 8, 12, 24 hours). If the fouling rate spikes this may indicate sludging has occurred in which case the module may be taken out of operation and an a relaxation cycle may be ran to reverse the sludging.

A relaxation cycle may include stopping production, which may include ending the vacuum pressure applied to a module, as described herein. A gas stream may be supplied to the gasification device (e.g., gasification device 34A, 34B, 34C, or 34D) of the module to generate gaseous bubbles. The bundle enclosures 40 surrounding each fiber bundle 18 may be configured to retain the gaseous bubbles in the vicinity of the fiber bundle such that the gaseous bubbles maintain contact with the fiber bundle along the entire length of the bundle. The combination of not pulling a vacuum (i.e., not drawing more permeate through the membrane and dewatering the liquid within the bundle enclosures) along with bundle enclosures and aeration can desludge the fiber bundle by breaking apart and lifting the sludge up and out the top of the bundle enclosure. The relaxation cycle may utilize intermittent aeration and/or pulsed aeration as described herein.

Figure 78:
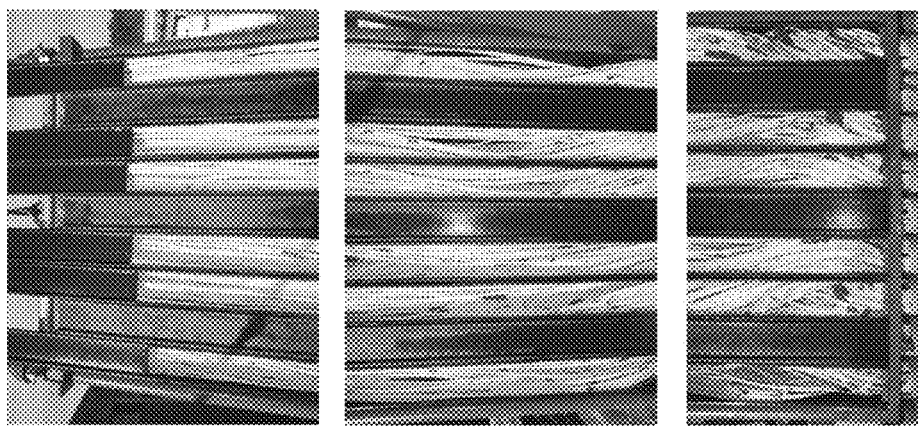
FIG. 78 is a photograph of the membrane row of FIG. 77 after the relaxation cycle.
Figure 77:
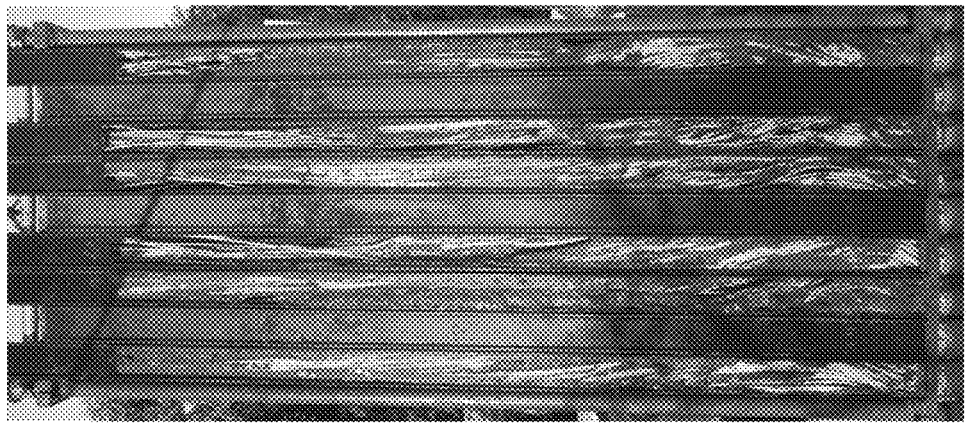
FIG. 77 is a photograph of a membrane row with a number of sludged fiber bundles prior to a relaxation cycle.

Testing was conducted to demonstrate the effectiveness of relaxation cycles. Modules utilizing both intermittent aeration as well as pulsed aeration in combination with bundle enclosures were tested. FIG. 77 is a photo of one membrane row that had 6 of the 9 fiber bundles sludged prior to the relaxation cycle. The removal hatches of the bundle enclosures were slid back to reveal the bundle enclosures, but they were reinstalled for the relaxation cycle. The 6 sludged bundles were intentionally sludged by blocking aeration to those individual fiber bundles and operating the module in production. This sludge accumulation may be typical of what would occur if a gasification device became blocked or partially blocked preventing or limiting aeration to a specific fiber bundle. FIG. 78 is a photo of the same membrane row revealing the same bundles following a 10-minute relaxation cycle. As illustrated by FIGS. 77 and 78, a majority of the sludge has been removed from the sludge fiber bundle. Table 14 below illustrates the results for one phase of relaxation testing. For this phase of testing both intermittent aeration and pulsed aeration gasification devices were utilized in combination with bundle enclosures. As shown in Table 14, the number of fiber bundles sludged for each round of testing ranged from 2 to 6. The membrane rows were weighed before sludging began and after sludging had occurred prior to the initiation of a relaxation cycle to quantity the amount of sludge accumulation based on the total weight of the accumulation. As indicated in table 14, the weight of the sludge accumulation per fiber bundle ranged from 7.8 lbs to 13.7 lbs. Relaxation cycles were then run, and after 10 minutes and 20 minutes the membrane rows were weighed again to determine the amount of sludge removed based on the reduction in weight. As indicated in the chart, at least 87% of the sludge was removed from all the membrane rows after 20 minutes operating in relaxation mode.

TABLE 14

| | Number of Bundles Sludged | Process Time to Build Sludge (hours) | Weight Gained (total lb/lb per bundle) | % Sludge Removal | |
| --- | --- | --- | --- | --- | --- |
| | | | | 10 minutes | 20 minutes |
| Intermittent Aeration | 3 | 65 | 31/10.5 | 88 | 94 |
| | 2 | 18 | 25/12.7 | 71 | 100 |
| | 6 | Crashed at 14 hours at 19 LMH | 54/9.0 | 50 | 87 |
| | 6 | Crashed at 7 hours at 19 LMH | 78/13.0 | 81 | 92 |
| Pulsed Aeration | 3 | 15 | 41/13.7 | 60 | 94 |
| | 6 | 18 | 55/9.2 | 95 | 96 |
| | 6 | 15 | 47/7.8 | 91 | 100 |

A relaxation cycle may also include cycling of aeration by turning the gas stream supplied to the membrane module on and off. In addition, a relaxation cycle may also include backflushing of the membrane module in conjunction with aeration or between aeration cycling. A relaxation cycle may vary in length, for example, a relaxation cycle may range from about 1 minute to about 5 minutes, from about 5 minutes to about 10 minutes, from about 10 minutes to about 15 minutes, from about 15 minutes to about 20 minutes, or may be greater than about 20 minutes.

The utilization of one or more modules, as described herein, having bundle enclosures and gasification devices (e.g., pulsed aeration gasification devices 34B, 34C, and 34D) may provide a variety of advantages over the prior art. For example, as demonstrated by the testing, modules having bundle enclosures and pulsed aeration gasification devices were able to operate at reduced fouling rates when compared to the other module configurations. The reduced fouling rates were exhibited at a wide range of permeate fluxes (e.g., 30 LMH to 60 LMH), which allows for flexibility in module operation. In addition, the testing demonstrated that modules having bundle enclosures and pulsed aeration gasification devices were able to operate at reduced aeration air flow rates at a range of permeate fluxes while still maintaining reduced fouling rates.

The ability of the modules to operate at increased fouling rates and reduced aeration air flow rates while still maintaining reduced fouling rates can allow for reduced system cost (e.g., initial capital cost and operating cost). For example, the ability of the modules to operate at increased permeate fluxes can allow for fewer modules to be used to produce the same our higher output as previous modules, thereby reducing the capital cost of the modules, tanks, and other corresponding equipment. The ability of the modules to operate at reduced aeration air flow rates can save both capital and operating cost. For example, for some systems, smaller blowers may be used to generate the aeration air flow than would have been necessary for previous system thereby reducing the initial capital cost. The operating cost (e.g., energy cost, maintenance, etc.) for the smaller blowers can also be reduced.

Additional advantages of the modules, as described herein, include the ability of the modules to recover from upset (e.g., debris, sludging, high MLSS, high TTF, etc.). As demonstrated by the testing, the modules as described herein are configured to have improved debris handling and removal capability, improved desludging capability, and the ability to handle high MLSS and high TTF events without the need for extensive cleaning (e.g., manual cleaning). Membranes filtration systems utilizing the membrane modules described herein can be small, cheaper, more robust, and require less energy to operate than earlier equivalent capacity systems.

The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A method of operating a membrane filter module having hollow fiber membranes arranged in a substantially vertical orientation, that are immersed in a liquid in a tank, the method comprising:
   operating the module submerged in the liquid wherein the module includes:
      a header;
      a bundle containing a plurality of hollow fiber membranes, wherein a lower end of each hollow fiber membrane is fixed in the header;
      a gasification device adapted to periodically generate a gaseous bubble and configured to release the gaseous bubble within the bundle, wherein the gaseous bubble travels through an air tube that starts from the gasification device and goes into the header; and
      an enclosure that substantially surrounds the bundle that extends from a lower region to an upper region of the membrane bundle, wherein the enclosure is configured to retain the liquid introduced into the enclosure such that the liquid surrounds the membrane bundle;
   applying a pressure that is less than an ambient pressure of the tank to a permeate collection chamber, that is in fluid communication with the hollow fiber membranes, wherein applying the pressure is configured to cause a portion of the liquid to pass through the hollow fiber membranes as permeate into the permeate collection chamber;
   supplying a gas stream to the gasification device;
   wherein the gaseous bubble has a cross-sectional area that corresponds with a cross-sectional area of the enclosure, such that the cross-sectional area of the gaseous bubble occupies substantially the entire cross-sectional area of the enclosure as it flows along the bundle.

2. The method of claim 1, further includes controlling the gas stream such that the gasification device generates the gaseous bubble at a rate of between 2 and 70 bubbles per minute.

3. The method of claim 1, further includes controlling the gas stream such that the gasification device generates the gaseous bubble at substantially regular intervals.

4. The method of claim 1, wherein the gaseous bubble has a cross-sectional area that ranges from about 10 in$^2$ to about 14 in$^2$.

5. The method of claim 1, wherein the enclosure has an internal cross-sectional area that ranges from about 10 in$^2$ to about 14 in$^2$.

6. The method of claim 1, further includes supplying the gas stream to a plurality of gasification devices, wherein each gasification devices is associated with a bundle.

7. The method of claim 1, wherein releasing the gaseous buddle within the bundle includes releasing the gaseous bubble from an air tube through the header into the center of the bundle.

8. The method of claim 1, wherein releasing the gaseous bubble within the bundle includes releasing the gaseous bubble from an air tube into an expansion chamber that is within the header, wherein the expansion chamber has a greater diameter than the aeration tube, and further wherein the bubble expands in the expansion chamber before it is released into the center of the bundle.

9. The method of claim 1, wherein the module is capable of an average fouling rate of about 0.22 mbar/min or less when operating at a flux of 30 LMH and having an aeration air flow rate of about 0.088 N/m$^3$/hr per m$^2$ of membrane area when processing a liquid medium that has MLSS of about 12.2 g/l and a TTF of about 120 seconds and is at a temperature of about 16.5° C.

10. The method of claim 1, wherein the module is capable of an average fouling rate of about 5.3 mbar/min or less when operating at a flux of 60 LMH and having an aeration air flow rate of about 0.088 N/m$^3$/hr per m$^2$ of membrane area when processing a liquid medium that has MLSS of about 12.2 g/l and a TTF of about 120 seconds and is at a temperature of about 16.5° C.

11. The method of claim 1, wherein the module is capable of an average fouling rate of about 0.09 mbar/min or less when operating at a flux of 30 LMH and having an aeration air flow rate of about 0.215 N/m$^3$/hr per m$^2$ of membrane area when processing a liquid medium that has MLSS of about 12.2 g/l and a TTF of about 120 seconds and is at a temperature of about 16.5° C.

12. The method of claim 1, wherein the module is capable of an average fouling rate of about 0.94 mbar/min or less when operating at a flux of 60 LMH and having an aeration air flow rate of about 0.215 N/m$^3$/hr per m$^2$ of membrane area when processing a liquid medium that has MLSS of about 12.2 g/l and a TTF of about 120 seconds and is at a temperature of about 16.5° C.

13. The method of claim 1, wherein a cage gap between the top of the header and the bottom of the enclosure is between about 0.5 inches and about 5 inches, and further wherein the gaseous bubble pulls in a portion of the liquid through the cage gap.

14. A method of scouring external surfaces of hollow fiber membranes arranged in a substantially vertical orientation that are immersed in a liquid in a tank, the method comprising:
   operating the module submerged in the liquid wherein the module includes:
      a header;
      a bundle containing a plurality of hollow fiber membranes, wherein a lower end of each hollow fiber membrane is fixed in the header;
      a gasification device adapted to periodically generate a gaseous bubble and configured to release the gaseous bubble within the bundle, wherein the gaseous bubble travels through an air tube that starts from the gasification device and goes into the header; and
      an enclosure that substantially surrounds the bundle that extends from a lower region to an upper region of the membrane bundle, wherein the enclosure is configured to retain the liquid introduced into the enclosure such that the liquid surrounds the membrane bundle;

applying a pressure that is less than an ambient pressure of the tank to a permeate collection chamber, that is in fluid communication with the hollow fiber membranes, wherein applying the pressure is configured to cause a portion of the liquid to pass through the hollow fiber membranes as permeate into the permeate collection chamber;

supplying a gas stream to the gasification device to produce the gaseous bubble;

wherein the enclosure causes the gaseous bubble to substantially fill the cross-sectional area of the enclosure and to maintain contact with the bundle along the entire length of the bundle, thereby the gaseous bubble scours the surface of the hollow fiber membranes and removes and lifts debris from the bundle.

15. The method of claim 1, wherein a cage gap between the top of the header and the bottom of the enclosure is between about 0.5inches and about 5 inches, and further wherein the gaseous bubble pulls in a portion of the liquid through the cage gap.

16. A method of desludging a hollow fiber membrane module, comprising:
temporarily ending a vacuum pressure applied to the module, wherein the membrane module includes:
a header;
a bundle containing a plurality of hollow-fiber membranes,
wherein a lower end of each hollow membrane is fixed in the header;
a gasification device adapted to periodically generate a gaseous bubble and configured to release the gaseous bubble within the bundle, wherein the gaseous bubble travels through an air tube that starts from the gasification device and goes into the header; and
an enclosure that substantially surrounds the bundle that extends from a lower region to an upper region of the membrane bundle, wherein the enclosure is configured to retain the liquid introduced into the enclosure such that the liquid surrounds the membrane bundle;

supplying a gas stream to the gasification device to generate a plurality of gaseous bubbles, wherein the gaseous bubbles each substantially fill the cross-sectional area of the enclosure and maintain contact with the bundle along the entire length of the bundle; and wherein the gaseous bubbles desludge the hollow-fiber membranes by breaking apart and lifting the sludge up and out the top of the enclosure.

17. The method of claim 16, wherein a cage gap between the top of the header and the bottom of the enclosure is between about 0.5 inches and about 5 inches, and further wherein the gaseous bubble pulls in a portion of the liquid through the cage gap.

18. The method of claim 1, wherein the lower end of the plurality of hollow fiber membrane of the bundle extend through a plurality of holes of a fiber plate that is fixed within the header.

19. The method of claim 18, wherein the plurality of holes of the fiber plate are divided into sections separated by channels that are configured to enable fluid and debris to travel along the bundle.

20. The method of claim 18, wherein the fiber plate includes a center passage through which the gaseous bubble travels when released within the bundle.

\* \* \* \* \*